United States Patent
Moorhouse et al.

(10) Patent No.: US 10,870,720 B2
(45) Date of Patent: Dec. 22, 2020

(54) POLYOLEFIN PRODUCTION WITH CHROMIUM-BASED CATALYSTS

(71) Applicant: Univation Technologies, LLC, Houston, TX (US)

(72) Inventors: John H. Moorhouse, Middlesex, NJ (US); Kevin J. Cann, Tierra Verde, FL (US); Mark G. Goode, S. Charleston, WV (US); Kevin R. Gross, S. Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 16/577,088

(22) Filed: Sep. 20, 2019

(65) Prior Publication Data

US 2020/0010590 A1    Jan. 9, 2020

Related U.S. Application Data

(63) Continuation of application No. 15/506,465, filed as application No. PCT/US2015/047910 on Sep. 1, 2015, now Pat. No. 10,465,026.

(60) Provisional application No. 62/044,716, filed on Sep. 2, 2014.

(51) Int. Cl.
*B01J 4/00* (2006.01)
*B01J 19/18* (2006.01)
*C08F 210/16* (2006.01)

(52) U.S. Cl.
CPC .............. *C08F 210/16* (2013.01); *B01J 4/002* (2013.01); *B01J 19/18* (2013.01); *B01J 2204/002* (2013.01); *B01J 2219/00063* (2013.01); *B01J 2219/00094* (2013.01); *B01J 2219/00168* (2013.01); *B01J 2219/00189* (2013.01)

(58) Field of Classification Search
CPC ....... B01J 8/20; B01J 8/382; B01J 8/18; B01J 8/1809; B01J 8/1836; B01J 4/002; B01J 2208/00212; B01J 2208/00867; B01J 2208/00902; B01J 2208/0061; B01J 2208/0548; B01J 2208/00672; B01J 19/18; B01J 2219/00063; B01J 2219/00094; B01J 2219/00168; B01J 2219/00189

See application file for complete search history.

(56) References Cited

U.S. PATENT DOCUMENTS 2,906,742 A    9/1959   Thomka
2,919,265 A    12/1959  Brooks
3,279,087 A    10/1966  Hearne et al.
(Continued)

OTHER PUBLICATIONS

International Search Report & Written Opinion for related PCT Application PCT/US2015/047910, dated Jan. 27, 2016 (14 pgs).
(Continued)

*Primary Examiner* — Lessanework Seifu
(74) *Attorney, Agent, or Firm* — Brooks, Cameron & Huebsch, PLLC

(57) ABSTRACT

A system and method for charging a chromium-based catalyst to a mix vessel; introducing a reducing agent through an entrance arrangement into the mix vessel, and agitating a mixture of the chromium-based catalyst, the reducing agent, and a solvent in the mix vessel to promote contact of the reducing agent with the chromium-based catalyst to give a reduced chromium-based catalyst.

8 Claims, 11 Drawing Sheets

(56) References Cited

U.S. PATENT DOCUMENTS

| | | | |
|---|---|---|---|
| 3,508,882 A * | 4/1970 | Farnell | B01J 3/04 |
| | | | 422/200 |
| 3,747,899 A * | 7/1973 | Latinen | B01F 7/00291 |
| | | | 366/168.1 |
| 5,200,477 A | 4/1993 | Baker et al. | |
| 5,308,562 A | 5/1994 | Wohlfahrt-Laymann | |
| 5,664,733 A | 9/1997 | Lott | |
| 8,399,580 B2 * | 3/2013 | Benham | B01J 23/26 |
| | | | 422/110 |
| 2002/0117559 A1 | 8/2002 | Kaligian et al. | |
| 2007/0037935 A1 | 2/2007 | Karer et al. | |
| 2010/0298493 A1 | 11/2010 | Lipp et al. | |
| 2011/0010938 A1 | 1/2011 | Moorhouse et al. | |
| 2011/0245562 A1 | 10/2011 | Kustov et al. | |
| 2012/0041160 A1 | 2/2012 | Benham et al. | |
| 2012/0095167 A1 | 4/2012 | Nagai et al. | |

OTHER PUBLICATIONS

2nd Written Opinion for related PCT Application PCT/US2015/047910, dated Aug. 2, 2016 (7 pgs).
International Preliminary Report on Patentability for related PCT Application PCT/US2015/047910, dated Dec. 5, 2016 (19 pgs).

* cited by examiner

100

230

228

POLYOLEFIN PRODUCTION WITH CHROMIUM-BASED CATALYSTS

CLAIM OF PRIORITY

This application is a Continuation of U.S. § 371 National Stage Application Ser. No. 15/506,465, filed Feb. 24, 2017 and published as U.S. Publication No. 2018/0223020 A1 on Aug. 9, 2018, which claims priority to International Application Number PCT/US2015/047910, filed Sep. 1, 2015 and published as WO 2016/036722 on Mar. 10, 2016, which claims the benefit to U.S. Provisional Application 62/044,716, filed Sep. 2, 2014, the entire contents of which are incorporated herein by reference in its entirety.

FIELD OF THE INVENTION

The present invention relates generally to polyolefin production with chromium-based catalysts and, more particularly, to preparing and reducing the chromium-based catalysts for the polymerization of olefin into a polyolefin in a polymerization reactor.

DESCRIPTION OF THE RELATED ART

Polyolefins have been used extensively in a wide variety of applications inclusive of food packaging, textiles, and resin materials for various molded articles. Different polymer properties may be desired depending on the intended use of the polymer. For example, polyolefins having relatively low molecular weights and narrow molecular weight distributions are suitable for articles molded by an injection molding method. On the other hand, polyolefins having relatively high molecular weights and broad molecular weight distributions are suitable for articles molded by blow molding or inflation molding. For example, in many applications, medium-to-high molecular weight polyethylenes are desirable. Such polyethylenes have sufficient strength for applications which require such strength (e.g., pipe applications), and simultaneously possess good processing characteristics. Similarly, polyolefins having a particular flow index or within a particular flow index range are suitable for various applications.

Ethylene polymers having broad molecular weight distributions can be obtained by use of a chromium-based catalyst obtained by calcining a chromium compound carried on an inorganic oxide carrier in a non-reducing atmosphere to activate it such that, for example, at least a portion of the carried chromium atoms is converted to hexavalent chromium atoms (Cr+6). This type of catalyst is commonly referred to in the art as the Phillips catalyst. The chromium compound is impregnated onto silica, dried to a free-flowing solid, and heated in the presence of oxygen to about 400° C.-860° C., converting most or all of the chromium from the +3 to the +6 oxidation state.

Another chromium-based catalyst used for high density polyethylene applications consists of silyl chromate (e.g., bis-triphenylsilyl chromate) chemisorbed on dehydrated silica and subsequently reduced with diethylaluminum ethoxide (DEAlE). The resulting polyethylenes produced by each of these catalysts are different with respect to some important properties. Chromium oxide-on-silica catalysts have good productivity (g PE/g catalyst), also measured by activity (g PE/g catalyst-hr), but often produce polyethylenes with molecular weight distributions narrower than that desired for applications such as large part blow molding, film, and pressure pipe. Silyl chromate-based catalysts produce polyethylenes with desirable molecular weight characteristics (broader molecular weight distribution with a high molecular weight shoulder on molecular weight distribution curve), but often may not have as high productivity or activity as chromium oxide-on-silica catalysts.

Monoi et al., in Japanese Patent Application 2002-020412, disclose the use of inorganic oxide-supported Cr+6-containing solid components (A) prepared by activating under non-reducing conditions, then adding dialkylaluminum functional group-containing alkoxides (B) which contain an Al—O—C—X functional group in which X is either an oxygen or a nitrogen atom, and trialkylaluminum (C) to polymerize ethylene. The resulting ethylene polymers are said to possess good environmental stress crack resistance and good blow molding creep resistance.

Monoi et al., in U.S. Pat. No. 6,326,443, disclose the preparation of a polyethylene polymerization catalyst using a chromium compound, adding an organic aluminum compound more rapidly than specified by a certain mathematical formula, and drying the resulting product at a temperature not higher than 60° C., more rapidly than specified by another mathematical formula. Both formulae are expressed as functions of batch size. Monoi teaches that by minimizing the addition time of the organic aluminum compound and the drying time, a catalyst with high activity and good hydrogen response is obtained.

Monoi et al., in U.S. Pat. No. 6,646,069, disclose a method of ethylene polymerization in co-presence of hydrogen using a trialkylaluminum compound-carried chromium-based catalyst, wherein the chromium-based catalyst is obtained by activating a chromium compound carried on an inorganic oxide carrier by calcination in a non-reducing atmosphere to convert chromium atoms into the +6 state, treating the resulting substance with a trialkylaluminum compound in an inert hydrocarbon solvent, and then removing the solvent.

Hasebe et al., in Japanese Patent Publication 2001-294612, disclose catalysts containing inorganic oxide-supported chromium compounds calcined at 300° C.-1100° C. in a non-reducing atmosphere, R3-nAlLn (R=C1-C8 alkyl; L=C1-C8 alkoxy or phenoxy; and 0<n<1), and Lewis base organic compounds. The catalysts are said to produce polyolefins with high molecular weight and narrow molecular weight distribution.

Da et al., in Chinese Patent 1214344, teach a supported chromium-based catalyst for gas-phase polymerization of ethylene prepared by impregnating an inorganic oxide support having hydroxyl group on the surface with an inorganic chromium compound aqueous solution. The particles formed are dried in air and activated in an oxygen-containing atmosphere. The activated catalyst intermediate is reduced with an organic aluminum compound.

Durand et al., in U.S. Pat. No. 5,075,395, teach a process for elimination of the induction period in the polymerization of ethylene. The polymerization is conducted with a charge powder in the presence of a catalyst comprising a chromium oxide compound associated with a granular support and activated by thermal treatment, this catalyst being used in the form of a prepolymer. The Durand process is characterized in that the charge powder employed is previously subjected to a treatment by contacting the charge powder with an organoaluminum compound in such a way that the polymerization starts up immediately after the contacting of the ethylene with the charge powder in the presence of the prepolymer.

The above described chromium-based catalysts may be used to produce select grades of polymers. Very often, polymerization reactors are required to produce a broad range of products, having flow indices that may vary from 0.1 dg/min to about 100 dg/min, for example. The flow index response of a chromium-based catalyst refers to the range of the flow index of the polymer made by the catalyst under a given set of polymerization conditions.

SUMMARY

An embodiment relates to a method of preparing a chromium-based catalyst for the polymerization of an olefin into a polyolefin, the method including: feeding a chromium-based catalyst to a mix vessel; introducing a stream comprising a reducing agent into the mix vessel through a conduit extending into a nozzle of the mix vessel; and agitating a mixture of the chromium-based catalyst, the reducing agent, and a solvent in the mix vessel to promote contact of the reducing agent with the chromium-based catalyst to give a reduced chromium-based catalyst.

Another embodiment relates to a method of treating a chromium-based catalyst for polyolefin production, the method including: adding a charge of chromium-based catalyst to a mix vessel; introducing a reducing agent into the mix vessel through a conduit extension that extends at least 0.5 inch into the mix vessel and terminates in a designated vapor space of the mix vessel; and agitating a mixture of the chromium-based catalyst, reducing agent, and a solvent in the mix vessel to disperse the reducing agent in the mixture to promote reaction of the reducing agent with the chromium-based catalyst to give a reduced chromium-based catalyst.

Yet another embodiment relates to a reducing system for chromium-based catalyst, including: a catalyst feed system to provide a chromium-based catalyst to a mix vessel; a reducing agent supply system to provide a reducing agent to the mix vessel; and the mix vessel to hold a mixture including the chromium-based catalyst, the reducing agent, and a solvent to produce a reduced chromium-based catalyst for use in the polymerization of an olefin into a polyolefin, wherein the mix vessel has an agitator to agitate the mixture, and further has an entrance arrangement for the reducing agent, the entrance arrangement having a conduit extension to receive and direct the reducing agent into the mix vessel.

DETAILED DESCRIPTION

Figure 1:
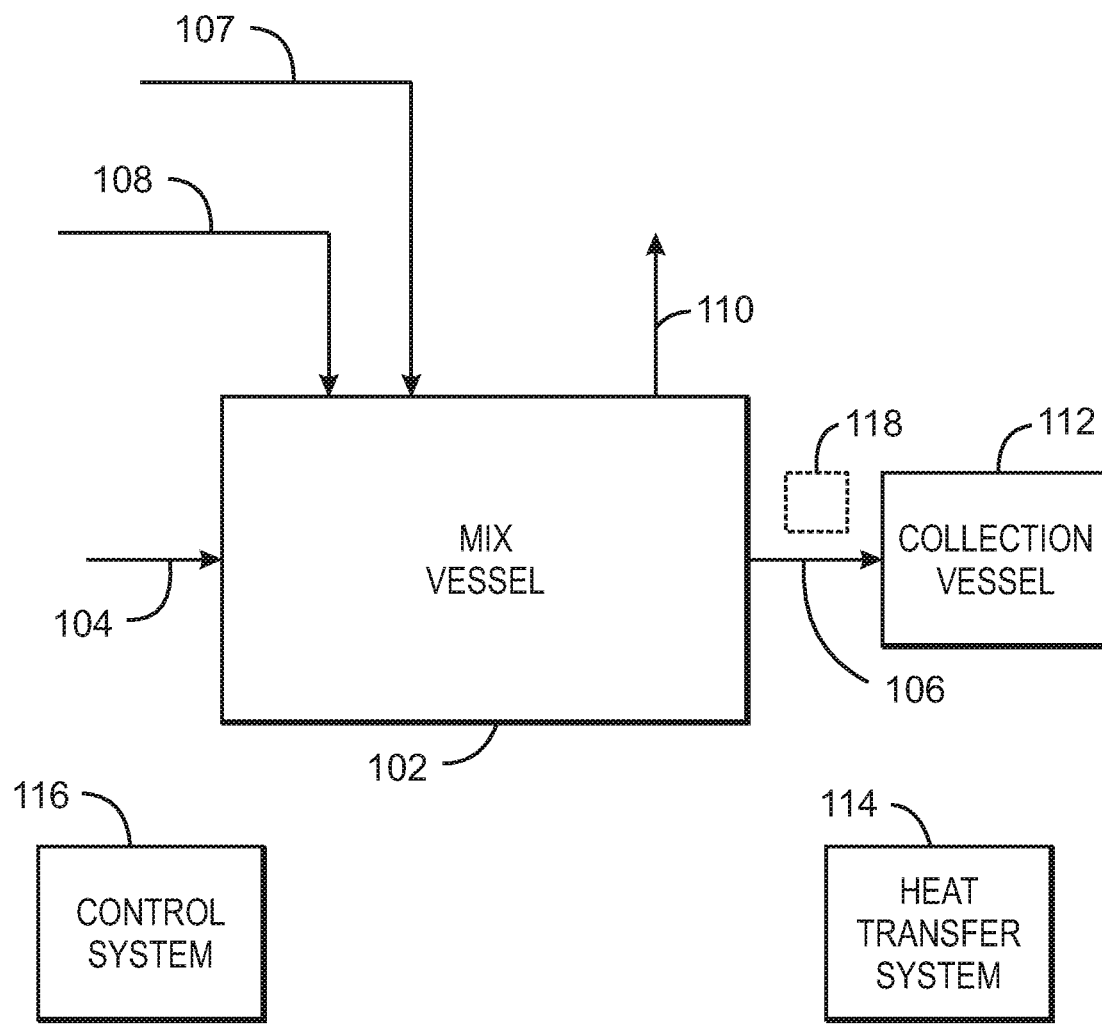
FIG. 1 is a block flow diagram of a reducing system for chromium-based catalyst in accordance with embodiments of the present techniques.

Before the present compounds, components, compositions, and/or methods are disclosed and described, it is to be understood that unless otherwise indicated this invention is not limited to specific compounds, components, compositions, reactants, reaction conditions, ligands, catalyst structures, or the like, as such may vary, unless otherwise specified. It is also to be understood that the terminology used herein is for the purpose of describing particular embodiments only and is not intended to be limiting.

As discussed below, embodiments of the present techniques include to adjust drying temperature of a reduced chromium-based catalyst in a mix vessel to give a desired flow index response of the catalyst. Also, an entrance arrangement on the mix vessel may be employed to direct flow of the reducing agent into the mix vessel to improve dispersion of the reducing agent and to increase the flow index response prior to drying of the catalyst. Further, some embodiments may use an inline mixer in lieu of the mix vessel, for the inline reduction of the chromium-based catalyst in route to the polyolefin polymerization reactor.

Embodiments of the techniques may be directed to controlling and adjusting flow index response. The techniques may facilitate increasing and decreasing the flow index response beyond the typical process range of a given chromium-based catalyst. Embodiments provide for adjusting the catalyst flow index response in the production of chromium-based catalysts for use in the polymerization of olefin into polyolefin. In other words, the chromium-based catalyst compositions may be used in the polymerization of olefins, wherein the chromium-based catalyst composition has a flow index response within a selected or desired range. Further, techniques herein may also beneficially maintain or increase productivity of the catalyst.

Generally, embodiments disclosed herein relate to controlling or tailoring the flow index response of supported chromium-based catalysts. In the production of the chromium-based catalyst, the catalyst may be contacted with a reducing agent at an adjustable feed rate of reducing agent over an adjustable time period and with adjustable agitation rate, and then drying the catalyst at an adjustable drying temperature (and drying time) to give a reduced chromium-based catalyst having a flow index response within a desired range. These reduced chromium-based catalysts may then be employed to polymerize olefins into polyolefins having a flow index correlative to the flow index response. Indeed, a catalyst with higher flow index response generally gives a polyolefin with higher flow index, and a catalyst with lower flow index response generally gives a polyolefin with lower flow index.

In the reduction of the catalyst prior to polymerization, the addition rate of a reducing agent (e.g., DEAlE) to a chromium-based catalyst (e.g., silyl chromate or chromium oxide catalysts), and the agitation rate of the reduction reaction mixture influences the flow index response of the catalyst. As discussed below in accordance with embodiments of the present techniques, the flow index response of the catalyst can further be controlled or adjusted by adjusting the drying temperature of the catalyst after the reduction reaction, such as in place in the mix vessel that held the reduction reaction. As used herein, "flow index response" means that under a certain set of polymerization reaction conditions, the catalyst produces a polymer within a certain molecular weight range.

In the subsequent polymerization with the catalyst, the molar ratio of DEAlE/Cr in the catalyst or the weight percent (wt %) DEAlE in the catalyst, polymerization temperature, residence time of the catalyst in the polymerization reactor, trace oxygen add-back concentration introduced to or present in the reactor, and comonomer and hydrogen ratios to ethylene may each affect the molecular weight of the polymer made with the catalyst. When the catalyst is prepared consistently, and the subsequent polymerization process variables are held constant or generally constant, a catalyst of a certain formulation should make the same polymer. Even with minor variations in the preparation and process variables, such as within a given control tolerance, a similar polymer should be formed. Thus, control of the flow index response of a catalyst in the production of the catalyst may be implemented to give a certain molecular weight range for the polymer in the downstream polymerization according to embodiments disclosed herein.

Polymer flow index is inversely related to polymer molecular weight. The flow index response may be modified herein using terms such as "high," "medium," or "low" to indicate the relative range of the flow index of the resulting polymer made under a given set of polymerization conditions as compared to similar chromium-based catalyst compositions produced using varying reducing agent feed rates, time periods for addition of the reducing agent, reducing agent entrance arrangements, agitation rates, and/or drying temperature or drying line-out temperature. For example, for a given chromium-based catalyst composition produced using two different selected DEAlE feed rates over a given time period, one catalyst may have a low flow index response, producing a higher molecular weight polymer, while the other may have a high flow index response, producing a lower molecular weight polymer. These relative terms should generally not be used to compare different chromium-based catalysts, but may be used to differentiate the flow index response for a given chromium-based catalyst.

Polymer melt index is another indicator of polymer molecular weight. Melt index is a measure of the polymer fluidity and is also inversely related to molecular weight. A higher melt index can indicate a higher termination of active polymer chains relative to propagation, and, thus, a lower molecular weight.

As discussed in Moorhouse et al., U.S. Pat. Publication No. 2011/0010938, which is incorporated herein by reference in its entirety, the present inventors found that reducing agent feed rate, in some examples, or that reducing agent feed rate and agitation rate, in other examples, during addition of and reaction of the reducing agent with the catalyst may impact the flow index response of the catalysts. It may be beneficial to maintain control over these parameters to produce batches of catalyst with a consistent or desired flow index response. Furthermore, in accordance with embodiments of the present techniques, the drying temperature (and in some cases, the drying time) of the catalyst may be adjusted to give a desired flow index response of the catalyst. Accordingly, the flow index response may be beneficially varied to produce catalysts for production of polyethylene for different applications by adjusting or selecting reducing agent addition rates and agitation rates, and the drying temperature of the catalyst.

For a selected or specified reducing agent/Cr ratio, the flow index response of a chromium-based catalyst may be affected by the addition of the reducing agent, including the feed rate and the time period over which the reducing agent is added. For example, the flow index response generally increases with a slower rate of addition of the reducing agent. Also, the flow index response generally increases with a faster rate of agitation during addition and reaction of the reducing agent, or a combination of slower rate of addition and faster rate of agitation. Consequently, in applications where the desired flow index response is low, the reducing agent may be added at a high feed rate over a short time period or the agitation rate decreased. Conversely, for applications where the desired flow index response is high, the reducing agent may be added at a lower feed rate over a longer period of time or the agitation rate increased.

Furthermore, in accordance with embodiments of the present techniques, the flow index response of a chromium-based catalyst may be affected by adjusting the catalyst drying temperature (and drying time). For example, the flow index response has been found to increase with a reduced drying temperature. Consequently, in applications where a higher flow index response is desired, the drying temperature may be lowered (e.g., such as from 80° C. to 60° C. in one example). Conversely, for applications where a low flow index response is desired, the drying temperature may be raised. It has also been found that lowering the catalyst drying temperature may also increase productivity of the catalyst in the downstream polymerization. Catalyst productivity is the ratio of mass of polyolefin (e.g., polyethylene) produced per mass of catalyst used in the polymerization, i.e., in the downstream polymerization reactor. In cases where the drying temperature is lowered it may be beneficial to lengthen the drying time slightly to achieve the same low residual solvent level. For instance, at a drying temperature of 70° C., the drying time may be 18 hours in one example, but if the drying temperature is lowered to 60° C., then the drying time may be 21 hours in that example to reach the same residual solvent level. Of course, other drying temperatures, drying times, and pairs of these drying temperatures and times are applicable.

Although embodiments disclosed herein include chromium oxide and silyl chromate catalysts, the scope of the disclosure should not be limited thereby. One of skill in the art would appreciate that the addition of the reducing agent could be tailored to produce a desired flow index response of other chromium-based catalysts.

Catalysts useful in embodiments disclosed herein include chromium-based catalysts, such as chromium oxide and silyl chromate-based catalysts. The catalyst system chosen for the polymerization often dictates polymer properties such as molecular weight, molecular weight distribution, and flow index.

Chromium oxide-based catalysts, for example, Phillips-type catalysts, may be formed by impregnating a Cr+3 species into silica, followed by calcination of the silica support under oxidizing conditions at about 300° C. to 900° C., and at about 400° C. to 860° C. in other embodiments. Under these conditions, at least some of the Cr+3 is converted to Cr+6. The Phillips catalyst is also commonly referred to in the prior art as inorganic oxide-supported Cr+6.

Silyl chromate catalysts are another type of inorganic oxide-supported Cr+6 catalysts which tend to produce polyethylenes with improved properties for a number of applications. The silyl chromate catalyst may be formed by dehydrating silica at about 400° C. to 850° C. in air or nitrogen, followed by contacting for specified time a silyl chromate compound, such as bis(triphenylsilyl) chromate, with the silica slurried in inert hydrocarbon solvent, then reacting the resulting product with an alkyl aluminum alkoxide, such as diethylaluminum ethoxide (DEAlE), for example, and then drying the resulting catalyst product to remove the solvent therefrom.

Cann et al., in U.S. Publication No 2005/0272886, teaches the use of aluminum alkyl activators and co-catalysts to improve the performance of chromium-based catalysts. The addition of aluminum alkyls allow for variable control of side branching, and desirable productivities, and these compounds may be applied to the catalyst directly or added separately to the reactor. Adding the aluminum alkyl compound directly to the polymerization reactor (in-situ) eliminates induction times.

Advantageously, by adjusting the addition of a reducing agent (including the feed rate and the time period over which the reducing agent is added), such as DEAlE, to the chromium-based catalyst, and optionally the agitation rate, flow index response may be tailored. In accordance with embodiments of the present techniques, the flow index response may be further tailored by adjusting the drying temperature of the catalyst.

As described herein, flow index is typically an important parameter for polyolefins applications. The flow index is a measure of the ease of flow of the melt of a thermoplastic polymer. Flow index, or I21, as used herein is defined as the weight of polymer in grams flowing in 10 minutes through a capillary of specific diameter and length by a pressure applied via a 21.6 kg load at 190° C. and is usually measured according to ASTM D-1238. The indexes I2 and I5 are similarly defined, where the pressure applied is by a load of 2.16 kg or 5 kg, respectively. I2 and I5 are also referred to as melt indexes.

The flow index is therefore a measure of the ability of a fluid to flow under pressure and temperature. Flow index is an indirect measure of molecular weight, with high flow index corresponding to low molecular weight. At the same time, flow index is inversely proportional to the viscosity of the melt at the conditions of the test, and ratios between a flow index value and a melt index value such as the ratio of I21 to I2 for one material, are often used as a measure for the broadness of a molecular weight distribution.

Flow index is, thus, a very important parameter for polyolefins. Different flow indices may be desirable for different applications. For applications such as lubricants, injection molding, and thin films, a higher flow index polyolefin may be desired, while for applications such as pipe, large drums, pails or automobile gasoline tanks, a lower flow index polyolefin may be desired. Polyolefins for a given application should therefore have a flow index sufficiently high to easily form the polymer in the molten state into the article intended, but also sufficiently low so that the mechanical strength of the final article will be adequate for its intended use.

Reactor process variables may be adjusted to obtain the desired polymer flow index and melt index when using prior art chromium-based catalysts for which the flow index response was not tailored as according to embodiments disclosed herein. For example, increasing the temperature of polymerization is known to enhance the rate of termination, but have a comparatively minor effect on the rate of propagation, as reported in M. P. McDaniel, Advances in Catalysis, Vol. 33 (1985), pp 47-98. This may result in more short chain polymers and an increase in melt index and flow index. Catalysts having a low flow index response therefore often require higher reactor temperatures, higher oxygen add-back, and higher hydrogen concentrations to produce a polymer of a given flow index.

However, there are limits on the range over which reactor process variables may be adjusted, such as, for example, reactor temperature, hydrogen and oxygen levels, without adversely affecting the polymerization process or the catalyst productivity. For example, excessively high reactor temperatures may approach the softening or melting point of the formed polymer. This may then result in polymer agglomeration and reactor fouling. Alternatively, low reactor temperatures may lead to a smaller temperature differential with respect to the cooling water, less efficient heat removal, and ultimately lowered production capacity. Further, high oxygen add-back concentrations may lead to reduced catalyst productivity, smaller average polymer particle size, and higher fines which may contribute to reactor fouling. Additionally, variations in hydrogen concentrations may impact polymer properties such as, for example, die swell which may in turn affect the suitability of a polymer for its desired application. Accordingly, adjusting reactor variables to approach operational limits may result in operational problems which may lead to premature reactor shutdown and downtime due to extensive clean-up procedures, as well as undesired gels and other undesired properties of the resulting polymer product.

The ability to tailor catalyst flow index response by adjusting the feed rate and/or time period for addition of the reducing agents alone or in combination with adjusting the agitation rate during reducing agent addition and reaction, as well as adjusting the catalyst drying temperature and time, may therefore avoid operational difficulties, reactor shutdowns, and less economical polymerization conditions. This ability to tailor catalyst flow index response may facilitate production of catalysts that give polymers with the desired properties to be more easily made. Indeed, embodiments of the techniques described herein related to increasing dispersion or mixing of the reducing agent with catalyst in a reduction mix vessel, adjusting catalyst drying temperature in the mix vessel, and the alternative of inline reduction of catalyst, may improve control of flow index in viable operating regimes.

The chromium-based catalyst compositions disclosed herein may include chromium-based catalysts and reducing agents. The chromium-based catalysts used in embodiments of the present disclosure may include chromium oxide catalysts, silyl chromate catalysts, or a combination of both chromium oxide and silyl chromate catalysts.

The chromium compounds used to prepare chromium oxide catalysts may include CrO3 or any compound convertible to CrO3 under the activation conditions employed. Many compounds convertible to CrO3 are disclosed in U.S. Pat. Nos. 2,825,721, 3,023,203, 3,622,251, and 4,011,382 and include chromic acetyl acetonate, chromic halide, chromic nitrate, chromic acetate, chromic sulfate, ammonium chromate, ammonium dichromate, or other soluble, chromium containing salts. In some embodiments, chromic acetate may be used.

The silyl chromate compounds used to prepare the silyl chromate catalysts disclosed herein may include bis-triethylsilyl chromate, bis-tributylsilyl chromate, bis-triisopentylsilyl chromate, bis-tri-2-ethylhexylsilyl chromate, bis-tridecylsilyl chromate, bis-tri(tetradecyl)silyl chromate, bis-tribenzylsilyl chromate, bis-triphenylethylsilyl chromate, bis-triphenylsilyl chromate, bis-tritolylsilyl chromate, bis-trixylylsilyl chromate, bis-trinaphthylsilyl chromate, bis-triethylphenylsilyl chromate, bis-trimethylnaphthylsilyl chromate, polydiphenylsilyl chromate, and polydiethylsilyl chromate. Examples of such catalysts are disclosed, for example, in U.S. Pat. Nos. 3,324,101, 3,704,287, and 4,100,105, among others. In some embodiments, bis-triphenylsilyl chromate, bis-tritolylsilyl chromate, bis-trixylylsilyl chromate, and bis-trinaphthylsilyl chromate may be used. In other embodiments, bis-triphenylsilyl chromate may be used.

In some embodiments of the present disclosure, the silyl chromate compounds may be deposited onto conventional catalyst supports or bases, for example, inorganic oxide materials. In some embodiments of the present disclosure, the chromium compound used to produce a chromium oxide catalyst may be deposited onto conventional catalyst supports. The term "support," as used herein, refers to any support material, a porous support material in one exemplary embodiment, including inorganic or organic support materials. In some embodiments, desirable carriers may be inorganic oxides that include Group 2, 3, 4, 5, 13 and 14 oxides, and more particularly, inorganic oxides of Group 13 and 14 atoms. The Group element notation in this specification is as defined in the Periodic Table of Elements according to the IUPAC 1988 notation (IUPAC Nomenclature of Inorganic Chemistry 1960, Blackwell Publ., London). Therein, Groups 4, 5, 8, 9 and 15 correspond respectively to Groups IVB, VB, IIIA, IVA and VA of the Deming notation (Chemical Rubber Company's Handbook of Chemistry & Physics, 48th edition) and to Groups IVA, VA, IIIB, IVB and VB of the IUPAC 1970 notation (Kirk-Othmer Encyclopedia of Chemical Technology, 2nd edition, Vol. 8, p. 94). Non-limiting examples of support materials include inorganic oxides such as silica, alumina, titanic, zirconia, thoria, as well as mixtures of such oxides such as, for example, silica-chromium, silica-alumina, silica-titania, and the like.

The inorganic oxide materials which may be used as a support in the catalyst compositions of the present disclosure are porous materials having variable surface area and particle size. In some embodiments, the support may have a surface area in the range of 50 to 1000 square meters per gram, and an average particle size of 20 to 300 micrometers. In some embodiments, the support may have a pore volume of about 0.5 to about 6.0 cm3/g and a surface area of about 200 to about 600 m2/g. In other embodiments, the support may have a pore volume of about 1.1 to about 1.8 cm3/g and a surface area of about 245 to about 375 m2/g. In some other embodiments, the support may have a pore volume of about 2.4 to about 3.7 cm3/g and a surface area of about 410 to about 620 m2/g. In yet other embodiments, the support may have a pore volume of about 0.9 to about 1.4 cm3/g and a surface area of about 390 to about 590 m2/g. Each of the above properties may be measured using conventional techniques as known in the art.

In some embodiments, the support materials comprise silica, particularly amorphous silica, and most particularly high surface area amorphous silica. Such support materials are commercially available from a number of sources. Such sources include the W.R. Grace and Company which markets silica support materials under the trade names of Sylopol 952 or Sylopol 955, and PQ Corporation, which markets silica support materials under various trade designations, including ES70. The silica is in the form of spherical particles, which are obtained by a spray-drying process. Alternatively, PQ Corporation markets silica support materials under trade names such as MS3050 which are not spray-dried. As procured, all of these silicas are not calcined (i.e., not dehydrated). However, silica that is calcined prior to purchase may be used in catalysts of the present disclosure.

In other embodiments, supported chromium compounds, such as chromium acetate, which are commercially available, may also be used. Commercial sources include the W.R. Grace and Company which markets chromium on silica support materials under trade names such as Sylopol 957, Sylopol 957HS, or Sylopol 957BG, and PQ Corporation, which markets chromium on silica support materials under various trade names, such as ES370. The chromium on silica support is in the form of spherical particles, which are obtained by a spray-drying process. Alternatively, PQ Corporation markets chromium on silica support materials under trade names such as C35100MS and C35300MS which are not spray-dried. As procured, all of these silicas are not activated. However, if available, chromium supported on silica that is activated prior to purchase may be used in catalysts of the present disclosure.

Activation of the supported chromium oxide catalyst can be accomplished at nearly any temperature from about 300° C. up to the temperature at which substantial sintering of the support takes place. For example, activated catalysts may be prepared in a fluidized-bed, as follows. The passage of a stream of dry air or oxygen through the supported chromium-based catalyst during the activation aids in the displacement of any water from the support and converts, at least partially, chromium species to Cr+6.

Temperatures used to activate the chromium-based catalysts are often high enough to allow rearrangement of the chromium compound on the support material. Peak activation temperatures of from about 300° C. to about 900° C. for periods of from greater than 1 hour to as high as 48 hours are acceptable. In some embodiments, the supported chromium oxide catalysts are activated at temperatures from about 400° C. to about 850° C., from about 500° C. to about 700° C., and from about 550° C. to about 650° C. Exemplary activation temperatures are about 600° C., about 700° C., and about 800° C. Selection of an activation temperature may take into account the temperature constraints of the activation equipment. In some embodiments, the supported chromium oxide catalysts are activated at a chosen peak activation temperature for a period of from about 1 to about 36 hours, from about 3 to about 24 hours, and from about 4 to about 6 hours. Exemplary peak activation times are about 4 hours and about 6 hours. Activation is typically carried out in an oxidative environment; for example, well dried air or oxygen is used and the temperature is maintained below the temperature at which substantial sintering of the support occurs. After the chromium compounds are activated, a powdery, free-flowing particulate chromium oxide catalyst is produced.

The cooled, activated chromium oxide catalyst may then be slurried and contacted with a reducing agent, fed at a selected feed rate over a selected time period, to result in a catalyst composition having a flow index response within a selected range. The solvent may then be substantially removed from the slurry to result in a dried, free-flowing catalyst powder, which may be fed to a polymerization system as is or slurried in a suitable liquid prior to feeding.

In a class of embodiments, because organometallic components used in the preparation of the catalysts and catalyst compositions of the present disclosure may react with water, the support material should preferably be substantially dry. In embodiments of the present disclosure, for example, where the chromium-based catalysts are silyl chromates, the untreated supports may be dehydrated or calcined prior to contacting with the chromium-based catalysts.

The support may be calcined at elevated temperatures to remove water, or to effectuate a chemical change on the surface of the support. Calcination of support material can be performed using any procedure known to those of ordinary skill in the art, and the present invention is not limited by the calcination method. One such method of calcination is disclosed by T. E. Nowlin et al., "Ziegler-Natta Catalysts on Silica for Ethylene Polymerization," J. Polym. Sci., Part A: Polymer Chemistry, vol. 29, 1167-1173 (1991).

For example, calcined silica may be prepared in a fluidized-bed, as follows. A silica support material (e.g. Sylopol 955), is heated in steps or steadily from ambient temperature to the desired calcining temperature (e.g., 600° C.) while passing dry nitrogen or dry air through or over the support material. The silica is maintained at about this temperature for about 1 to about 4 hours, after which it is allowed to cool to ambient temperature. The calcination temperature primarily affects the number of OH groups on the support surface; i.e., the number of OH groups on the support surface (silanol groups in the case of silica) is approximately inversely proportional to the temperature of drying or dehydration: the higher the temperature, the lower the hydroxyl group content.

In some embodiments of the present disclosure, support materials are calcined at a peak temperature from about 350° C. to about 850° C. in some embodiments, from about 400° C. to about 700° C. in other embodiments, and from about 500° C. to about 650° C. in yet other embodiments. Exemplary calcination temperatures are about 400° C., about 600° C., and about 800° C. In some embodiments, total calcination times are from about 2 hours to about 24 hours, from about 4 hours to about 16 hours, from about 8 hours to about 12 hours. Exemplary times at peak calcination temperatures are about 1 hour, about 2 hours, and about 4 hours.

In some embodiments, the silyl chromate compound may be contacted with the calcined support to form a "bound catalyst." The silyl chromate compound may then be contacted with the calcined support material in any of the ways known to one of ordinary skill in the art. The silyl chromate compound may be contacted with the support by any suitable means, such as in a solution, slurry, or solid form, or some combination thereof, and may be heated to any desirable temperature, for a specified time sufficient to effectuate a desirable chemical/physical transformation.

This contacting and transformation are usually conducted in a non-polar solvent. Suitable non-polar solvents may be materials which are liquid at contacting and transformation temperatures and in which some of the components used during the catalyst preparation, i.e., silyl chromate compounds and reducing agents are at least partially soluble. In some embodiments, the non-polar solvents are alkanes, particularly those containing about 5 to about 10 carbon atoms, such as pentane, isopentane, hexane, isohexane, n-heptane, isoheptane, octane, nonane, and decane. In other embodiments, cycloalkanes, particularly those containing about 5 to about 10 carbon atoms, such as cyclohexane and methylcyclohexane, may also be used. In yet other embodiments, the non-polar solvent may be a solvent mixture. Exemplary non-polar solvents are isopentane, isohexane, and hexane. In some embodiments isopentane may be used due to its low boiling point which makes its removal convenient and fast. The non-polar solvent may be purified prior to use, such as by degassing under vacuum and/or heat or by percolation through silica gel and/or molecular sieves, to remove traces of water, molecular oxygen, polar compounds, and other materials capable of adversely affecting catalyst activity.

The mixture may be mixed for a time sufficient to support or react the silyl chromate compound on the silica support. The reducing agent may then be contacted with this slurry, where the reducing agent is fed at a selected feed rate over a selected time period to result in a catalyst having a flow index response within a selected range. Alternatively, after supporting the silyl chromate compound on the support, and before adding the reducing agent, the solvent may then be substantially removed by evaporation, to yield a free-flowing supported silyl chromate on support. The thus supported silyl chromate may be re-slurried in the same or a different non-polar solvent and contacted with a reducing agent to result in a selected flow index response.

Once the catalyst is supported, and in the case of chromium oxide catalysts, activated, the chromium-based catalyst composition may then be slurried in a non-polar solvent, prior to the addition of the reducing agent. The supported catalyst may be chromium oxide supported catalysts, silyl chromate catalysts, or a mixture of both. This slurry is prepared by admixture of the supported catalyst with the non-polar solvent. In some embodiments, the supported silyl chromate compound is not dried before the addition of the reducing agent, but instead is left slurried in the non-polar solvent for reasons such as reduced costs.

The chromium-based catalysts of the present disclosure are then contacted with a reducing agent. Reducing agents used may be organoaluminum compounds such as aluminum alkyls and alkyl aluminum alkoxides. Alkyl aluminum alkoxides, of the general formula R2AlOR, may be suitable for use in embodiments of this disclosure. The R or alkyl groups of the above general formula may be the same or different, may have from about 1 to about 12 carbon atoms in some embodiments, about 1 to about 10 carbon atoms in other embodiments, about 2 to about 8 carbon atoms in yet other embodiments, and about 2 to about 4 carbon atoms in further embodiments. Examples of the alkyl aluminum alkoxides include, but are not limited to, diethyl aluminum methoxide, diethyl aluminum ethoxide, diethyl aluminum propoxide, diethyl aluminum iso-propoxide, diethyl aluminum tert-butoxide, dimethyl aluminum ethoxide, di-isopropyl aluminum ethoxide, di-isobutyl aluminum ethoxide, methyl ethyl aluminum ethoxide and mixtures thereof. Although the examples use diethyl aluminum ethoxide (DEAlE), it should be understood that the disclosure is not so limited. In the examples that follow, where DEAlE is used, other aluminum alkyls (e.g., trialkylaluminum, triethylaluminum or TEAL, etc.) or alkyl aluminum alkoxides, or mixtures thereof may be used.

The reducing agent may be added to a mixture of a supported silyl chromate catalyst with a non-polar solvent in a catalyst mix vessel or other catalyst preparation vessel. The reducing agent may be added to a mixture of an activated chromium oxide catalyst with a non-polar solvent in a catalyst mix vessel. The reducing agent may be added to a mixture of silyl chromate catalysts and activated chromium oxide-based catalyst in a non-polar solvent in a catalyst mix vessel. When both chromium oxide-based catalysts and silyl chromate-based catalysts are employed together in this disclosure, each catalyst is typically deposited on a separate support and receives different calcination or activation treatments prior to mixing together. Again, the reducing agent may include an organoaluminum compound, an aluminum alkyl, an alkyl aluminum alkoxide such as diethylaluminum ethoxide (DEAlE), an trialkylaluminum such as triethylaluminum (TEAL), a mixture of DEAlE and TEAL, and other organoaluminum compounds, and so forth.

The addition of the reducing agent to the catalyst slurry may be conducted at elevated temperatures and under an inert atmosphere, such as up to 7 bar (100 psig) nitrogen head pressure. For example, the slurry may be maintained at a temperature between about 30° C. and 80° C. during admixture of the reducing agent. In other embodiments, the slurry may be maintained at a temperature between about 40° C. and about 60° C. In other embodiments, the slurry may be maintained at a temperature between about 40° C. and about 50° C., such as about 45° C.

To achieve a catalyst composition or reduced catalyst having a desired flow index response, or a flow index response within a selected range, and which makes polymer with desired attributes, the reducing agent may need to be well-dispersed over the catalyst mixture and throughout each particle. Alternatively, to obtain a catalyst composition which has a different flow index response or polymer with other attributes, the reducing agent may need to be non-uniformly dispersed over the catalyst particles and/or within each particle. The degree of non-uniformity may be determined by the desired polymer attributes (such as molecular weight and breadth of molecular weight distribution) and by the desired catalyst flow index response under a given set of reactor conditions. To this end, the reducing agent is added at a selected feed rate over a selected time period to the slurry of the chromium-based catalyst, where the slurry may be stirred at a selected agitation rate. For example, to achieve a catalyst composition with low flow index response, the total amount of reducing agent to be combined with the catalyst slurry may be added over a short time period and/or at a slow agitation rate. Conversely, to achieve a catalyst composition with a higher flow index response, the total amount of reducing agent may be added over a longer time period. In this case the agitation rate may be slow, medium, or rapid so as to further tailor the flow index response. In some examples, the reducing agent may be added over time period ranges of 5 seconds to 120 minutes, 1 to 5 minutes, 5 to 15 minutes, 10 to 110 minutes, 30 to 100 minutes, and so forth. For example, where the catalyst composition includes a silyl chromate, the reducing agent may be added over a time period ranging from about 30 seconds to about 10 minutes. After the addition of the reducing agent, the reducing agent may be allowed to react with the catalyst slurry for a specified reaction time. In some embodiments, the reducing agent may be allowed to react with the catalyst slurry for a reaction time in the ranges of from about 5 minutes to about 240 minutes, or about 30 minutes to about 180 minutes, and so on.

As mentioned, the flow index response may be influenced by agitation. Catalyst preparations with similar ratios or loadings of reducing agent to chromium or catalyst and made with equivalent addition rates and times, may result in catalysts having different flow index responses, resulting from differing degrees of agitation in the catalyst mix vessel during the addition and reaction of the reducing agent. Agitators useful for performing the agitation during catalyst preparation methods disclosed herein may include helical ribbon agitators and conical agitators. In some embodiments, agitators may include a combination-type agitator, such as combination of a helical ribbon type agitator or a conical agitator with an auger, turbine impeller, paddle, or other type of blending device, where the different agitator types may be operated at the same or different rpm's.

Increased agitation rates may provide catalysts with a higher flow index response compared with decreased agitation rates that provide catalysts with lower flow index response. One particular benefit for some embodiments is that higher agitation rates may be used to facilitate the reducing-agent addition rate to be increased (and the addition time to be decreased) while resulting in a catalyst having an equivalent flow index response. As used herein, "agitation rate" generally refers to the specific rpm of the impeller for a ribbon blender or other agitation devices where agitator diameter does not play an important role in the degree of agitation achieved, and refers to the impeller tip speed for agitators where agitator diameter affects the degree of mixing, such as for a turbine impeller. Agitation rates useful herein may be dependent on the size of the reactor and upon the type of impeller. In some embodiments, such as when using a helical ribbon impeller, the agitation rate may be in the range of from about 5 to about 200 rpm, from about 10 to about 180 rpm, from about 15 rpm to about 50 rpm, and the like.

Other techniques such as employing fluid jet streams introduced into the mix vessel, and other mixing techniques, may be utilized in addition to or in lieu of the impeller agitator to agitate or mix the slurry in the mix vessel. In embodiments employing a rotating agitator having a shaft and impeller(s), a smaller batch size in certain embodiments may lead to higher flow index response of DEAlE-reduced chromium oxide catalysts. While not wanting to be confined by theory, this may be due to one or more of the following: better mixing at the slurry surface of any aggregates or gels that form and/or of the DEAlE being added due to the slurry surface being below the top of the impeller; shorter overall batch height so better top to bottom mixing of DEAlE with the solids; greater velocity of penetration of the added DEAlE stream into the slurry surface due to falling a greater height; or differences in drying profiles that may result from smaller batch size.

During the reduction reaction, for a relatively larger batch size, the level of the slurry mixture in the mix vessel may be maintained above the impeller region along the shaft of the agitator. For a relatively smaller batch size, the level of the slurry mixture in the mix vessel may be maintained in or at the impeller region along the shaft of the agitator. As can be appreciated, agitators including the aforementioned helical ribbon agitators and other agitators generally have an impeller(s) disposed along the shaft of the agitator. In examples, the upper portion of the agitator shaft may be free of an impeller. Thus, for a larger batch size, the level of the slurry in the mix vessel may rise to this impeller-free region at the upper portion of the agitator shaft. On the other hand, for a small batch size in certain examples, the level of the slurry in the mix vessel may be below this impeller-free region, and instead in an impeller region of the agitator.

Nevertheless, reducing agent is typically added to the surface of the slurry in the mix vessel. Other locations for adding the reducing agent may be used to further tailor the flow index response of the catalyst. Selected feed rates and selected addition times may be interrupted briefly to allow for refill of a reducing agent feed vessel or when an empty reducing-agent supply container is replaced. It is not believed that a brief interruption in reducing agent flow significantly affects the resulting flow index response of the catalyst. Moreover, the feed system may have a reducing-agent charge vessel large enough to avoid interruption while a reducing-agent supply container or shipping vessel is replaced. As discussed in detail below, the reducing agent may be added to the mix vessel such that the dispersion of the reducing agent into the reduction reaction slurry mixture is increased.

In some embodiments, contacting of the reducing agent and the chromium-based catalyst may occur at a selected reducing agent feed rate over a selected time at a selected agitation rate, followed by a specified subsequent catalyst drying line-out temperature, resulting in a catalyst composition having a flow index response within a selected range. For example, in commercial scale catalyst manufacturing equipment, increased agitation may provide a catalyst with higher flow index response yet allow the reducing agent to be added at faster rates, reducing batch cycle time and manpower needs. In another example, where existing commercial scale catalyst manufacturing equipment is limited in agitation rate, the reducing agent may be added slowly to obtain a desired tailoring to a high flow index response. Moreover, the drying temperature or drying line-out temperature of the catalyst may be decreased (e.g., by 10° C., 15° C., or 20° C., such as decreasing the drying temperature to 60° C. from 70° C., 75° C. or 80° C. in certain examples) to obtain a desired tailoring to a high flow index response.

In some exemplary embodiments, the chromium-based catalyst may be a silica-supported chromium oxide catalyst. This silica-supported chromium oxide may be prepared from chromic acetate on silica precursors, commercially available under trade names such as Sylopol 957HS, from W.R. Grace and Company, and C35100MS, or C35300MS, from PQ Corporation. The chromic acetate on silica precursors may be heated to temperatures of about 600° C. for about six hours under oxidizing conditions to produce a chromium oxide catalyst. The temperature ramp rates during heating may be specified, for example, in the range of 40 to 120° C. per hour, and several holds at specified temperatures may be conducted for purposes such as allowing moisture and other surface species to be released and purged from the vessel to enhance higher conversion of Cr+3 to Cr+6. In examples, the fluidization gas is often nitrogen initially, until the end of a hold at a temperature from 300 to 500° C. in which some of the organic fragments are decomposed. Then a switch to air as fluidizing gas may occur in which remaining organics are combusted and a temperature exotherm occurs. In embodiments, after the oxidation step, the activated chromium oxide catalyst is cooled and transferred to an agitated catalyst mix vessel. An amount of non-polar hydrocarbon solvent, such as isopentane, may be added to form a slurry in which the solids are sufficiently suspended.

A selected amount of DEAlE may then be added to the chromium oxide catalyst over an addition time period in the range of about 30 seconds to about 500 minutes, while agitating the resultant mixture at an agitation rate in the range of about 15 rpm to about 200 rpm. In other embodiments, the selected time period may be within the range from about 30 minutes to about 240 minutes; from about 60 minutes to about 180 minutes in other embodiments; and from about 90 to about 120 minutes in yet other embodiments. In some embodiments, a selected amount of DEAlE may be added to the chromium oxide catalyst over a time period in the range of about 40 to about 80 minutes, while agitating the resultant mixture at an agitation rate of 30-40 rpm. The mixture may then be allowed to react for a reaction time in the range of from about 30 minutes to about 180 minutes.

In other embodiments, the chromium-based catalyst may be a silica-supported silyl chromate catalyst. This silica-supported silyl chromate catalyst may be prepared from a silica support calcined at temperatures of about 600° C. for a time period in the range of from about one hour to about four hours and subsequently allowed to react with bis (triphenylsilyl)chromate, for example, in a slurry in non-polar hydrocarbon solvent such as isopentane. A selected amount of DEAlE may then be added to the slurry of silyl chromate catalyst over an addition time period in the range of about 0.5 to about 10 minutes, while agitating the resultant mixture at an agitation rate in the range of about 15 rpm to about 50 rpm. In a particular embodiment, a selected amount of DEAlE may be added to the silyl chromate catalyst over a time period in the range of about 1 to about 3 minutes, while agitating the resultant mixture at an agitation rate in the range of 30-40 rpm. The mixture may then be allowed to react for a reaction time in the range of from about 30 minutes to about 180 minutes.

In various embodiments, the selected agitation rate may be less than 70 rpm and the selected reducing agent addition time may be less than 20 minutes. In other embodiments, the selected agitation rate may be greater than 70 rpm and the selected reducing agent addition time may be less than 20 minutes. In yet other embodiments, the selected agitation rate may be greater than 70 rpm and the selected reducing agent addition time may be greater than 20 minutes.

After addition of the reducing agent followed by a suitable period of time to allow for reaction, such as 0 to 2 hours, the catalyst slurry is heated further to remove the non-polar solvent. The drying may result in the slurry transitioning from a viscous slurry to a partially dried slurry or mud to a free-flowing powder. Accordingly, helical ribbon agitators may be used in vertical cylindrical mix vessels to accommodate the varying mixture viscosities and agitation requirements. The agitators may have single or double helical ribbons and may optionally include a central shaft auger or other more complex secondary agitator. Drying may be conducted at pressures above, below, or at normal atmospheric pressure as long as contaminants such as oxygen are generally strictly excluded. Exemplary drying temperatures may range from 0° C. to as much as 100° C., from about 40° C. to about 85° C., from about 50° C. to about 75° C., from about 55° C. to about 65° C., and the like. Exemplary drying times may range from about 1 to about 48 hours, from about 3 to about 26 hours, from about 5 to about 20 hours, and so forth. In a particular example of a drying temperature of about 60° C., the drying time is extended to about 21 hours or more in that particular example. Following the drying process, the catalyst may be stored under an inert atmosphere until use.

As described above, the flow index response of chromium-based catalysts may be tailored to meet various commercial needs by the controlled addition of a reducing agent to a slurry of supported chromium solid in a non-polar solvent under controlled agitation. For a given chromium-based catalyst, the supported chromium solid may be slurried, contacted with a selected quantity of a reducing agent fed at a selected feed rate over a selected time period at a selected agitation rate, resulting in a desired chromium to reducing agent ratio or in a desired chromium loading on the catalyst. The solvent used to slurry the catalyst may then be removed, such as by drying at an adjustable drying temperature, to give a dry, free-flowing catalyst composition. The chromium-based catalyst has a selected flow index response for making polymer with desired polymer attributes. This catalyst composition may then be fed to a polymerization reactor as is or slurried in a suitable liquid prior to feeding to a polymerization reactor.

Although the general procedure outlined above may apply to chromium catalysts in general, the procedure may be altered according to the particular type of chromium-based catalyst being used. For example, the above procedure may be manipulated for silyl chromate-based catalysts and for chromium oxide-based catalysts, the latter typically requiring an activating step or an oxidizing step to generate the desired Cr+6 species prior to reduction. Additionally, the process may be adjusted depending upon whether the entire catalyst preparation is conducted, or whether a supported chromium compound is purchased and treated according to embodiments described herein.

Chromium-based catalysts formed by the above described processes may have a chromium loading on the support ranging from about 0.15 to about 3 weight percent in some embodiments; from about 0.2 to about 0.3 weight percent in other embodiments; from about 0.4 to about 0.6 weight percent in other embodiments; and from 0.7 to about 1.2 weight percent in other embodiments. Chromium-based catalysts formed by the above described processes may have a reducing agent to chromium molar ratio ranging from about 0.5 to about 8 in some embodiments; from about 2 to about 7 in other embodiments; and from about 3.0 to about 5.5 in yet other embodiments.

Exemplary Reduction of Chromium-Based Catalyst

In view of the foregoing including the aforementioned materials, equipment, and techniques, FIG. 1 is an exemplary catalyst reducing system 100 having a mix vessel 102 for treating a chromium-based catalyst 104 to give a reduced chromium-based catalyst 106 which may be used in the polymerization of olefin into polyolefin. The incoming catalyst 104 may generally be a supported catalyst, e.g., supported on silica such as silica dioxide or SiO2. Of course, other catalyst supports are applicable. Furthermore, the catalyst 104 may already be activated. In certain embodiments, the chromium-based catalyst 104 is activated in an upstream catalyst activation system (not shown) prior to being fed to the mix vessel 102.

The catalyst 104 stream fed to the mix vessel 102 may be a dry catalyst 104 or a mixture of the catalyst 104 and an inert solvent or mineral oil, and so forth. The inert solvent may be an alkane such as isopentane, hexane, and the like. The catalyst 104 may be provided from an upstream storage vessel, feed tank, or container, for instance. In particular, the catalyst 104 may be pumped (via a pump) or pressured-transferred (via nitrogen or solvent pressure, for example) through piping from the storage vessel, feed tank, or container to the mix vessel 102.

In one example, the catalyst 104 is a dry catalyst powder and is nitrogen-conveyed from a storage vessel. The storage vessel may be on weigh cells to indicate the amount or weight of catalyst fed to the mix vessel 102. The amount (e.g., pounds) of catalyst 104 conveyed to the mix vessel 102 may be specified for the charge. A solvent 107 (e.g., non-polar hydrocarbon solvent), such as isopentane, is added to form a slurry in the mix vessel 102 in which at least a majority of the catalyst 104 solids are suspended. A specified amount of solvent 107 may be added for a given batch reduction in the mix vessel 102. The solvent 107 may be introduced directly to the mix vessel 102, as shown, or may be added, for example, through the same feed port or nozzle used by the reducing agent 108, typically before the reducing agent is fed.

While the reducing system 100 may be a continuous, semi-batch, or batch system, the illustrated embodiment is generally a batch system in a sense that a charge of catalyst 104 is fed to the mix vessel 102, a charge of solvent 107 is fed to the mix vessel 102, agitation begun, and a charge of reducing agent 108 is fed over time to the mix vessel 102 for a given charge of catalyst 104. Of course, other configurations and actions are applicable. The residence time of the charge of catalyst 104 in the mix vessel 102 gives reaction of substantially all of the present reducing agent 108 with the catalyst 104 to produce the reduced catalyst 106.

The reducing agent 108 supplied to the mix vessel 102 may generally be an organoaluminum compound and may be neat or diluted in a non-polar solvent. As discussed above, a variety of reducing agents and inert solvents may be employed. Moreover, additional solvent may be added to the mixture in the mix vessel 102. In a particular example, the reducing agent 108 is DEAlE, and the reducing agent 108 stream is 25 weight percent DEAlE in isopentane. Of course, the DEAlE may be diluted at other concentrations and in other solvents.

In operation, a charge of the activated catalyst 104 is fed to the mix vessel 102. A charge of solvent 107 may be fed to the mix vessel 102 and agitation started, including prior to the introduction of reducing agent 108. In embodiments, the catalyst 104 may be fed in solvent to the mix vessel 102. In a particular example, the activated catalyst 104 is fed in an isopentane charge to the mix vessel 102. A reducing agent 108, also optionally diluted in solvent, is added at an adjustable feed rate to the mix vessel 102 to react with the catalyst 104. Note that for embodiments with the reducing agent 108 diluted in solvent, additional solvent 107 may be further added, including prior to the addition of the reducing agent 108 stream for a given batch. In one example, the reaction or reduction reaction in the mix vessel is conducted at a temperature at about 45° C., or at within 2° C. of about 45° C., and at a pressure of about 30 pounds per square inch gauge (psig). Other temperatures and pressures are applicable.

In certain embodiments, the length of time of feeding the reducing agent 108 to the mix vessel 102 may be as long as 40 minutes and greater. At the conclusion of feeding the reducing agent 108, the contents of the mix vessel 102 may be given additional residence time for reaction of the reducing agent 108 with catalyst in the mix vessel 102. The catalyst may be subsequently dried, such as in place in the mix vessel 102, to drive off solvent 110 to give a product (reduced) catalyst 106 that is substantially dry. The reduced chromium-based catalyst 106 may be discharged to a collection vessel 112, such as a storage vessel or container (e.g., cylinder), and the like. Generally, the collection vessel 112 may have a substantially inert atmosphere.

Figure 2:
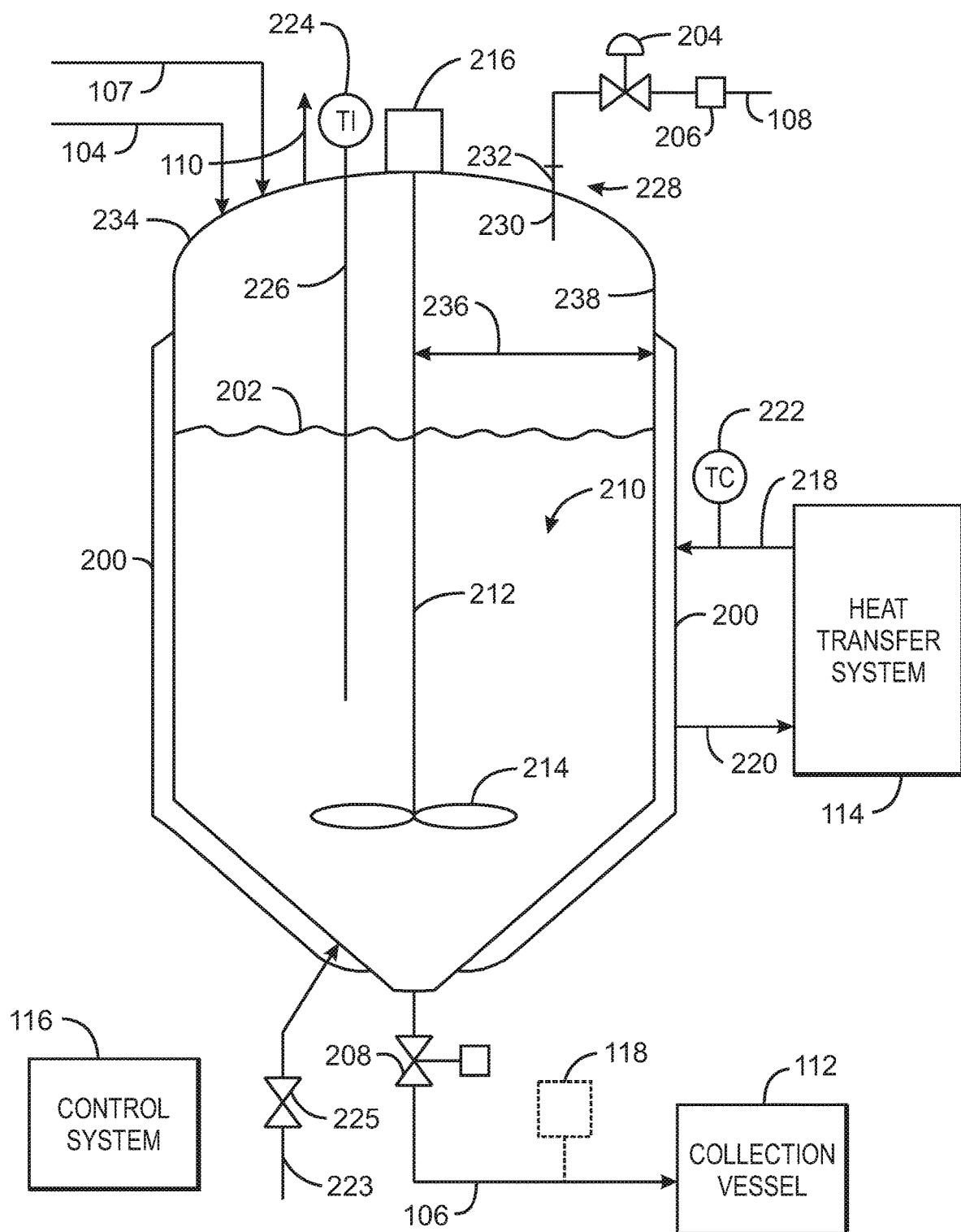
FIG. 2 is a simplified process flow diagram of the reducing system of FIG. 1 in accordance with embodiments of the present techniques.

Further, as indicated in the discussion throughout this disclosure, the mix vessel 102 may typically have an agitator, e.g., agitator 210 in FIG. 2, to agitate and mix the contents (catalyst, reducing agent, solvent, etc.) in the mix vessel 102. Both the feed rate (e.g., in mass per time or volume per time) of the reducing agent 108 to the mix vessel 102, and the agitation rate (e.g., in revolutions per minute or rpm) of the mix vessel 102 agitator may be adjusted to give a desired or specified flow index response of the reduced chromium-based catalyst 106.

Additionally, after the reaction of the reducing agent 108 with the catalyst 104 in the mix vessel 102, the produced reduced catalyst 106 may be dried such as in place in the mix vessel 102. Indeed, after the reaction of the reducing agent 108 with the catalyst (in one example, at a reaction temperature of 45° C.), the catalyst drying temperature (e.g., 55° C., 60° C., 65° C., 70° C., 75° C., 80° C., 85° C., etc.) or drying line-out temperature may be adjusted to give a desired or specified flow index response of the reduced chromium-based catalyst 106.

In the illustrated embodiment, a heat transfer system 114 provides a heat transfer medium to a jacket of the mix vessel 102 to heat or cool the contents of the mix vessel 102 to give the desired temperature, including the reaction temperature and the subsequent catalyst drying temperature or drying line-out temperature, of the mix vessel 102 contents. As discussed below with respect to FIG. 2, the heat transfer system 114 may include heat exchangers to provide for cooling and heating of the heat transfer medium. Moreover, as would be plainly understood by one of ordinary skill in the art with the benefit of the present disclosure, the mix vessel 102 contents including the catalyst may be at the reaction temperature or the drying temperature, or may approach and reach near (e.g., within 4° C.) the reaction temperature or the drying temperature, depending on the temperature control scheme employed.

In some embodiments, the heat transfer system 114 and the control system 116 may directly control the temperature of the contents in the mix vessel 102. In other words, a temperature set point may be specified and input for the contents of the mix vessel 102, and the operating temperature of the contents of the mix vessel 102 controlled to set point by adjusting the temperature of the heat transfer medium to the jacket of the mix vessel 102. Thus, for an exemplary reaction temperature of 45° C., the temperature set point is specified as 45° C. and the contents of the mix vessel measured and maintained at 45° C. during the reduction reaction. Similarly, for an exemplary drying temperature of 60° C., the temperature set point is specified at 60° C. and the contents of the mix vessel measured and maintained at 60° C. In such embodiments, the temperature controller for the mix vessel 102 contents that receives the entered set point for reaction temperature and drying temperature may be a master controller. This master controller may provide a secondary set point to a slave temperature controller that adjusts the temperature of the heat transfer medium supply to the jacket of the mix vessel 102 to maintain the contents of the mix vessel 102 at the primary set point of reaction temperature or drying temperature.

However, in other embodiments, a master/slave control configuration is not employed. Instead, the temperature of the heat transfer medium (e.g., the supply to the jacket) is designated with a specified and entered set point as the jacket temperature for the reaction temperature or drying temperature. Thus, for an exemplary reaction temperature of 45° C., the mix vessel 102 jacket temperature set point is specified as 45° C., the jacket temperature measured and maintained at 45° C. during the reduction reaction, and the temperature of the mix vessel 102 contents is at about 45° C. at steady state during the reduction reaction. The steady-state temperature of the mix vessel 102 contents with the jacket temperature set point as the reaction temperature may generally be the reaction temperature. In other words, due to the exothermic nature of the reduction reaction, the temperature of the mix vessel 102 contents may generally be the same or similar as or slightly higher than the jacket temperature during steady state of the reduction reaction. However, for an exemplary drying temperature of 60° C., the mix vessel 102 jacket temperature set point is specified as 60° C., the jacket temperature measured and maintained at 60° C. during drying of the reduced catalyst 106, and the temperature of the mix vessel 102 contents including the catalyst 106 reaches and lines out near 60° C. (e.g., about 64° C.) at steady state during drying. The steady-state temperature of the mix vessel 102 contents for the jacket temperature set point as the drying temperature is defined herein as the drying line-out temperature. In all, for a mix vessel 102 jacket temperature as a primary set point, the contents of the mix vessel 102 may reach a line-out temperature near (e.g., within 4° C.) the jacket temperature. It should be noted that when controlling to the jacket temperature set-point as the drying temperature, the drying line-out temperature (e.g., catalyst temperature of 64° C.) may exceed the drying temperature (e.g., jacket temperature of 60° C.) due to the heat contribution added by the mechanical energy of the agitator or agitation, for instance, In certain embodiments during the catalyst 106 drying, the pressure of the mix vessel 102 may be decreased, including incrementally, to as low as about 1 psig or even to a vacuum to facilitate the drying of the catalyst 106 in the mix vessel 102. During drying, including when the pressure is lowered, such as to 1 psig or to a vacuum, the temperature of the reduced catalyst may decrease substantially below the jacket temperature and below the drying or drying line-out temperature of the contents in the mix vessel 102. As drying proceeds further and nears completion, the mix vessel 102 contents temperature may climb near to the jacket temperature and reach a substantially constant temperature. As mentioned, this substantially constant temperature of the solid material may be referred to as the drying line-out temperature and is what may be manipulated to adjust the flow index response of the catalyst. Generally, the drying line-out temperature may be within a few degrees of the jacket temperature for a heat transfer system that controls the jacket temperature to set point. For instance, again, a drying temperature of 60° C. (jacket temperature) may give a drying line-out temperature of about 64° C. (temperature of the contents in the mix vessel) in a particular example. As for drying process behavior in certain examples, the pressure in the mix vessel 102 may be reduced at the beginning of drying, and the jacket temperature set (e.g., raised) to the drying temperature of 60° C., for instance. However, the catalyst 106 slurry temperature in the mix vessel 102 may initially decrease to as low as about 30° C. or lower, for example, due to solvent evaporative cooling. Generally, once the free liquid outside of the catalyst pores and on the surface of the catalyst is evaporated, the catalyst temperature may start climbing toward and beyond the drying temperature (jacket temperature of 60° C. in these examples) to a drying line-out temperature (e.g., 64° C.). The time for the catalyst in the mix vessel 102 to reach 60° C. and the eventual drying line-out temperature of 64° C. may be several hours. Thus, in certain instances, a reported drying time of 18 hours, for example, may represent 6-9 hours of the catalyst at a drying line-out temperature (e.g., 64° C.) near (within 4° C.) the drying temperature of 60° C. (jacket temperature). Of course, other drying and drying line-out temperature and times, and drying process behaviors are applicable.

A control system 116 may provide for control and adjustment of the aforementioned process variables in the catalyst preparation and reduction. The process variables may include feed rate of reducing agent 108 and the agitation rate (rpm) of the agitator. The process variables may include the reaction temperature, pressure, and hold time in the mix vessel 102, and the drying temperature, pressure, and time in the mix vessel 102, and so forth. The control system 116 may include any number of units, such as a distributed control system (DCS), a programmable logic controller (PLC), and the like.

In some embodiments, a filter/slurry system 118 may be optionally installed, and employed in addition to, or in lieu of, evaporating the solvent to dry the catalyst 106. In particular embodiments, no significant heat-drying of the catalyst 106 is implemented in the mix vessel 102. Instead, the catalyst 106 slurry in a solvent is discharged from the mix vessel 102 to the optional filter/slurry system 118. In certain embodiments, the temperature of the mix vessel 102 may be lowered, such as to 25° C. in one example, prior to discharge of the catalyst 106 slurry to filter/slurry system 118. Of course, other filtering temperatures my be employed, such as in the range of 30° C. to 70° C., or higher.

In the filter/slurry system 118, the catalyst 106 slurry may be filtered to remove solvent to give a catalyst 106, with residual solvent, which is sent to the collection vessel 112. As a further alternative, the catalyst 106 after filtering may be re-slurried with another alkane solvent or a mineral oil, for example, prior to being sent to the collection vessel 112. Such avoiding of heat-drying the catalyst in the mix vessel 102 and instead filtering the catalyst 106 may provide a reduced catalyst 106 with a different flow index response. In certain filtering embodiments, the flow index response is higher than if heat-drying, which may be beneficial where a higher flow index response is desired.

FIG. 2 is a more detailed view of the exemplary catalyst reducing system 100 having the agitated mix vessel 102. Like numbered items are as discussed with respect to FIG. 1. The metallurgy or material of construction of the mix vessel 102 may include carbon steel, stainless steel, nickel alloys, and so on. In certain embodiments, the mix vessel 102 has a nominal diameter in the exemplary range of 60 to 80 inches (152 to 203 cm) and a volume in the exemplary range of 1,000 to 3,000 gallons (3,785 to 11,355 liters). These ranges are only given as examples and are not meant to limit embodiments of the present techniques. Further, the mix vessel 102 may be a jacketed vessel having a jacket 200 for a heat transfer medium used to facilitate control of both the reaction temperature and the drying temperature for the mix vessel 102, as discussed below.

In the illustrated embodiment to perform the reduction, a charge of chromium-based catalyst 104 enters at an upper portion or top surface of the mix vessel 102. A charge of non-polar hydrocarbon solvent 107, such as isopentane, is also added and the agitator started to form a slurry in which the solids are at least partially suspended. The solvent 107 may be introduced through a dedicated feed port, as shown. On the other hand, the solvent 107 addition may share the same feed port or nozzle with the reducing agent 108, typically in sequence. The reducing agent 108 (e.g., neat DEAlE, DEAlE diluted in solvent, etc.) is added at an upper portion (e.g., top surface or top head) of the mix vessel 102. A level 202 of the mixture of solid and liquid contents is realized in the mix vessel 102 during the reaction.

The addition or feed rate (e.g., in mass per time or volume per time) of the reducing agent 108 may be manipulated by a control valve 204 (e.g., flow control valve) under the direction of the control system 116 or other control system. A set point of the feed rate may be specified in the control system 116 based on or in response to the desired flow index response value or range of the reduced catalyst 106. A flow sensor 206, such as a mass meter, flow orifice (i.e., with differential pressure taps), and so on, may measure the flow rate of the reducing agent 108. A transmitter associated with the flow sensor 206 may send a signal to the control system 116 indicating the measured flow rate. The flow control loop implemented via the control system 116, e.g., as a control block in a DCS control system 116, may adjust the valve opening position of the control valve 204 to maintain the flow rate of reducing agent 108 at set point, such as the desired addition rate of reducing agent 108 to the mix vessel 102. The control system 116 and instrumentation associated with the flow sensor 206 may totalize the mass of reducing-agent (e.g., DEAlE) solution fed, and the control system 116 closes the control valve 204 when the desired charge amount is fed. Alternatively, the desired volume of reducing agent 108 may be fed in advance into a reducing-agent charge vessel from which reducing agent 108 solution is fed to mix vessel 102 through flow sensor 206 and control valve 204.

The catalyst 104 and the reducing agent 108 generally react in the mix vessel 102 during the addition of the reducing agent 108. Further, the catalyst 104 and reducing agent 108 may be given more residence time (i.e., a hold time) to react in the mix vessel 102 after the addition of the reducing agent 108 is complete. In certain embodiments, the hold time may be 0.5 hr, 1 hr, 1.5 hrs, 2 hrs, 2.5 hrs, 3 hrs, and so on. A valve 208 at the bottom discharge of the mix vessel 102 or on the bottom discharge piping as depicted, may retain the catalyst in the mix vessel 102 during the addition of the reducing agent 108, during any additional reaction or hold time, and also during the subsequent drying of the reduced catalyst 106 in the mix vessel 102. The valve 208 may be a manual or automatic block valve, or other type of valve.

The mix vessel 102 may include an agitator 210 to agitate the contents of the mix vessel 102. The agitation may promote mixing and contact of the reducing agent 108 with the catalyst 104 to facilitate the reaction of the reducing agent 108 with the catalyst 104. In the illustrated embodiment, the agitator 210 has a shaft 212 and an impeller 214. While the process symbol for the agitator 210 is depicted as a shaft with a simple blade impeller, the agitator 210 may be a helical ribbon agitator or conical agitator, among others. In some embodiments, the agitator 210 may include a combination-type agitator, such as combination of a helical ribbon type agitator or a conical agitator with an impeller, turbine impeller, paddle, or other type of blending device.

Furthermore, the agitator 210 may include a motor 216 to drive the turning or rotation of the shaft 212 and impeller 214. The motor 216 may include a variable-speed drive or variable-frequency drive (VFD), for example, to facilitate adjustment of the agitation or agitator speed, e.g., the rpms of the shaft 212 and impeller 214. The VFD of the motor 216 in manipulating the speed of the agitator may operate under the direction of the control system 116 or other control system. A set point of the agitation rate or speed (rpm) may be specified in the control system 116 based on or in response to the desired flow index response value or range of the reduced catalyst 106.

As mentioned, the reaction of the reducing agent 108 with the catalyst 104 to give the reduced catalyst 106 may be performed at a specified pressure in the mix vessel and a specified temperature in the mix vessel 102. The reaction pressure may be maintained (e.g., via an inert gas or vapor head pressure) at exemplary values of 15 psig, 30 psig, 50 psig, 75 psig, 100 psig, and the like. The reaction temperature may be maintained at exemplary values of 20° C., 25° C., 30° C., 35° C., 40° C., 45° C., 50° C., 55° C., 60° C., and so on. This reaction temperature may be either the temperature of the mix vessel 102 contents or the temperature of the mix vessel 102 jacket 200. Also, the desired or adjusted drying temperature value (e.g., 60° C., 65° C., 70° C., 75° C., 80° C., etc.) may be input as the set point of a temperature controller on the mix vessel 102 or input as the set point of the temperature controller 222 on the heat transfer medium supply 218.

To maintain and control the reaction temperature and drying temperature as the temperature of the contents in the mix vessel 102 or as the temperature of the heat transfer medium supply 218, the catalyst reducing system 100 may include a heat transfer system 114 that is coupled with the jacket 200 of the mix vessel 102. The heat transfer system 114 may include heat exchangers (heaters, cooler, condensers, etc.), vessels, pumps, piping, valves, and the like, to provide a heat transfer medium supply 218 at a desired or specified temperature to the jacket 200 of the mix vessel 102. The heat transfer system 114 may also receive and process a heat transfer medium return 220 from the jacket 200 of the mix vessel 102. Examples of a heat transfer medium include tempered water, treated water, demineralized water, cooling tower water, steam condensate, steam, glycols, and other heat transfer fluids.

A temperature controller 222 may rely on a temperature sensor to measure and indicate temperature of the heat transfer medium supply 218. The temperature controller 222 may be represented by a control logic block in the control system 116 or other control system. The temperature sensor associated with temperature controller 222 (and other temperature sensors in the system 100) may include a thermocouple housed in a thermowell, or a resistance temperature detector (RTD), and the like. The sensed temperature values may be transmitted or otherwise indicated to hardware and logic of a control system (e.g., control system 116). In response, the control system (via the controllers) may send output signals to manipulate or modulate operation of various process equipment and valves to maintain the measured temperature at set point.

In the illustrated embodiment, the temperature controller 222 maintains the temperature of the heat transfer medium supply 218 at an entered set point. Indeed, the temperature controller 222 may direct adjustment of the operation of equipment and valves in the heat transfer system 114 to give the desired temperature set point of the heat transfer medium supply 218. This heat transfer medium supply 218 temperature may be labeled as the jacket 200 temperature of the mix vessel 102 or may approximate the jacket 200 temperature of the mix vessel 102. Moreover, in embodiments, the aforementioned reaction temperature and drying temperature may be the set point of the temperature controller 222 (e.g., the temperature of the heat-transfer medium supply 218 or the jacket 200 temperature) during the catalyst reduction reaction and subsequent drying of the reduced catalyst, respectively. The temperature of the mix vessel 202 contents may be the reaction temperature and the drying line-out temperature, respectively, and may approach (e.g., within 4° C.) the jacket 200 temperature. For example, an operator may input a target jacket 200 temperature into the jacket 200 temperature controller 222 which then acts to maintain a steady jacket 200 temperature during drying of the catalyst allowing the drying catalyst to gradually approach and line out near the jacket 200 temperature. In the illustrated embodiment, the temperature of the mix vessel 102 contents may be indicated by the temperature indicator 224 having a temperature sensor 226 extending into the mix vessel 102. The temperature controller 222 and other temperature controllers in the system 100 may be logic control blocks in a control system 116, such as a DCS, and may be associated with appropriate field hardware such as a transmitter, sensor, and so forth. Again, the temperature controller 222 output may direct equipment in the heat transfer system 114.

In alternate embodiments, the temperature indicator 224 on the mix vessel 102 may instead be configured as a temperature controller that maintains the mix vessel 102 contents at a temperature set point. In such embodiments, the temperature controller 222 of the heat transfer medium supply 218 may be the secondary or slave controller that facilitates control of temperature of the heat transfer medium supply 218. As mentioned, the temperature controller 222 may send an output signal(s) to adjust the position of one or more valves (and/or pumps, etc.) in the heat transfer system 114. In operation, the output of the primary temperature controller for the mix vessel 102 contents may specify the set point of the temperature controller 222 as the secondary or slave on the heat transfer medium supply 218. The temperature set point of the temperature controller 222 as a secondary or slave controller for the heat transfer medium supply 218 may be higher or lower than the temperature set point of the primary temperature controller of the mix vessel 102 contents. This may depend on whether heating or cooling of the mix vessel 102 contents is being implemented to maintain the desired temperature of the mix vessel 102 contents at set point. In operation, a control scheme may direct the heat transfer system 114 to maintain the temperature of the contents in the mix vessel 102 at a desired set point. The temperature control may involve a cascade control scheme, or in other words, a primary controller (e.g., temperature controller 224) that maintains mix vessel 102 temperature and directs a slave controller (e.g., temperature controller 222) that adjusts temperature of the heat transfer medium supply 218. To implement and maintain a desired temperature of the mix vessel 102 contents, the desired reaction temperature value (e.g., 45° C.) or drying temperature value (e.g., 60° C.) may be specified as the set point of the primary temperature controller on the mix vessel 102. Other temperature controllers and temperature sensors may be disposed at other points in the system 100 including on the mix vessel 102 and in the heat transfer system 114.

In general, the temperature instrumentation may include a sensor or sensing element, a transmitter, and so forth. For a temperature element or instrument, the sensing element may include a thermocouple, RTD, and the like. A transmitter may convert a received analog signal from the sensing element to a digital signal for feed or transmission to a control system such as the control system 116. A control block in the control system 116 may utilize such measured data. As mentioned with respect to FIG. 1, the heat transfer system 114 may operate, at least in part, under the direction of the control system 116.

The control system 116 and associated control schemes may be utilized to change the temperature of the mix vessel 102 contents or the heat transfer medium supply 218 from the reaction temperature (e.g., in the range of 35° C. to 55° C.) to the drying temperature (e.g., in the range of 55° C. to 85° C.). In certain embodiments, the temperature of the contents in the mix vessel 102 and the heat transfer medium supply 218 generally increases when transitioning from the reaction temperature to the drying temperature.

Figure 6:
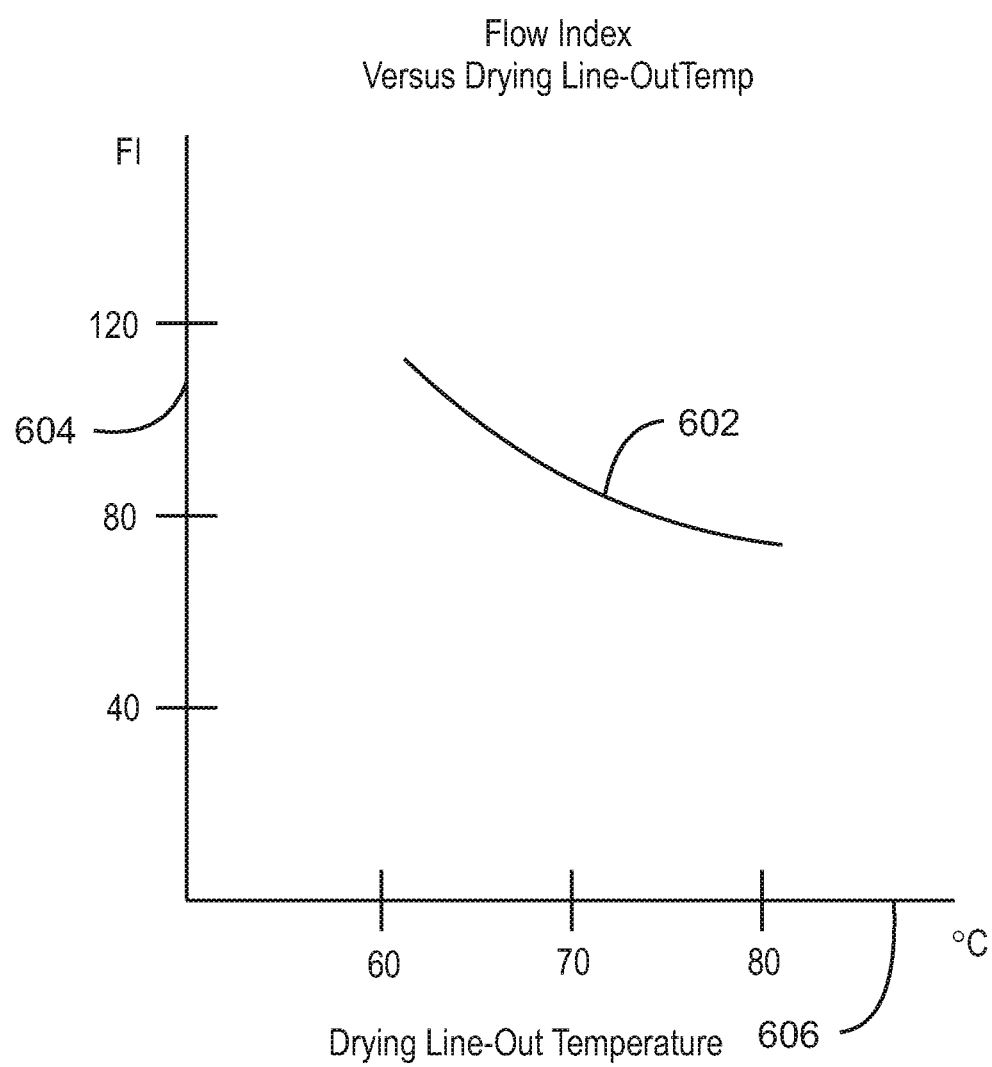
FIG. 6 is a plot of a fitted curve of example data of flow index in a laboratory slurry-phase polymerization reactor as a function of catalyst drying temperature in an upstream pilot-plant catalyst mix vessel in accordance with embodiments of the present techniques.
Figure 7:
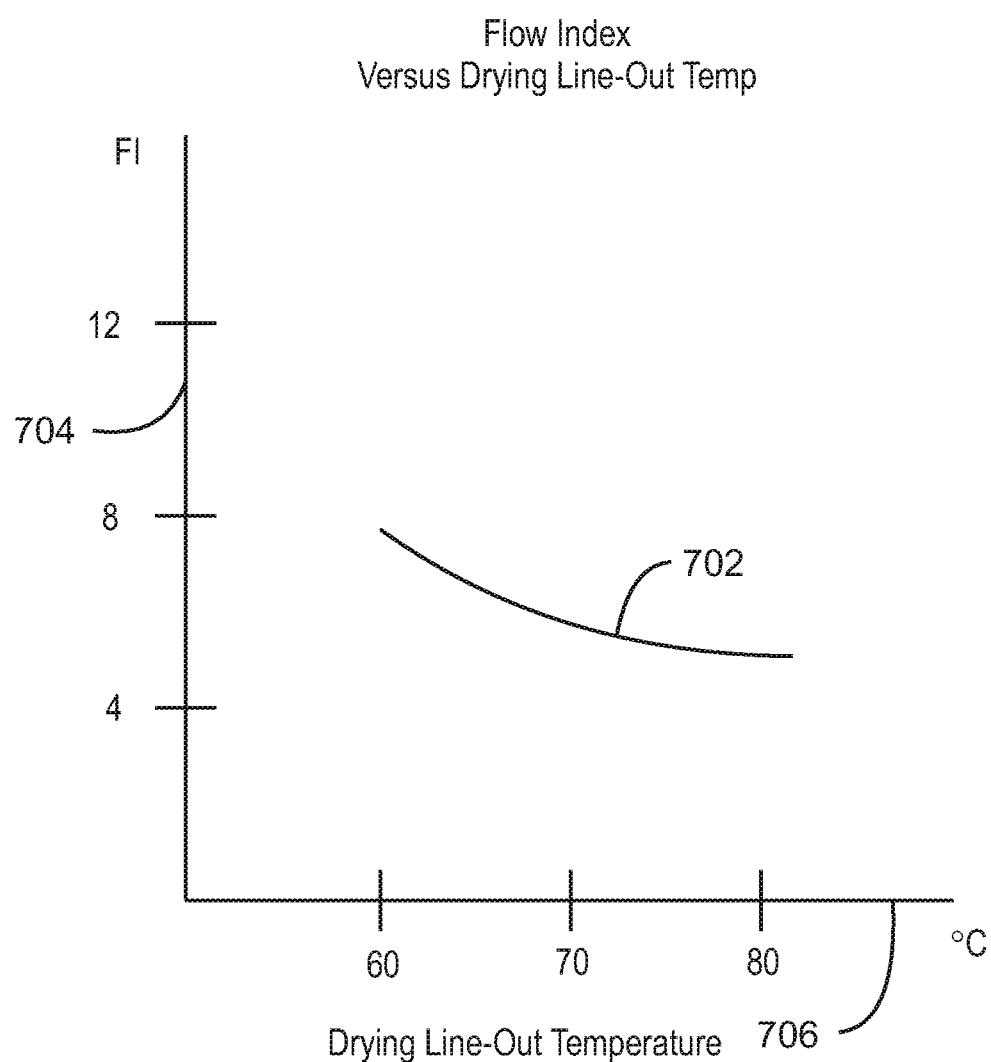
FIG. 7 is a plot of a fitted curve of example data of flow index in a pilot-plant gas-phase reactor as a function of catalyst drying temperature in an upstream pilot-plant catalyst mix vessel in accordance with embodiments of the present techniques.

After the reaction of substantially all of the reducing agent 108 with the catalyst 104 to give the reduced catalyst 106, the catalyst 106 may be dried in the mix vessel 102, i.e., the solvent 110 evaporated and driven from the mix vessel 102. The evaporated solvent 110 may discharge overhead from the mix vessel 102 and be collected in a recovery system, for example. The drying temperature or drying line-out temperature of the catalyst 106 in the mix vessel 102 may be adjusted in response to (or to adjust) the desired or specified flow index response of the catalyst 106. The flow index response of the catalyst 106 may be a function of the catalyst drying temperature or drying line-out temperature in the mix vessel 102. See the examples of FIGS. 6 and 7 depicting flow index of the subsequently polymerized polymer as a function of the upstream catalyst drying temperature or drying line-out temperature. In the illustrated embodiment of FIG. 2, the set point of the temperature controller 222 on the heat transfer supply medium 218 may be specified and adjusted as the drying temperature (to give a desired flow index response).

The control system 116 may include control hardware, a processor, and memory storing code executable by the processor to implement control schemes. As mentioned with respect to FIGS. 1 and 2, the control system 116 may direct and control the aforementioned process variables of the addition feed rate of the reducing agent 108, the agitator 210 speed, the catalyst 106 drying temperature, and other process variables. In the control system 116, computer-readable media may store control executable code to be executed by associated processors including central processing units, and the like. Such code executable by the processor(s) may include logic to facilitate the operations described herein.

Indeed, the control system 116 may include the appropriate hardware, software logic and code, to interface with the various process equipment, control valves, conduits, instrumentation, etc., to facilitate measurement and control of process variables, to implement control schemes, to perform calculations, and so on. A variety of instrumentation known to those of ordinary skill in the art may be provided to measure process variables, such as pressure, temperature, flow rate, and so on, and to transmit a signal to the control system 116 where the measured data may be read by an operator and/or used as an input in various control functions or calculations by the control system 116. Depending on the application and other factors, indication of the process variables may be read locally or remotely by an operator, and/or used for a variety of control purposes via the control system 116.

As discussed with respect to controlling to an entered set point of jacket temperature as the drying temperature, a temperature controller "TC" may be situated on the jacket supply, for instance, and a temperature indicator "TI" on the slurry contents in the vessel 102. When controlling to jacket temperature as the drying temperature, a set point of the jacket temperature (e.g., of the heat-transfer medium supply) may be entered as the drying temperature. Thus, the temperature of the contents in the vessel 102 may be a drying "line-out" temperature that is a few degrees different than jacket temperature. In these examples of jacket temperature as the drying temperature, the directly-controlled operating temperature may be an operating variable of the vessel (jacket temperature) but not the actual temperature of the vessel contents when controlling to the jacket temperature. Accordingly, when directly controlling and adjusting jacket temperature as drying temperature, the jacket temperature (e.g., heat transfer medium supply) may be the reaction temperature (e.g., 45° C.) and also the drying temperature (e.g., 60° C.). Thus, in embodiments, the reaction temperature and the drying temperature may be the jacket temperature which is an operating variable of the vessel 102, and with the understanding that the temperature of the contents in the vessel 102 may line-out near but at a different temperature than the jacket temperature. An alternative is to control to temperature of the slurry contents in the vessel 102, e.g., with master and slave temperature controllers operating on the mix vessel contents and the mix vessel jacket, respectively.

In sum for certain examples, when controlling to jacket temperature, the direct temperature operating variable of the vessel 102 may be the jacket temperature. The entered set point may be the jacket temperature. Therefore, for a reaction temperature of 45° C., for example, the jacket temperature (supply) may be maintained at 45° C. and the vessel 102 contents slurry temperature approaches and lines out at about 45° C., for instance. However, for a drying temperature of 60° C., for example, the jacket temperature (supply) is maintained at 60° C. and the vessel 102 contents temperature lines out at about 64° C., for instance (e.g., exceeding the jacket temperature due to heat of mechanical energy imparted by the agitator on the substantially dry catalyst). On the other hand, when controlling directly to vessel 102 contents temperature, the direct temperature operating variable of the vessel may be the vessel contents (slurry, catalyst) temperature. The entered set point may be the vessel contents slurry temperature. Therefore, for a reaction temperature of 45° C., for example, the vessel contents slurry temperature ramps to and is maintained at 45° C. For a drying temperature of 60° C., the vessel contents temperature ramps to and is maintained at 60° C. Of course, as the drying proceeds, the contents in the vessel 102 during the drying phase become primarily solids as the solvent is evaporated and discharged overhead.

To facilitate discharge of the dried solid reduced catalyst 106, the bottom portion of the mix vessel 102 may be a conical shape with at least a 45° slope of the walls of the cone, and up to a 60° slope or greater. Moreover, to facilitate drying of the reduced catalyst 106, an inert gas 223 (e.g., nitrogen) may be introduced to the mix vessel 102, such as to the lower cone (as shown) or to the outlet piping. This supply purge of inert gas 223 may flow up through the bed of catalyst 106 solids in the mix vessel once the free liquid outside the pores of the catalyst 106 support has evaporated. A manual or automatic valve 225 is provided so that the purge of inert gas 223 may be closed and not introduced during the reduction reaction prior to drying, for example. A restriction orifice may be provided to limit the inert gas 223 flow rate.

As mentioned with respect to alternate embodiments, a filter/slurry system 118 may be optionally employed instead of significant heat-drying (evaporating of solvent) of the catalyst 106. A catalyst 106 slurry having solvent is discharged from the mix vessel 102 to the filter/slurry system 118, such as at ambient temperature of in the range of 20° C. to 30° C., for example. The catalyst 106 slurry may be filtered by the filter/slurry system 118 to partially remove solvent to give a filtered catalyst 106 sent to the collection vessel 112. As a further alternative, an alkane solvent or a mineral oil, for example, may be added to the filtered catalyst 106 prior to collection in the collection vessel 112. Thus, the collection vessels 112 may hold under an inert atmosphere, for instance, either a filtered catalyst 106 and/or a slurried catalyst 106. Such avoiding of significant heat-drying of the catalyst in the mix vessel 102, combined with the subsequent filtering, may provide a reduced catalyst 106 with a relatively higher flow index response which may be beneficial where a higher flow index response is desired.

Additionally, in accordance with embodiments of the present techniques, the mix vessel 102 may include an entrance arrangement 228 for the incoming reducing agent 108. The entrance arrangement 228 may facilitate entry of the reducing agent 108 into the mix vessel 102. In particular, the entrance arrangement 228 may direct the incoming reducing agent away from the interior sidewall of the mix vessel 102, for example.

In examples, the reducing agent 108 may generally be fed to the mix vessel 102 at a relatively low flow rate. Conventionally, the reducing agent 108 may be introduced through a simple nozzle or fitting on the top head of the mix vessel 102. However, with such a plain nozzle or fitting and especially when gradually adding reducing agent 108 over a specified time period, the entering reducing agent 108 may fully or partially flow along the underside of the top head and down the side of the mix vessel 102 instead of flowing directly to the level 202 surface in the mix vessel 102. Consequently, dispersion of the reducing agent 108 into the reaction mixture may be inhibited. Such lack of dispersion may be more pronounced with aggregation of particles induced by reducing agent 108 giving a viscous slurry approaching gel-like behavior which may be a phenomenon problematic at the slurry surface near the outside wall. This phenomenon may inhibit good dispersion of the reducing agent 108 throughout the slurry.

Thus, embodiments may provide a new entrance arrangement 228 having a conduit or conduit extension 230 extending into the mix vessel 102 to direct flow of reducing agent 108. In the illustrated embodiment of FIG. 2, the conduit extension 230 may be an insert positioned into or through a nozzle 232 on an upper portion (e.g., top head 234) of the mix vessel 102, for example. In embodiments, the conduit or conduit extension 230 may be a pipe or tube extending into the nozzle 232 and also into the vessel 102.

This conduit or conduit extension 230 may result in increased mixing and dispersion of the reducing agent 108 in the mix vessel 102 contents by guiding the entering reducing agent 108 more directly toward the agitated mixture, or toward a more mobile portion of the agitated mixture. The conduit extension 230 may prevent the entering reducing agent 108 from flowing on the underside of the top head 234 and down the side of the vessel 102, for example. In certain embodiments, the extension 230 may direct the incoming reducing agent 108 toward desirable locations of the surface of the reaction mixture in the mix vessel 102. For instance, in some embodiments, the conduit extension 230, e.g., a pipe or tube insert, directs the reducing agent 108 to a surface location of the mixture level 202 that is 20-80%, or 50-70%, of the horizontal (perpendicular) distance 236 from the vessel 102 vertical centerline or agitator 204 vertical centerline to the inside surface 238 of the outside wall. The directed flow and thus improved dispersion of reducing agent 108 due to the conduit extension 230 may increase flow index response of the catalyst 106, and also increase catalyst 106 productivity. In some embodiments, the conduit extension 230 as an insert may be removed or a port used which does not have a conduit extension 230 when a low flow index response is desired.

Examples of chromium-based catalysts 104 that may be applicable to use of a conduit extension 230 or tube for entry of a reducing agent 108 (e.g., DEAlE) may include at least chromium oxide on silica supports, such as high temperature-activated forms of: PQ Corporation C35300MS, C35300MSF (having milling of larger support particles), C36300MS, and ES370; Grace Sylopol 957HS; KD Corporation KDC11C31 and KDC120120; and AGC Sci-Tech Company D-70-120A(LV) silica with chromium, and other catalysts. Of course, other catalyst grades and types are relevant and applicable. Lastly, additional improvements may be implemented to reduce particle agglomeration in the mixture and thus increase dispersion of the reducing agent 108 in the mixture and, therefore, increase contact and reaction of the reducing agent 108 with the catalyst. For instance, in some embodiments, the support of the catalyst may be specified as an unmilled support. Such may reduce particle aggregation in the reaction slurry exacerbated by milled supports in certain examples.

In particular, taking one example as representative of some embodiments, the catalyst 104 is a PQ Corporation grade C35300MSF of chromium oxide supported on silica that has been activated at high temperature in oxidizing atmosphere. In this representative example, use of the PQ C35300MSF grade in which the oversize fraction has been milled to form smaller particles exacerbates particle aggregation in the reaction slurry, such that the particle aggregation may occur well before the DEAlE addition is complete. This early aggregation with the milled C35300MSF grade may result from the presence of a substantial number of irregular broken milled-smaller particles that can experience greater surface to surface interactions than the predominantly smooth spheres of the unmilled C35300MS grade. In contrast, use of the unmilled C35300MS grade in certain examples may delay significant occurrence of the particle aggregation phenomena until after the DEAlE addition is complete, or close to being complete. Notably, a variant on unmilled C35300MS grade with a smaller fraction of large particles may be beneficial. In all, the combination of (1) improved nozzle entrance arrangement 228 for the reducing agent 108 and (2) support grade choice may increase dispersion and reaction of the reducing agent 108 in the mixture in the vessel 102.

Figure 3A:
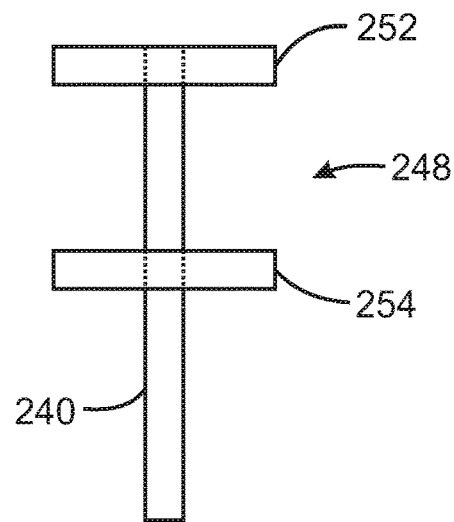
FIG. 3A is a diagrammatical representation of a conduit extension for a mix vessel of a chromium-based catalyst reducing system in accordance with embodiments of the present techniques.
Figure 3B:
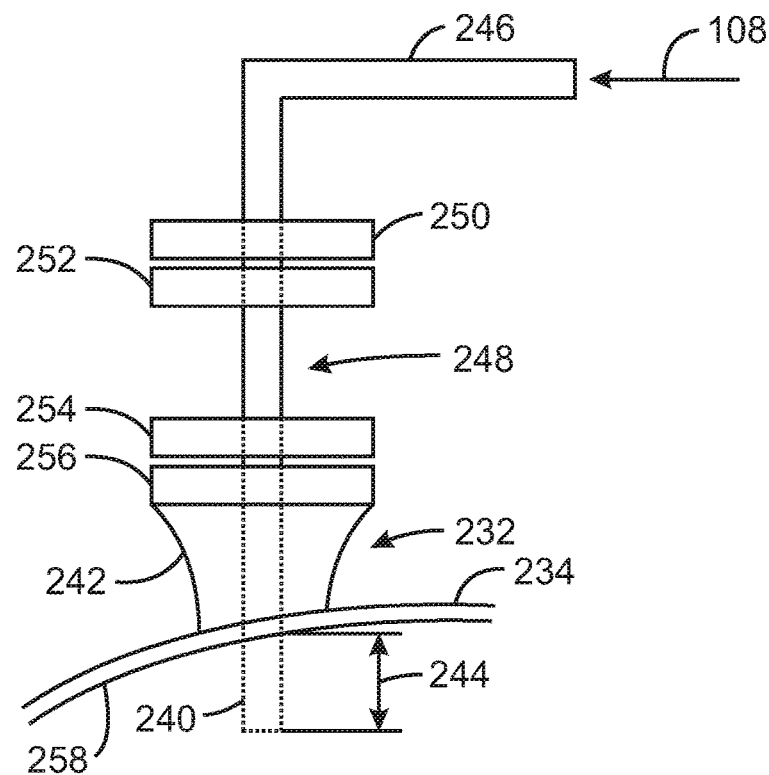
FIG. 3B is a diagrammatical representation of an entrance arrangement employing the conduit extension of FIG. 3A in accordance with embodiments of the present techniques.

FIGS. 3A and 3B describe an embodiment of an example entrance arrangement 228 (FIG. 3B) having an exemplary conduit extension (FIG. 3A). In particular, FIG. 3A is an exemplary conduit extension 230, e.g., a simple conduit or conduit extension, a nozzle insert, or a tube, among others, for the entrance arrangement 228 on the mix vessel 102 for the reducing agent 108. FIG. 3B is an exemplary entrance arrangement 228 on the mix vessel 102 for the reducing agent 108 having the example conduit extension 230 insert installed therein.

In embodiments, the exemplary conduit extension 230 is or has a conduit 240 that extends into the mix vessel 102 through a neck 242 of a nozzle 232 on the mix vessel 102. The portion of the conduit 240 of the extension 230 extending into the interior of the mix vessel 102 may have a length dimension 244 to provide that the incoming reducing agent 108 does not flow along the underside 258 of the top head 234 of the mix vessel 102. In examples, the length dimension 244 is 0.5", 1", 2", 3", 4", 6", 9", 12", or 18", and so on.

In alternate embodiments, the conduit extension 230 may extend into the nozzle 232 but not into the mix vessel 102.

In particular, the conduit extension 230 may extend into the neck 242 of the nozzle 232 but not extend past the inside surface underside 258 of the top head 234. Thus the length dimension 244 may be represented by a negative number (e.g., −0.5" or −1") in the sense that the conduit extension 230 is recessed into the nozzle 232 and not reaching the inside surface underside 258. Such a recessed conduit extension 230 may provide that the incoming reducing agent 108 does not flow along the underside 258 of the top head 234 of the mix vessel 102.

Furthermore, whether recessed in the nozzle 232 or extending into the mix vessel 102, the conduit extension 230 may be arranged such that the conduit 240 directs the reducing agent 108 to a desired location on the surface of the reaction mixture in the mix vessel 102. In examples, the entrance arrangement 228 directs the reducing agent 108 to an area on the surface of the reaction mixture that is in a percent range (e.g., 20% to 80%, 30% to 60%, 50% to 70%, etc.) of the perpendicular distance from the vertical centerline of the mix vessel 102 or agitator 210 to the vertical inside wall of the mix vessel 102 (see FIG. 2).

It should be noted that while the depicted conduit extension 230 has a simple vertical extension, e.g., end portion of conduit 240, into the mix vessel 102, the conduit 240 may extend via various physical configurations, including horizontal and/or sloped orientations, branching, multiple legs or tubes, sparger or distribution holes, and so on. In one embodiment, if a combination agitator is employed in which a turbine or other impeller operates at higher speed than the main helical ribbon and creates rapid downwards circulation of slurry near the agitator shaft, it may be advantageous to direct the reducing agent 108 towards the flow path leading into this impeller. Moreover, the conduit extension 230 may include a distribution device such as a distributor, spray nozzle(s), multiple nozzles at the same or different radial locations, a jet nozzle(s) to give a narrower and/or higher velocity stream, and the like, all or some of which may be installed on or via the conduit 240. Such incorporation of additional features and differing physical arrangements for the conduit extension 230 may beneficially direct and/or distribute the reducing agent 108 to a variety of particular locations in the mix vessel 102. Yet, on the other hand, an advantage of the plain vertical conduit 240 tube as depicted may be simplicity in installation, low cost, less prone to fouling, ease of maintenance, and so forth. Further, in embodiments, a plain short straight extension may accomplish preventing significant flow of the reducing agent along the underside 258 of the top head and down the inside vertical wall 238 of the mix vessel 102.

To deliver reducing agent 108 to the mix vessel 102, a pipe or conduit 246 routes the reducing agent 108 to the entrance arrangement 228. The conduit 246 terminates and couples with the reducing-agent feed nozzle 232 on the mix vessel 102 via a spool piece 248. In the illustrated embodiment, the terminal flange 250 of the supply conduit 246 mates with the inlet flange 252 of the spool piece 248. A block valve (not shown) may be installed between these two mating flanges 250 and 252.

In certain examples, the reducing spool piece 248 may provide for an increased flange size in the direction of flow. In one example, the incoming conduit 246 is 2" nominal diameter and terminating with a flange 250 that is a 2" flange. A 2" block valve 251 is sandwiched between flanges 250 and 252. Continuing in this particular example, the extension conduit 240 is 1.25" nominal diameter, the upstream flange 252 of the reducing spool piece 248 is a 2" by 1.25" reducing flange, the downstream flange 254 of the reducing spool piece 248 is a 1.25"×3" flange, and the nozzle 232 on the mix vessel 102 is a 3" nozzle having a 3" flange 256 and a 3" neck 242. In this example and other examples, the reducing agent 108 is introduced through the wall 258 of the top head 234 of the mix vessel 102 via the conduit 240 through the nozzle 232. In another example, nozzle 232, neck 242, and flange 256 may be 2" and flange 254 may be 1.25" by 2".

As mentioned, the reducing agent 108 may be directed away from the wall of the mix vessel 102 and to the surface level 202 of the reaction mixture in the mix vessel 102. Further, the reducing agent 108 may be directed to a region of the mixture with relatively higher mixing, such as away from the vessel wall and also away from close proximity to the agitator shaft 212. Lastly, it should be noted that various agitation rates with the agitator may be employed, such as 25 rpm, 30 rpm, 37 rpm, 40 rpm, 60 rpm, 70 rpm, greater than 60 rpm, greater than 70 rpm, less than 75 rpm, and so forth.

Figure 4:
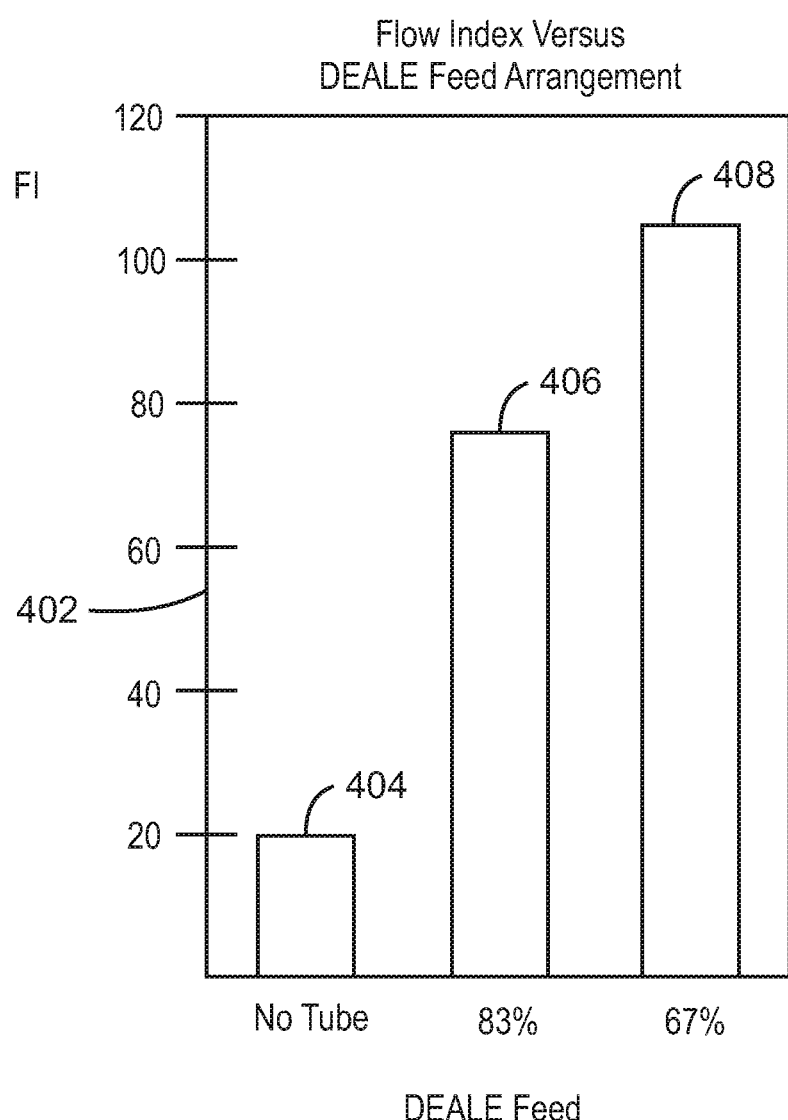
FIG. 4 is a bar chart of exemplary flow index in a laboratory slurry-phase polymerization reactor as a function of entrance arrangement for reducing agent to an upstream pilot-plant catalyst mix vessel in accordance with embodiments of the present techniques.

FIG. 4 is an exemplary bar chart 400 of flow index 402 in decigrams per minute (dg/min) for polyethylene made in laboratory slurry-phase polymerizations using reduced chromium-based catalyst. The catalyst was reduced in an agitated mix vessel in a pilot plant prior to the laboratory polymerizations. The bars 404, 406, 408 are the flow index of polyethylene produced in three respective polymerizations conducted at the same polymerization conditions and with catalyst that had been reduced at the same reduction conditions except with different entrance arrangements of DEAlE to the pilot-plant mix vessel.

The chromium-based catalysts employed in the three example pilot-plant mix vessel reductions had a milled C35300MS support (labeled as C35300MSF) and were activated at 600° C. prior to the reduction and the subsequent laboratory slurry polymerizations. To reduce the catalyst prior to the polymerizations, the catalyst was reduced with DEAlE in solvent hexane in the pilot-plant mix vessel. The catalysts were reduced with DEAlE added over 40 minutes at 45° C. reaction temperature with 30 to 37 rpm helical ribbon agitator speed in the pilot-plant mix vessel to give 1.53 to 1.58 wt % Al on the catalyst, and then dried at a 71° C. line-out temperature in the pilot-plant mix vessel. To subsequently determine the flow index responses, olefin was polymerized in the laboratory slurry polymerization with the reduced chromium-based catalysts, and the produced polyolefin tested for flow index. The subsequent three respective polymerizations were conducted to produce polyethylene at the same polymerization conditions. See the Example section below for additional details.

The first bar 404 is the resulting flow index of 20 dg/min for polyethylene produced with a catalyst that had been reduced in the pilot-plant mix vessel having a DEAlE feed arrangement with no conduit extension or tube insert into the mix vessel. In that arrangement with no extension or insert, the DEAlE was introduced to the mix vessel through a simple entrance and flowed along the underside of the head and down the inside wall to the reduction reaction mixture in the mix vessel. Thus, the DEAlE flowed to the reaction mixture at the wall, or at 100% of the distance from the vertical centerline of the mix vessel to the inside wall of the mix vessel. As indicated, the reaction mixture included the chromium-oxide based catalyst, the reducing agent DEAlE, and the solvent hexane.

The second bar 406 is the resulting flow index of about 76 dg/min for polyethylene produced with a catalyst previously reduced in the pilot-plant mix vessel having a DEAlE feed arrangement on the pilot-plant mix vessel having a conduit extension or tube insert that directed the DEAlE to a location on the surface of the reduction reaction mixture in the mix vessel. In particular, the conduit extension directed the DEAlE to a location 83% of the perpendicular distance from the vertical centerline of the mix vessel to the interior surface of the wall (i.e., inside wall) of the mix vessel.

The third bar 408 is the resulting flow index of about 104 dg/min for polyethylene produced with a catalyst previously reduced in the pilot-plant mix vessel having a DEAlE feed arrangement with a conduit extension (tube insert) that like with the second bar 406 also directed the DEAlE to the surface of the reduction reaction mixture. However, the DEAlE with respect to the third bar 408 was directed to a surface location of the reaction mixture that was 67% of the perpendicular distance from the vertical centerline of the mix vessel to the interior surface of the wall of the vessel.

Figure 5:
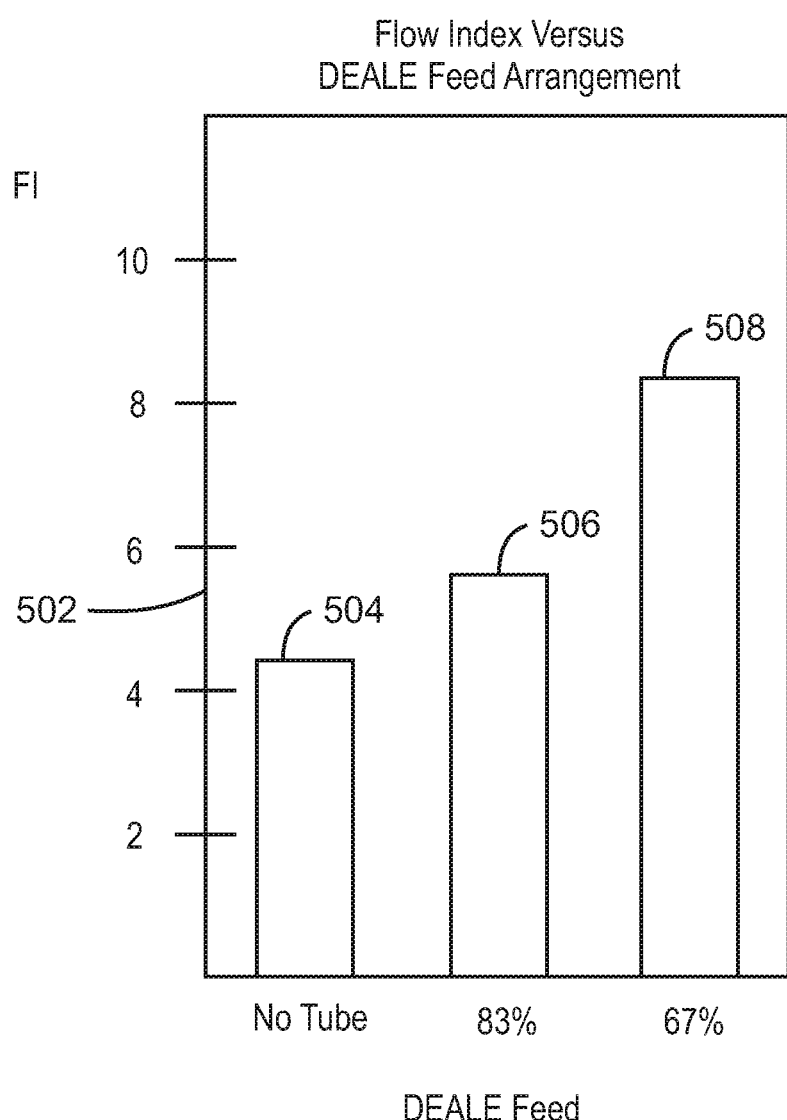
FIG. 5 is a bar chart of exemplary flow index in a pilot-plant gas-phase reactor as a function of entrance arrangement for reducing agent to an upstream pilot-plant catalyst mix vessel in accordance with embodiments of the present techniques.

FIG. 5 is a bar chart 500 of flow index 502 (dg/min) from gas-phase fluidized bed polymerizations in a pilot plant using reduced chromium-based catalysts that had been reduced with different DEAlE feed arrangements in a pilot-plant mix vessel. Thus, the basic difference between FIG. 4 and FIG. 5 is that FIG. 4 is flow index for polyethylene produced in a laboratory slurry polymerization, whereas FIG. 5 is flow index for polyethylene produced in a pilot-plant gas phase polymerization reactor. As indicated in the Examples section below, the three catalysts represented in FIG. 5 were one similarly reduced catalyst and two of the same three reduced catalysts represented in FIG. 4.

The first bar 504 is the resulting flow index (dg/min) of about 4.4 dg/min for a DEAlE feed arrangement with no conduit extension or tube insert on the pilot-plant mix vessel in the reduction prior to polymerization. The DEAlE was introduced to the mix vessel through a simple nozzle, and the DEAlE flowed along the underside of the top head of the mix vessel and down the inside wall of the mix vessel to the reduction reaction mixture.

The second bar 506 is the resulting flow index of about 5.3 dg/min for a feed arrangement of DEAlE on the pilot-plant mix vessel having a conduit extension or tube insert that directed the DEAlE to a location on the surface of the reaction mixture. In particular, the conduit extension directed the DEAlE to a location 83% of the perpendicular distance from the vertical centerline of the mix vessel (or the vertical centerline of the agitator) to the interior surface of the outside wall (i.e., the inside wall) of the mix vessel. The third bar 508 is the resulting flow index of about 8.2 dg/min for a feed arrangement of DEAlE with a conduit extension, which was a tube insert in this example, that directed the DEAlE to the surface of the reaction mixture at about 67% of the perpendicular distance from the vertical centerline of the mix vessel to the interior surface of the outside wall of the vessel.

The chromium-based catalyst employed in these three pilot-plant example reductions represented by FIG. 5 had a support that was milled C35300MS (labeled as C35300MSF), and the catalysts were activated at 600° C. prior to the reduction in the mix vessel and the subsequent polymerization. To reduce the catalyst after activation and prior to the polymerizations, the catalyst was reduced with DEAlE in solvent hexane in the pilot-plant mix vessel. The catalysts were reduced with DEAlE added over 40 minutes at 45° C. reaction temperature with 30 to 37 rpm helical ribbon agitator speed in the pilot-plant mix vessel to give 1.53 to 1.58 wt % Al on the catalyst, and then dried at a 71° C. line-out temperature in the pilot-plant mix vessel. As mentioned, to subsequently determine the flow index responses, olefin was polymerized in a pilot-plant gas phase reactor with the reduced chromium-based catalysts, and the produced polyolefin tested for flow index. The three polymerizations to produce polyethylene with the three respective reduced catalysts were conducted at the same polymerization conditions. See the Example section below for additional details.

The examples of FIGS. 4 and 5 demonstrate that for a reduction of chromium-based catalyst with DEAlE in a blended or agitated reaction mixture of the catalyst, DEAlE, and solvent, the flow index response may be a function of the location that the reducing agent enters the surface level of the reaction mixture. In particular, the flow index response may increase as the entry point of the reducing agent to the surface level of the reaction mixture is moved toward the vertical center of the vessel away from the outside wall. However, the flow index response may decrease as the entry point approaches the agitator shaft, which may be a region of lower mixing. In certain examples, beneficial ranges for the reducing agent to meet the surface of the reaction mixture are in the distance range of 20% to 80%, 30% to 70%, and 50% to 70%, of the distance from the vertical centerline of the mix vessel or agitator shaft to the inside surface or wall of the mix vessel. Moreover, for typical alkane solvents, it should be noted that the catalyst flow index response results from these example reductions of exemplary chromium-based catalysts are believed substantially independent of the particular alkane solvent employed in the reduction. For instance, it is not expected the flow index results would be significantly different in certain embodiments if the solvent isopentane were employed instead of hexane. Lastly, it also should be noted that while the entrance arrangement for the reducing agent is depicted in FIG. 2 at a top portion of the mix vessel, the entrance arrangement may also be at a side of the mix vessel or on a bottom portion of the mix vessel. In one embodiment, the entrance arrangement includes a conduit extending into a nozzle on a bottom portion of the mix vessel. In operation of such an embodiment, the reducing agent enters directly into the slurry contents in the mix vessel through conduit extending into or through the bottom nozzle.

FIG. 6 is a plot 600 of a fitted curve 602 of catalyst flow index 604 (dg/min) of produced polyethylene in laboratory slurry-phase polymerizations with catalyst that had been reduced in a pilot-plant mix vessel at a drying line-out temperature 606 (in ° C.). The catalysts were reduced in the pilot-plant mix vessel with DEAlE of different charges of the same type (grade) of chromium-based catalyst. The chromium-based catalysts were made on C35300MSF support activated at 600° C., then reduced in the mix vessel with DEAlE added over 40 minutes at 45° C. reaction temperature with 30 rpm helical ribbon agitator speed to give 1.53 to 1.58 wt % Al on the catalyst. The reductions of the chromium-based catalyst with DEAlE were performed in a pilot-plant mix vessel in the presence of an alkane solvent.

The DEAlE was added to the pilot-plant mix vessel using a tube insert to direct the DEAlE away from the wall of the pilot-plant mix vessel. The drying of the reduced catalyst in the pilot-plant mix vessel at the drying temperature 606 occurred after substantial completion of the reaction of the DEAlE with the catalyst during a 1 hour reaction hold. To accomplish the drying, the pressure in the pilot plant mix vessel was reduced and the temperature of the jacket increased to slightly above the drying line-out temperature 606 to evaporate and drive off the solvent. In these examples, the drying time represents the length of time from when the vessel pressure was reduced and the vessel jacket temperature increased until the jacket temperature decreased and the vessel pressure raised.

To subsequently determine the catalyst flow index 604 values, the respective batches of reduced chromium-based catalyst were used in laboratory polymerizations of olefin into polyolefin under the same or similar polymerization conditions. Samples of the respective produced polyolefin were tested to determine flow index of the polyolefin, and thus give comparable flow index values of the same catalyst type (grade) subjected to different catalyst drying line out temperatures 606.

FIG. 7 is a plot 700 of a fitted curve 702 of catalyst flow index 704 (dg/min) from gas-phase fluid bed polymerizations in a pilot plant versus catalyst drying line-out temperature 706 (in ° C.) for pilot-plant mix vessel reductions with DEAlE of different charges of the same type (grade) of chromium-based catalyst. The chromium-based catalysts were made on C35300MSF support activated at 600° C., then reduced with DEAlE added over 40 minutes at 45° C. reaction temperature with 30 rpm helical ribbon agitator speed to give 1.53 to 1.58 wt % Al on the catalyst. These catalysts were the same three catalysts tested in the lab polymerizations of FIG. 6.

The reductions of the chromium-based catalyst with DEAlE were carried out in a pilot-plant mix vessel in the presence of an alkane solvent. The DEAlE was added to the pilot mix vessel using a tube insert to direct the DEAlE away from the wall of the blender. The drying of the reduced catalyst at the drying temperature 706 in the pilot mix vessel occurred after substantial completion of the reaction of the DEAlE with the catalyst during a 1 hour reaction hold. To accomplish the drying, the pressure in the pilot plant mix vessel was reduced and the temperature of the jacket (i.e., the temperature of the heat transfer medium in the jacket) of the pilot-plant mix vessel increased to slightly above the drying line out temperature 706 to evaporate and drive off the solvent. In these examples, the drying time, i.e., the length of time from when the vessel pressure was reduced and the jacket temperature began to be increased until the jacket began to be cooled and the pressure was raised again, was 16 hours. To subsequently determine the catalyst flow index 704 values, the respective batches of reduced chromium-based catalyst were used in gas-phase fluidized bed pilot plant polymerizations of olefin into polyolefin under the same or similar polymerization conditions. Samples of the respective produced polyolefin were tested to determine flow index of the polyolefin, and thus give flow index values 704 of the catalyst.

The examples in FIGS. 6 and 7 demonstrate that for a reduction of chromium-based catalyst with DEAlE in a blended or agitated reaction mixture of the catalyst, DEAlE, and solvent, the flow index response may be a function of the subsequent catalyst drying line out temperature to evaporate and drive off the solvent. In particular, the flow index response may increase as the catalyst drying line-out temperature is reduced over certain ranges of drying temperature. In the examples, the catalyst flow index 604, 704 increased only slightly or negligibly when the drying temperature 606, 706 was reduced from 80° C. to 70° C. In contrast, the catalyst flow index 604, 704 increased significantly when the drying temperature 606, 706 was reduced from 80° C. to 60° C. or from 70° C. to 60° C.

Figure 8:
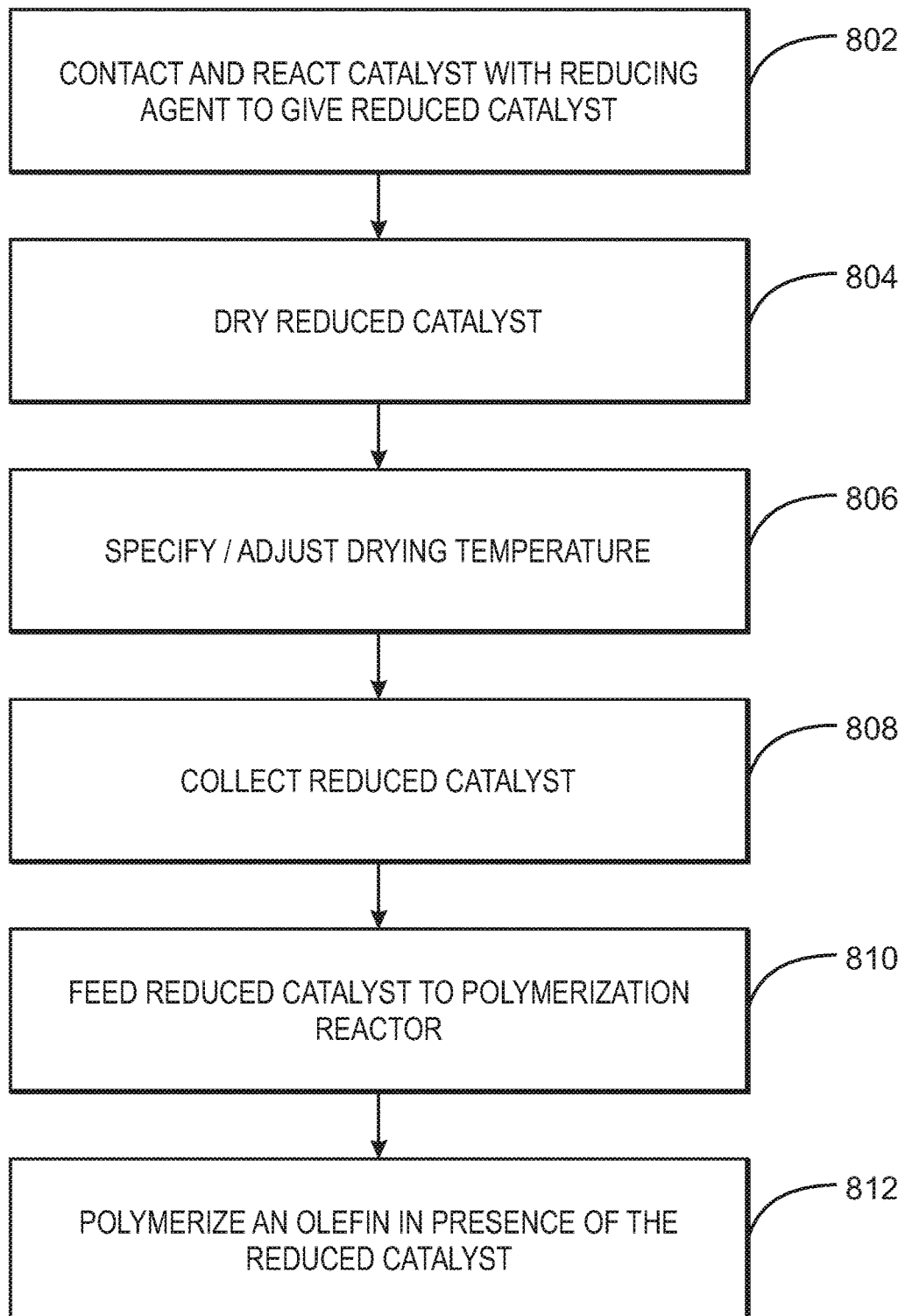
FIG. 8 is a block diagram of a method of preparing a chromium-based catalyst including adjusting catalyst drying temperature for the polymerization of an olefin into a polyolefin in accordance with embodiments of the present techniques.

FIG. 8 is a method 800 of preparing a chromium-based catalyst for subsequent use in the polymerization of an olefin into a polyolefin. This method 800 of preparing a chromium-based catalyst for the production of polyolefin involves treating the catalyst to reduce the catalyst. As discussed below, the method 800 includes adjusting a drying temperature of the catalyst.

The method 800 begins at block 802, with the contacting of a chromium-based catalyst, e.g., supported and activated, with a reducing agent in a solvent to lower an oxidation state of chromium in the chromium-based catalyst to give a reduced chromium-based catalyst. The oxidation state may be reduced from +6 (activated) to +2. The chromium +6 may instead be reduced to chromium +3. Some of the chromium +6 may not be reduced but remain an oxidation state of +6. Thus, in certain embodiments, the produced reduced chromium-based catalyst resulting from the method 800 may include some chromium +6 that has not been reduced, and may include chromium reduced to oxidation states of +2 and/or +3.

The contacting and reacting of the reducing agent with the chromium-based catalyst to reduce the chromium-based catalyst may occur in a mix vessel. The reducing agent may be an organoaluminum compound (e.g., DEAlE). The solvent may be an alkane. The contacting of the chromium-based catalyst with the reducing agent may result in reacting of the chromium-based catalyst with the reducing agent to give the reduced chromium-based catalyst. Moreover, the chromium-based catalyst may be contacted with the reducing agent in the solvent at a reaction temperature lower than the subsequent drying temperature.

The reduced chromium-based catalyst may be dried at a drying temperature or drying line-out temperature, as indicated in block 804. In certain embodiments, the reaction temperature is in the range of 20° C. to 60° C., and the drying temperature or drying line-out temperature is in the range of 50° C. to 90° C. The drying temperature or drying line-out temperature may be adjusted to change the flow index response of the reduced chromium-based catalyst, as indicated in block 806. Indeed, the method 800 may involve specifying the drying temperature or drying line-out temperature to give a desired flow index response of the reduced chromium-based catalyst. For a desired high flow index response, the drying temperature or the drying line-out temperature may be specified at less than 65° C. or 68° C., for example. Other preferred values for the drying temperature or the drying line-out temperature may be specified at less than 75° C. or 76° C., for example.

The drying of the reduced chromium-based catalyst may involve evaporating and/or filtering the solvent from the catalyst mixture. The drying may include reducing the pressure of the mixture of the reduced chromium-based catalyst and the solvent to facilitate evaporating and/or filtering the solvent from the mixture. For employment of a mix vessel in the reduction of the catalyst, the evaporating of solvent via heat-drying of the catalyst may include increasing an operating temperature of the mix vessel from the reaction temperature to the drying temperature or drying line-out temperature. Furthermore, the evaporating of the solvent may include reducing an operating pressure of the mix vessel. In all, the evaporated solvent may discharge from the mix vessel. It should be noted that where drying the catalyst includes filtering the reduced chromium-based catalyst to remove the solvent (in lieu of significant evaporation of the solvent), the mixture of catalyst and solvent may be filtered at a lower temperature (e.g., less than 30° C.) downstream of the mix vessel to increase the flow index response in some instances. Further, the filtered catalyst may then be subjected to heat drying in alternate examples. Lastly, it should be noted that during drying, whether by evaporation and/or filtering, a majority of the solvent may be removed from the catalyst, leaving residual solvent with the catalyst in certain instances.

The dried (and/or filtered) reduced chromium-based catalyst may be collected (block 808) for supply or distribution to a polymerization reactor or polymerization reactor system. In certain embodiments, the reduced chromium-based catalyst may discharge to a storage container from the mix vessel conducting the reduction and drying of the catalyst. Indeed, the method may further include feeding, at block 810, the reduced chromium-based catalyst to a polymerization reactor. At block 812, an olefin is polymerized into a polyolefin in presence of the reduced chromium-based catalyst.

In sum, an embodiment includes a method of preparing a chromium-based catalyst such as a chromium oxide catalyst, for the polymerization of an olefin into a polyolefin. The method includes contacting a chromium-based catalyst with a reducing agent (e.g., organoaluminum compound, DEAlE, TEAL, etc.) in a solvent such as alkane to lower an oxidation state of chromium in the chromium-based catalyst to give a reduced chromium-based catalyst. The chromium-based catalyst may be an activated and supported chromium-based catalyst. The contacting of the chromium-based catalyst with the reducing agent may react the chromium-based catalyst with the reducing agent to give the reduced chromium-based catalyst. Further, in this embodiment, the method includes drying the reduced chromium-based catalyst at a drying line-out temperature, and adjusting the drying line-out temperature to change the flow index response of the reduced chromium-based catalyst. Drying may involve evaporating the solvent, reducing a pressure of the mixture, and so on.

In examples, the chromium-based catalyst may be contacted with the reducing agent in the solvent at a reaction temperature lower than the drying line-out temperature, and wherein the reaction temperature is in the range of 20° C. to 60° C., and the drying line-out temperature is in the range of 40° C. to 90° C. In particular examples, the drying may be initiated after substantially all of the reducing agent contacted with the chromium-based catalyst has been consumed in a reaction of the reducing agent with the chromium-based catalyst. In some examples, the drying may include filtering the reduced chromium-based catalyst to remove solvent at a temperature of less than 30° C., for instance. The method may include collecting the reduced chromium-based catalyst for supply to a polymerization reactor. The method may include feeding the reduced chromium-based catalyst to a polymerization reactor to polymerize an olefin into a polyolefin.

An additional embodiment includes a method of preparing a chromium-based catalyst for the production of polyolefin, the method including contacting a chromium-based catalyst with a reducing agent in presence of a solvent in a mix vessel to produce a reduced chromium-based catalyst. The method includes evaporating the solvent at a drying temperature to dry the reduced chromium-based catalyst, and specifying the drying temperature or drying line-out temperature to give a desired flow index response of the reduced chromium-based catalyst. Exemplary specified values for drying temperature or drying line-out temperature include than 65° C., less than 68° C., less than 75° C., in the range of 65° C. to 75° C., less than 76° C., in the range of 75° C. to 85° C., and so on. Evaporating may be accommodated by increasing an operating temperature of the mix vessel from a reaction temperature to the drying temperature. Evaporating the solvent may involve increasing the jacket temperature of the mix vessel from a reaction temperature to the drying temperature, and/or reducing an operating pressure of the mix vessel. The method may include polymerizing an olefin into a polyolefin in presence of the reduced chromium-based catalyst in a polymerization reactor.

Yet another embodiment includes a catalyst reducing system includes a mix vessel to agitate a mixture of a chromium-based catalyst, a reducing agent, and a solvent to produce a reduced chromium-based catalyst for use in the polymerization of an olefin into a polyolefin. In this embodiment, the catalyst reducing system includes a heat transfer system to provide a heat transfer medium to a jacket of the mix vessel to evaporate the solvent and dry the reduced chromium-based catalyst at a drying temperature or drying line-out temperature. A control system is configured to adjust the drying temperature or drying line-out temperature in response to a measured flow index response of the reduced chromium-based catalyst. In examples, a supply temperature of the heat transfer medium to the jacket is the drying temperature, and wherein a temperature of the mixture is a drying line-out temperature. Moreover, the control system may be configured to automatically adjust the drying temperature or drying line-out temperature based on a predetermined relationship of flow index response with drying temperature or drying line-out temperature.

Lastly, yet another embodiment is a method including preparing a chromium oxide catalyst for the polymerization of an olefin into a polyolefin. The preparing includes: (1) mixing the chromium oxide catalyst with a reducing agent (e.g., aluminum alkyl, alkyl aluminum alkoxide, etc.) in a solvent (e.g., alkane) to give a reduced chromium oxide catalyst; (2) removing solvent from the reduced chromium oxide catalyst at a specified temperature set point; and (3) adjusting the specified temperature set point to give a desired flow index response of the reduced chromium oxide catalyst. The method includes collecting the reduced chromium oxide catalyst for delivery to a polyolefin polymerization reactor.

Figure 9:
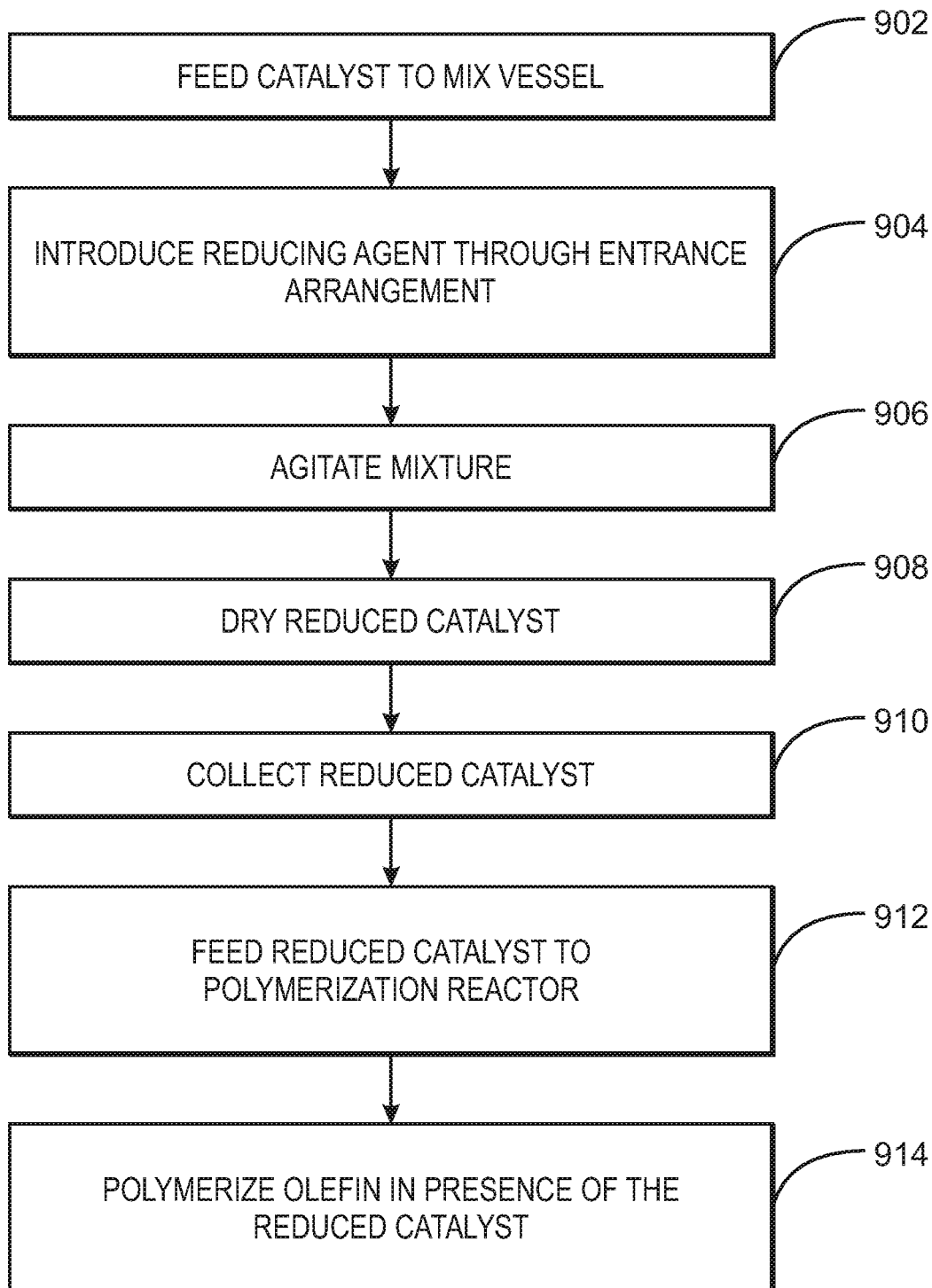
FIG. 9 is a block diagram of a method of preparing a chromium-based catalyst for polyolefin production, the method including introducing a reducing agent through an entrance arrangement on a mix vessel having the chromium-based catalyst in accordance with embodiments of the present techniques.

FIG. 9 is a method 900 of preparing a chromium-based catalyst for polyolefin production. The method 900 treats the chromium-based catalyst for the polymerization of an olefin into a polyolefin. As discussed below, the method 900 includes feeding a reducing agent to a mix vessel through an entrance arrangement of the mix vessel to direct the reducing agent into the mix vessel. The entrance arrangement may include a conduit extension or conduit extending into the mix vessel.

At block 902, a chromium-based catalyst is fed to a mix vessel. The feeding of the catalyst may involve charging the catalyst, or adding a batch or charge of the chromium-based catalyst to the mix vessel. The chromium-based catalyst may be an activated and/or supported chromium-based catalyst. If supported, the support may be an unmilled support to potentially reduce particle agglomeration in the reaction mixture in the mix vessel in certain embodiments.

At block 904, a reducing agent, such as an organoaluminum compound, is introduced (block 904) to the mix vessel through an entrance arrangement having a conduit extension or conduit extending into the mix vessel. The reducing agent may be received at the entrance arrangement of the mix vessel in a stream having the reducing agent and a solvent, for example. The stream having the reducing agent and solvent may travel through the conduit extension or conduit into the mix vessel. Additional solvent may be added to the mix vessel prior to, during, and/or after addition of the reducing agent.

In certain embodiments, the conduit may have an extending length of at least 0.5 inch, 2 inches, 4 inches, 6 inches, and so on, into the mix vessel from an upper inside surface of the mix vessel. The conduit or conduit extension may extend through an upper portion of the mix vessel, and direct the entering stream having the reducing agent toward a surface of the mixture level in the mix vessel. The conduit may extend into the mix vessel through a top head of the mix vessel, and terminate in a designated vapor space of the mix vessel.

In some embodiments, the conduit or conduit extension is an insert through a nozzle of the mix vessel. In particular embodiments, the conduit extension or conduit may be a nozzle insert providing a tube through a nozzle of the mix vessel. In some examples, the conduit extension or conduit extends at least 2 inches into the mix vessel through a nozzle of the mix vessel, and wherein the stream having the reducing agent is introduced to the mix vessel through the conduit extending through the nozzle of the mix vessel. In a particular example, the conduit extension or conduit introducing the reducing agent into the mix vessel may direct the entering reducing agent, or an entering stream having the reducing agent, toward a location of the mixture surface in a range of about 20% to 80%, or about 50% to 70%, of a perpendicular distance from a vertical centerline of the mix vessel (or vertical centerline of the agitator shaft) toward an inside diameter wall (inside surface of vertical outside wall) of the mix vessel.

Other embodiments of the conduit extension are applicable. For example, the conduit extension may be a dip tube. In particular, the reducing agent may be added through a conduit extension that is a dip tube extending past the mix-vessel vapor space to below the level of the contents in the mix vessel. In another embodiment, the conduit extension may be recessed in the reducing-agent feed nozzle. In particular the conduit extension may extend into the reducing-agent feed nozzle on the mix vessel but not into the mix vessel.

Lastly, with respect to the addition (block 904) of reducing agent to the mix vessel, the reducing agent may be added to the mix vessel other than through the aforementioned conduit extension. For example, in an alternate embodiment, the reducing agent may be added through a side nozzle or bottom nozzle on the mix vessel below the level of the reduction reaction mixture. In general, the reducing agent may be added to the mix vessel such that it does not travel down the inside wall of the mix vessel, and/or that promotes the mixing of the reducing agent with the reduction reactor mixture.

At block 906, the mixture of the chromium-based catalyst, the reducing agent, and a solvent in the mix vessel continues to be agitated to promote contact of the reducing agent with the chromium-based catalyst to give a reduced chromium-based catalyst. The agitation of the mixture may disperse the reducing agent in the mixture to promote reaction of the reducing agent with the chromium-based catalyst to give a reduced chromium-based catalyst.

The reduced chromium-based catalyst is dried in the mix vessel, as indicated by block 908. The drying may include evaporating the solvent in the mix vessel and discharging the evaporated solvent overhead from the mix vessel. The reduced chromium-based catalyst may be collected (block 910) for supply to a polymerization reactor. In one example, the reduced chromium-based catalyst may be discharged from the mix vessel to a storage container for distribution to a polymerization reactor system. The reduced chromium-based catalyst may be fed (block 912) to a polymerization reactor to polymerize (block 914) an olefin into a polyolefin in presence of the reduced chromium-based catalyst.

In sum, an embodiment provides a method of preparing a chromium-based catalyst for the polymerization of an olefin into a polyolefin. The method includes feeding the chromium-based catalyst to a mix vessel, introducing a stream having a reducing agent into the mix vessel through a conduit extending into a nozzle of the mix vessel. Further, the method includes agitating a mixture of the chromium-based catalyst, the reducing agent, and a solvent in the mix vessel to promote contact of the reducing agent with the chromium-based catalyst to give a reduced chromium-based catalyst. In certain instances, the conduit extends through the nozzle into the mix vessel past an interior surface of the mix vessel. In one instance, the conduit extends at least 0.5 inch into the mix vessel through the nozzle of the mix vessel, and wherein the stream having the reducing agent is introduced to the mix vessel through the conduit extending through the nozzle of the mix vessel. In some instances, the conduit may extend at least 2 inches into the mix vessel through the nozzle. In particular examples, the conduit may have an extending length of at least 6 inches into the mix vessel from an upper inside surface of the mix vessel. The conduit may extend through the nozzle on an upper portion of the mix vessel and direct the stream having the reducing agent to a surface of the mixture in the mix vessel. Indeed, the conduit may extend through the nozzle on a top head of the mix vessel and terminate in a vapor space of the mix vessel. On the other hand, the conduit may be a dip tube that extends through the nozzle into the mix vessel to below a level of the mixture. The conduit may direct the stream having the reducing agent toward a location on the mixture surface, for example, in a range of 20% to 80% of a perpendicular distance from a vertical centerline of the mix vessel to an inside wall of the mix vessel. Further, reducing agent may be introduced to the mix vessel through a second nozzle on a bottom portion of the mix vessel. The level of the mixture in the mix vessel may be maintained in or at an impeller region of an agitator of the mix vessel. On the other hand, prior to drying the reduced chromium-based catalyst in the mix vessel, the level of the mixture in the mix vessel may be maintained above an impeller region of an agitator of the mix vessel. Lastly, the method may involve where the conduit extending into the nozzle of the mix vessel extends into the mix vessel and comprises a distributor or spray nozzle, or both. In certain configurations, the conduit extending into at least the nozzle of the mix vessel and is configured to direct a jet of the reducing agent to penetrate to below a surface of a level of a mixture in the mix vessel to facilitate mixing of the mixture in the mix vessel.

Another embodiment provides for a method of treating a chromium-based catalyst for polyolefin production, the method including adding a charge of chromium-based catalyst to a mix vessel, and introducing a reducing agent into the mix vessel through a conduit extension that extends at least 0.5 inch into the mix vessel and terminates in a designated vapor space of the mix vessel. The method includes agitating a mixture of the chromium-based catalyst, reducing agent, and a solvent in the mix vessel to disperse the reducing agent in the mixture to promote reaction of the reducing agent with the chromium-based catalyst to give a reduced chromium-based catalyst. The conduit extension may be an insert through a nozzle of the mix vessel, and may direct the reducing agent toward a surface of the mixture level in the mix vessel. For example, the conduit extension may direct the reducing agent toward a location of the mixture level in a range of 20% to 80% of a perpendicular distance from a vertical centerline of the mix vessel to an inside surface of a wall of the mix vessel. Moreover, the method may include maintaining a level of the mixture in the mix vessel at an impeller region of a shaft of an agitator of the mix vessel. The method may include discharging the reduced chromium-based catalyst from the mix vessel to a storage container for distribution to a polymerization reactor system. Lastly, the method may include polymerizing an olefin into a polyolefin in presence of the reduced chromium-based catalyst in a polymerization reactor.

Yet another embodiment includes a reducing system for chromium-based catalyst may include a catalyst feed system to provide a chromium-based catalyst to a mix vessel, a reducing agent supply system to provide a reducing agent to the mix vessel, and the mix vessel to hold a mixture having the chromium-based catalyst, the reducing agent, and a solvent to produce a reduced chromium-based catalyst for use in the polymerization of an olefin into a polyolefin. The mix vessel may include an agitator to agitate the mixture, and an entrance arrangement for the reducing agent, the entrance arrangement having a conduit or a conduit extension to receive and direct the reducing agent into the mix vessel. The reducing agent may include an organoaluminum compound, an alkyl aluminum alkoxide such as diethylaluminum ethoxide (DEAlE), an aluminum alkyl such as triethylaluminum (TEAL), a mixture of DEAlE and TEAL, and so forth. As indicated, the chromium-based catalyst may be a chromium oxide catalyst.

In certain instances, the conduit extension extends into an interior of the mix vessel and directs the reducing agent to a vapor space of the mix vessel. The conduit extension may direct the reducing agent away from an inside surface of the mix vessel toward the mixture such as toward a top surface of the mixture level. In particular examples, the conduit extension directs the reducing agent toward a location of a surface of the mixture level that is 20% to 80%, or 50% to 70%, of the perpendicular distance from a vertical centerline of the mix vessel to an inside surface of a vertical wall of the mix vessel. The vertical centerline of the agitator may be substantially the same as a vertical centerline of the mix vessel. In certain embodiments, the conduit extension may be a nozzle insert through a nozzle of the mix vessel, the nozzle insert being a tube that terminates in a vapor space of the mix vessel. On the other hand, the conduit extension could be a dip tube that extends past the vapor space below the level (surface) of contents of the mix vessel.

In general, the reducing agent may be added to the mix vessel such that the reducing agent does not go predominantly go into the aggregate ring around the outer upper surface of the slurry, and so that the dispersion of the reducing agent into the reduction reaction slurry mixture is increased. For example, the reducing agent may be introduced through a conduit extension or conduit insert into the vapor space of the mix vessel or to below the slurry surface away from the inside wall. In the case of the conduit or tube insert as a dip tube to below the surface level, the dip tube may extend below the mixture surface between the agitator shaft and the outer helical ribbon(s), for example. The dip tube may have multiple exit holes below the surface level. In another configuration, the tube insert does not extend into the vessel but instead is recessed in a feed nozzle on the top head of the mix vessel, such that the reducing agent flows to a desired location on the surface of the slurry away from the inside wall of the mix vessel. Also, in yet other embodiments, the reducing agent may be added to the mix vessel via a port or nozzle on a bottom portion of the vessel. If so, the reducing agent feed may be split between the bottom port or nozzle and a port or nozzle on the top head.

The catalyst reducing system may include a flow control valve to modulate the flow rate of the reducing agent to the entrance arrangement of the mix vessel. The system may have a variable drive to modulate an agitation rate of the mixture by the agitator, wherein the agitation rate may be in revolutions per unit of time of a shaft of the agitator. Further, a heat transfer system may provide a heat transfer medium to a jacket of the mix vessel to maintain a temperature of the heating medium in the jacket or to maintain a temperature of the contents in the mix vessel. A control system may facilitate adjusting agitation rate in revolutions per time of the agitator to give a desired flow index response of the reduced chromium-based catalyst. The same or different control system may facilitate adjusting flow rate of the reducing agent to the entrance arrangement of the mix vessel to give a desired flow index response of the reduced chromium-based catalyst, and also facilitate adjusting a drying temperature of the reduced chromium based catalyst in the mix vessel to give a desired flow index response of the reduced chromium-based catalyst.

Polymerization Processes

Catalysts formed by the above described processes, as well as the catalyst prepared inline discussed below, may be used in the polymerization of olefins by suspension, solution, slurry, and gas phase processes, using known equipment and reaction conditions, and are not limited to any specific type of polymerization system. Generally, olefin polymerization temperatures may range from about 0 to about 300° C. at atmospheric, sub-atmospheric, or superatmospheric pressures. In particular, slurry or solution polymerization systems may employ sub-atmospheric, or alternatively, super-atmospheric pressures, and temperatures in the range of about 40 to about 300° C.

Liquid phase polymerization systems such as those described in U.S. Pat. No. 3,324,095, may be used in embodiments of this disclosure. Liquid phase polymerization systems generally comprise a reactor to which olefin monomers and catalyst compositions are added. The reactor contains a liquid reaction medium which may dissolve or suspend the polyolefin product. This liquid reaction medium may comprise an inert liquid hydrocarbon which is non-reactive under the polymerization conditions employed, the bulk liquid monomer, or a mixture thereof. Although such an inert liquid hydrocarbon may not function as a solvent for the catalyst composition or the polymer obtained by the process, it usually serves as solvent for the monomers used in the polymerization. Inert liquid hydrocarbons suitable for this purpose may include isobutane, isopentane, hexane, cyclohexane, heptane, octane, benzene, toluene, and mixtures and isomers thereof. Reactive contact between the olefin monomer and the catalyst composition may be maintained by constant stirring or agitation. The liquid reaction medium which contains the olefin polymer product and unreacted olefin monomer is withdrawn from the reactor continuously. The olefin polymer product is separated, and the unreacted olefin monomer and liquid reaction medium are typically recycled and fed back into the reactor.

Some embodiments of this disclosure may be especially useful with gas phase polymerization systems, at superatmospheric pressures in the range from 0.07 to 68.9 bar (1 to 1000 psig), from 3.45 to 27.6 bar (50 to 400 psig) in some embodiments, from 6.89 to 24.1 bar (100 to 350 psig) in other embodiments, and temperatures in the range from 30 to 130° C., or from 65 to 110° C., from 75 to 120° C. in other embodiments, or from 80 to 120° C. in other embodiments. In some embodiments, operating temperatures may be less than 112° C. Stirred or fluidized bed gas phase polymerization systems may be of use in embodiments of this disclosure.

Generally, a conventional gas phase, fluidized bed process is conducted by passing a stream containing one or more olefin monomers continuously through a fluidized bed reactor under reaction conditions and in the presence of a catalyst composition at a velocity sufficient to maintain a bed of solid particles in a suspended state. A stream containing unreacted monomer is continuously withdrawn from the reactor, compressed, cooled, optionally partially or fully condensed, and recycled back to the reactor. Product is withdrawn from the reactor and replacement monomer is added to the recycle stream. Gases inert to the catalyst composition and reactants may also be present in the gas stream. The polymerization system may include a single reactor or two or more reactors in series.

Feed streams may include olefin monomer, non-olefinic gas such as nitrogen and hydrogen, and may further include one or more non-reactive alkanes that may be condensable in the polymerization process for removing the heat of reaction. Illustrative non-reactive alkanes include, but are not limited to, propane, butane, isobutane, pentane, isopentane, hexane, isomers thereof and derivatives thereof. The feeds may enter the reactor at a single or multiple and different locations.

Further, the polymerization process is typically conducted substantially in the absence of catalyst poisons such as moisture, oxygen, carbon monoxide and acetylene. However, oxygen can be added back to the reactor at very low concentrations to alter the polymer structure and its product performance characteristics. Oxygen may be added at a concentration relative to the ethylene feed rate to the reactor of about 10 to 600 ppbv, and more preferably about 10 to 500 ppbv. Organometallic compounds may be employed as scavenging agents to remove catalyst poisons, thereby increasing the catalyst activity, or for other purposes. Examples of organometallic compounds that may be added include metal alkyls, such as aluminum alkyls. Conventional adjuvants may also be used in the process, provided they do not interfere with the mechanism of the catalyst composition in forming the desired polyolefin. In some embodiments, hydrogen gas may be added. The use of hydrogen affects the polymer molecular weight and distribution, and ultimately influences the polymer properties. For the purpose of polymerization with chromium-based catalysts of the current invention, the gas mole ratio of hydrogen to ethylene in the reactor may be in the range of about 0 to 0.5, in the range of 0.01 to 0.4 and in the range of 0.03 to 0.3.

An illustrative catalyst reservoir suitable for continuously feeding dry catalyst powder into the reactor is shown and described in U.S. Pat. No. 3,779,712, for example. A gas that is inert to the catalyst, such as nitrogen or argon, is preferably used to carry the catalyst into the bed. In another embodiment the catalyst is provided as a slurry in mineral oil or liquid hydrocarbon or mixture such, as for example, propane, butane, isopentane, hexane, heptane or octane. An illustrative catalyst reservoir is shown and described in WO 2004094489. The catalyst slurry may be delivered to the reactor with a carrier fluid, such as, for example, nitrogen or argon or a liquid such as for example isopentane or other C3 to C8 alkane.

In order to achieve the desired density ranges in the copolymers it is necessary to copolymerize enough of the comonomers with ethylene to achieve a level of about 0 to anywhere from 5 to 10 weight percent of the comonomer in the copolymer. The amount of comonomer needed to achieve this result will depend on the particular comonomer(s) being employed, the catalyst composition, and, particularly, the molar ratio of aluminum to chromium, catalyst preparation conditions, and reactor temperature. The ratio of the comonomer to ethylene is controlled to obtain the desired resin density of copolymer product.

The conditions for polymerizations vary depending upon the monomers, catalysts and equipment availability. The specific conditions are known or readily derivable by those skilled in the art. In some embodiments of this disclosure, polyolefins produced may include those made from olefin monomers such as ethylene and linear or branched higher alpha-olefin monomers containing 3 to about 20 carbon atoms. In other embodiments, homopolymers or interpolymers of ethylene and these higher alpha-olefin monomers, with densities ranging from about 0.905 g/cc to about 0.97 g/cc, may be made; densities ranging from about 0.915 to about 0.965 in other embodiments. Exemplary higher alpha-olefin monomers may include, for example, propylene, 1-butene, 1-pentene, 1-hexene, 4-methyl-1-pentene, 1-octene, and 3,5,5-trimethyl-1-hexene. Exemplary polyolefins may include ethylene-based polymers (at least 50 mole % ethylene), including ethylene-1-butene, ethylene-1-hexene, and ethylene-1-octene copolymers, such as high density polyethylene (HDPE), medium density polyethylene (MDPE) (including ethylene-butene copolymers and ethylene-hexene copolymers), low density polyethylene (LDPE), linear low density polyethylene (LLDPE), or homopolyethylene.

In certain embodiments, polymers of the present disclosure may have flow indices (I21) ranging from about 0.1 g/10 min to about 1000 g/10 min. In other embodiments, polymers of the present disclosure may have flow indices (I21) ranging from about 1 g/10 min to about 300 g/10 min. In yet other embodiments, polymers of the present disclosure may have flow indices (I21) ranging from about 0.5 g/10 min to about 60 g/10 min.

In some exemplary embodiments, the processes and catalysts disclosed herein may be used to produce polyolefins such as ethylene/1-hexene copolymer or ethylene homopolymer under specific reactor conditions. For example, the H2/C2 gas molar ratio may be in the range of from about 0.01 to about 0.5. Oxygen add back may be in the range of from about 10 to about 600 ppbv relative to the ethylene feed rate to the reactor. The reactor operating temperature may be in the range of from about 75 to about 120° C. The reactor may be optionally run in the condensing mode. The conditions for polymerizations vary depending upon the monomers, catalysts and equipment availability. The specific conditions are known or readily derivable by those skilled in the art.

The following test methods should be utilized to obtain the numerical values for certain properties and features as disclosed, e.g. density, productivity, chromium content, or flow indices or melt indices, although it is understood that those values also refer to any results obtained by other testing or measuring methods that might not necessarily be disclosed herein, provided such other testing or measuring methods are published, e.g., in at least one patent, patent application, or scientific publication. Also, it is understood that the values set forth in the claims may have some degree of error associated with their measurement, whether experimental, equipment, or operator error; and that any value in the claim is approximate only, and encompasses values that are plus or minus (+/−) 10% or even 20% from the measured value.

Density values are based on ASTM D1505. Flow Index (I21) values are based on ASTM D1238, run at 190° C., with 21.6 kg weight; the standard designation for that measurement is 190/21.60. Melt Index (I5) values are based on ASTM D1238, run at 190° C., with 5.0 kg weight; the standard designation for that measurement is 190/5. Melt Index (I2) values are based on ASTM D1238, run at 190° C., with 2.16 kg weight; the standard designation for that measurement is 190/2.16.

The discussion herein illustrates, among other things, for reduced chromium oxide catalysts and reduced silyl chromate catalysts the effect on flow index response of using differing reducing agent addition times and different agitation rates, and surprisingly different drying temperatures, in both a fluidized-bed gas phase polymerization process and in a slurry polymerization process, for polyethylene copolymers, which included ethylene units as well as other monomeric units. These effects may be utilized to tailor the flow index response of a catalyst so as to make target polymers with high, medium, or low flow indices under a variety of polymerization conditions.

As described above, the flow index response of a chromium-based catalyst can be tailored by contacting the chromium-based catalyst with a reducing agent fed at a selected feed rate over a selected time period and optionally at a selected agitation rate, and subsequently dried at an adjustable specified drying temperature (at a specified drying time). The use of the chromium-based catalyst compositions described herein, wherein the catalysts have a tailored or selected flow index response, provides a capacity for polymerization process flexibility, which has significant commercial application in the polymerization of polyolefins.

In addition, embodiments of the present disclosure provide a process for producing chromium-based catalyst compositions with a selected flow index response. Yet other embodiments provide a process for producing polyolefins comprising forming a chromium-based catalyst composition with a selected flow index response, as described herein, and contacting the chromium-based catalyst composition with olefins under polymerization conditions.

Advantageously, embodiments disclosed herein provide for a method to tailor the flow index response of chromium-based catalysts. The ability to select the flow index response of a chromium-based catalyst further advantageously allows for a greater number of polymerization products to be produced with chromium-based catalysts than was previously possible. Additionally, chromium-based catalysts having a low or moderate flow index response advantageously allow lower flow index products to be manufactured with chromium-based catalysts at significantly higher reactor temperatures, where cooling is more efficient and higher production rates may be achieved. As another advantage, chromium-based catalysts having a higher flow index response result in lower hydrogen feed rates to the reactor. Chromium-based catalysts having a higher flow index response can also result in lower oxygen addback feed rates to the reactor which correlate with improved catalyst productivity and higher fluidized bulk density of the polyethylene particles which can lead to higher polyethylene production rate for a given equipment size. As yet another advantage, the greater flexibility for chromium-based catalysts to produce polymers of varying flow indices allows for improved grade transitions.

Inline Reduction of Chromium-Based Catalysts for Polyolefin Production

The polymerization reactor systems discussed in the above section "Polymerization Processes" and other polymerization reactor systems may employ an inline reduction of chromium-based catalyst, as discussed below with respect to FIGS. 10 and 11. Indeed, in lieu of employing the aforementioned upstream mix vessel to reduce and isolate charges of chromium-based catalyst, the chromium-based catalyst may instead be reduced inline (with a reducing agent) as feed to one or more of the polyolefin polymerization reactors discussed above in the section "Polymerization Processes." In certain embodiments, the inline reduction may be part of the polymerization reactor system or its feed system. The inline reduction may be performed without solvent removal and, thus, a stream of the chromium-based catalyst, solvent, and any remaining reducing agent may enter the polymerization reactor.

Advantageously, embodiments of the present inline reduction may avoid a drop (e.g., of 4 lb/ft3) in polymer bulk density values associated with conventional in-situ reduction of the chromium-based catalyst with reducing agent introduced directly to the polymerization reactor and first contacting the chromium-based catalyst in the polymerization reactor. Further, in some examples, the amount of reducing agent utilized may be beneficially decreased with the inline reduction, as compared to the aforementioned reduction of chromium-based catalyst in a batch mix vessel in an upstream step. In other words, for the same catalyst grade or type subjected to the same amount of reducing agent (i.e., the same reducing agent/Cr ratio), a greater flow index response of the chromium-based catalyst may be realized with inline reduction versus the drying and isolation of reduced chromium-based catalyst with a mix vessel 102, for instance. In some cases as discussed below, the flow index response increases significantly for inline reduction of catalyst versus batch reduced and dried isolated catalyst at the same reducing agent/Cr ratio.

Furthermore, as discussed below, the inline reduction may also beneficially facilitate substantially real-time control of product properties (e.g., flow index) of the product polyolefin via adjusting the addition rate of reducing agent in the inline reduction. The present inline reduction may include an inline static mixer, an inline agitator vessel, an inline stirred vessel, or the like. The mixer, static mixer, agitated vessel, stirred vessel, and/or conduit volume may provide for a specified residence time of contact of the chromium-based catalyst with the reducing agent.

Figure 10:
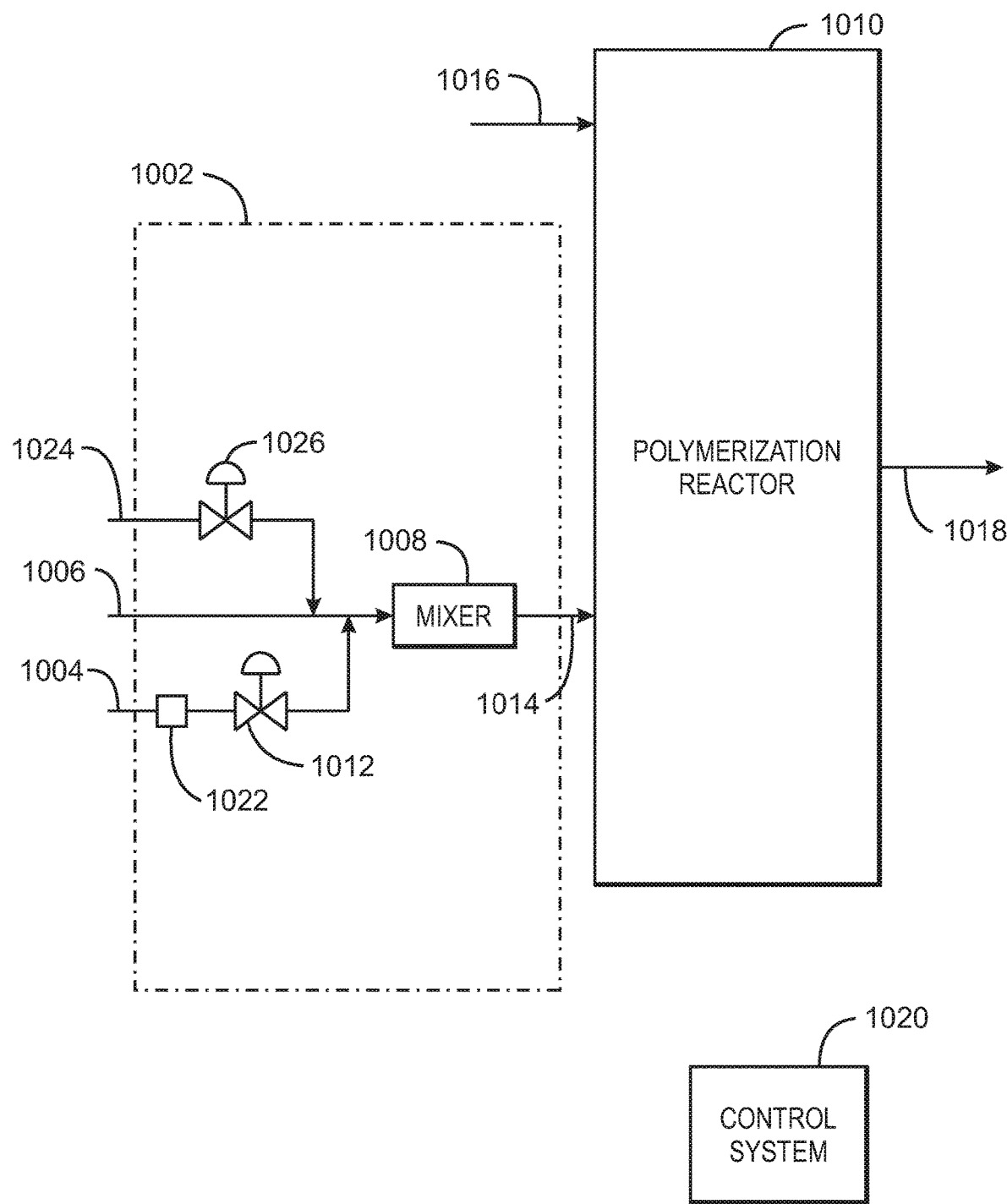
FIG. 10 is block flow diagram of a polymerization reactor system having an inline reduction system for mixing a reducing agent with a substantially continuous feed of chromium-based catalyst in accordance with embodiments of the present techniques.

FIG. 10 is a polymerization reactor system 1000 having an inline reduction system 1002 for mixing a reducing agent 1004 with a substantially continuous feed of chromium-based catalyst 1006. The reduction system 1002 includes an inline mixer 1008 to mix the reducing agent 1004 with the chromium-based catalyst 1006 in route to a polymerization reactor 1010. The polymerization reactor 1010 polymerizes an olefin into a polyolefin in the presence of the chromium-based catalyst 1006.

The polymerization reactor 1010 may be a liquid phase reactor, such as a loop reactor, a boiling liquid-pool reactor, an autoclave reactor, and the like. The polymerization reactor 1010 may also be a gas phase reactor such as fluidized bed, horizontal-stirred, or vertical stirred, reactors, and so forth. Again, the reactor 1010 may be one of the reactor types discussed above in the section entitled "Polymerization Processes." Moreover, the reactor system 1000 may generally include equipment and subsystems associated with the reactor 1010, as discussed above. The reactor 1010 may represent more than one reactor disposed in series and/or parallel.

The chromium-based catalyst 1006 received at the mixer 1008 and flowing through the mixer 1008 may be of the aforementioned chromium-based catalyst types discussed throughout the present disclosure. The catalyst 1006 may be chromium oxide catalysts and/or silyl chromate catalysts, for example. The chromium-based catalyst 1006 may be supported, and may be activated such as in an upstream activation system where an oxidation state of chromium in the catalyst 1006 is increased from +3 to +6, for instance. The chromium-based catalyst 1006 may be received at the mixer 1008 as a substantially dry catalyst if feasible, but is instead typically received in a slurry with an alkane solvent, mineral oil, and the like. The amount or rate of the catalyst 1006 to the mixer (and ultimately to the reactor 1010) may be controlled and modulated to give a desired production rate of polyolefin in the polymerization reactor 1010, a desired grade of polyolefin and polyolefin property values, the like.

The reducing agent 1004 may be an organoaluminum compound (e.g., DEAlE) and may be diluted in an inert solvent such as an alkane. The addition rate of the reducing agent 1004 may be modulated with a control valve 1012 such as a flow control valve. Indeed, as discussed below, the addition flow rate of the reducing agent 1004 may be an operating variable of the polymerization reactor system 1000 to give a desired flow index (and other desired properties) of the polyolefin product discharging from the polymerization reactor 1010. The reducing agent 1004 (with solvent) may be added to the catalyst 1006 near or at the entrance of the mixer 1008, as depicted, or may be added directly to the mixer 1008.

In certain embodiments, the mixer 1008 is a static mixer or a plurality of static mixers disposed in series and/or parallel. The mixer 1008 may also be or include a stirred or agitated vessel in lieu of or in addition to a static mixer(s). If so, the speed of agitation in the mixer(s) 1008 may be adjusted to give good mixing and/or to change the mixing characteristics in response to change in operating conditions of the polymerization reactor. Such changes in operating conditions of the polymerization reactor may include changes in flow index response and/or changes in the polymer resin average particle size distribution such as increase in the resin fines fraction, and so on. The mixer 1008 may also be a plurality of agitated vessels. Moreover, the inline mixer 1008 may be other types of mixers, and generally is a unit operation to provide for contact and mixing of the reducing agent 1004 with the chromium-based catalyst 1006. The mixer 1008 may be configured and sized based on typical flow rates of the catalyst 1006 and the reducing agent 1004 to give particular residence times of the contact/mixing and reaction of the reducing agent 1004 with the chromium-based catalyst 1006 in the mixer 1008. In certain embodiments, the contact residence of the mixer 1008 is in exemplary ranges of about 2 minutes to 120 minutes, about 18 minutes to 30 minutes, and so on. Other contact residence time ranges are applicable. The contact residence time of the mixer 1008 may be considered the residence time of the contact of the catalyst 1006 with the reducing agent 1004 through the mixer 1008. Additional contact residence time of the catalyst 1006 with the reducing agent 1004 may be contributed by piping or tubing between the mixer 1008 and the polymerization reactor 1010. The contact residence time may affect the flow index response of the catalyst and, thus, the flow index of the polymer in the downstream polymerization reactor. Indeed, differences in flow index response of the catalyst have been observed, for example, between contact residence times of about 20 minutes and about 80 minutes.

The operating temperature of the mixer 1008 may be ambient in some examples. Thus, the reduction of the catalyst 1006 in the mixer 1008 may occur at ambient temperature. In other embodiments, the mixer operating temperature 1006 may be increased above ambient, such as via heating of the incoming streams 1004 and 1006, as well as heating of the mixer 1008. Cooling may also be employed to maintain a desired operating temperature of the mixer 1008 and to remove the heat of the reaction of the reducing agent with the chromium-based catalyst. The operating pressure of the mixer 1008 may be a function of flowing supply pressure of the incoming streams 1004 and 1006, the backpressure of the polymerization reactor 1010, and so forth. Moreover, pressure control at the mixer 1008 may be implemented in alternate embodiments.

The chromium-based catalyst composition 1014 discharging from the mixer 1008 generally includes the chromium-based catalyst 1006 (some of which may have been reduced in the mixer 1008), solvent, and any remaining reducing agent 1004. The catalyst composition 1014 substantially continuously flows as feed to the polymerization reactor 1010. Reduction of the chromium-based catalyst 1006 occurs in the mixer 1008. Such reduction may also continue to occur in the chromium-based catalyst composition 1014 in the feed piping or tubing from the mixer 1008 to the reactor 1010, and in the reactor 1010 in certain embodiments. The reduction may involve reducing at least some of the chromium sites from an oxidation state of +6 to +3 and/or +2, for example. In certain embodiments, chromium-based catalyst 1006 entering the inline reduction system 1002 is not previously contacted with a reducing agent. In other embodiments, the chromium-based catalyst 1006 entering the inline reduction system 1002 is previously contacted with a reducing agent, and additional reduction may occur via the inline reduction system 1002.

Additional feed components, as discussed above in the section "Polymerization Processes" and as represented by a single arrow 1016 in FIG. 10, are fed to the polymerization reactor. Such feed components may include olefin, comonomer, hydrogen, additives, and other components. In the reactor 1010, the olefin, and any comonomer, is polymerized to polyolefin in the presence of the catalyst composition 1014 and any hydrogen and/or additives. A product polyolefin 1018 stream discharges from the polymerization reactor 1010.

In embodiments, the olefin is ethylene, the comonomer is 1-butene or 1-hexene, and the product polyolefin 1018 is polyethylene. In other embodiments, the olefin is propylene, the comonomer if employed is ethylene, and the product polyolefin is polypropylene. As mentioned, the polymerization reactor 1010 typically includes associated equipment and subsystems in the reactor system 1000. Furthermore, the product polyolefin 1018 stream may be further processed, combined with additives, and the polyolefin 1018 extruded into pellets, for example, for distribution to customers or end-users.

The addition rates of feed components and the operating conditions (e.g., pressure, temperature) of the reactor 1010 may be controlled to give a desired polymerization mixture or recipe in the reactor 1010 and thus the desired grade and properties of the product polyolefin 1016. Such control may generally impact the productivity of the catalyst 1006 or catalyst composition 1014, the production rate of the product polyolefin 1018, and so on. In accordance with embodiments of the present techniques, the addition rate of the reducing agent 1004 to the inline reduction system 1002 may be an additional operating variable of the reactor system 1000 to facilitate control of properties, e.g., flow index, density, etc., of the product polyolefin 1018, as well as productivity of the catalyst 1006, the production rate of the polyolefin 1018, and the like.

As mentioned, the addition or flow rate of the reducing agent 1004 to the mixer 1008 may be modulated by a control valve 1012. The modulation and control of the flow rate of the reducing agent 1004 via the control valve 1012 may be under the direction of a control system 1020, which may be analogous to the aforementioned control system 116. A flow control loop in a DCS control system 1020 may direct operation (valve position) of the control valve 1012 to give the desired flow rate or the set-point flow rate of the reducing agent 1004 to the mixer 1008.

The addition or feed rate, e.g., in mass per time or volume per time, of the reducing agent 1004 may be manipulated by the control valve 1012 under the direction of the control system 1020 or other control system. A set point of the feed rate may be specified in the control system 1020 based on, or in response to, the desired flow index or other property of the product polyolefin 1018. The set point of the feed rate of the reducing agent 1004 may also be specified in the control system 1020 to work in concert with other operating variables to give certain catalyst productivity values, production rates of the polyolefin 1018, and other operating conditions of the reactor 1010 and reactor system 1000.

A flow sensor 1022, such as a mass meter, flow measure orifice (e.g., with differential pressure taps), and so on, may measure the flow rate of the reducing agent 1004, and indicate such measured flow rate values to the control system 1020. A transmitter may send a signal to the control system 1020 indicating the measured flow rate. This flow control loop implemented via the control system 1020, e.g., as a control block in a DCS control system 1020, may adjust the valve opening position of the control valve 1012 to maintain the flow rate of reducing agent 1004 at set point, i.e., the desired addition rate of reducing agent 1004 to the inline reduction system 1002 and its mixer 1008.

Lastly, a solvent 1024 may be added to the mixer 1008 to adjust the residence time or contact residence time of the chromium-based catalyst through the mixer 1008. The solvent 1024 may be added directly to the mixer 1008, to a conduit supplying the catalyst 1006 to the mixer 1008, to a conduit supplying the reducing agent 1004 to the mixer 1008, and the like. In the illustrated embodiment, the addition rate of the solvent 1024 may be modulated with a control valve 1026 which may operate under the direction of the control system 1020.

Figure 11:
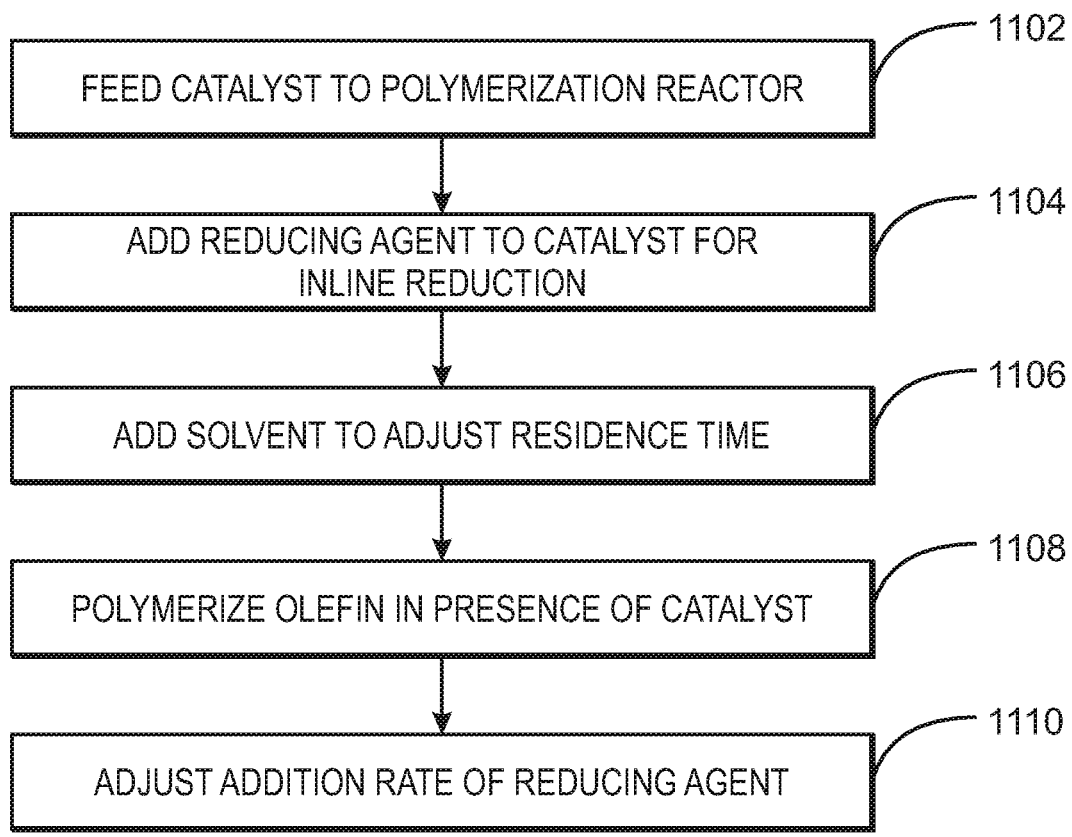
FIG. 11 is a block diagram of a method of operating a polyolefin reactor system, including feeding a chromium-based catalyst through an inline reduction system to a polymerization reactor in accordance with embodiments of the present techniques.

FIG. 11 is a method 1100 of operating a polyolefin reactor system. The method includes feeding a chromium-based catalyst, as indicated in block 1102, through an inline reduction system to a polymerization reactor. This catalyst feed may be a substantially continuous feed through the inline reduction system to the polymerization reactor. The inline reduction system may have a mixer that contacts the chromium-based catalyst with a reducing agent. The mixer may be an inline mixer including a static mixer, an agitator vessel, a stirred vessel, and so on.

A reducing agent is added (block 1104) to the chromium-based catalyst in the inline reduction system to reduce an oxidation state of at least a portion of the chromium in the chromium-based catalyst. The reducing agent may be added to the chromium-based catalyst at the mixer or upstream of the mixer, or a combination thereof. The reducing agent may be an organoaluminum compound (e.g., DEAlE and/or TEAL) and may be diluted in a solvent such as an alkane solvent.

Further, a solvent may be added (block 1106) to the inline reduction system to adjust a residence time or contact residence time of the chromium-based catalyst and the reducing agent in the mixer. An exemplary contact residence time of the chromium-based catalyst in the mixer may be in the range of about 2 minutes to about 120 minutes, in the range of about 18 minutes to about 30 minutes, and so forth.

At block 1108, an olefin, or a mixture of olefins, is polymerized into a polyolefin in the polymerization reactor in presence of the chromium-based catalyst fed through the inline reduction system to the polymerization reactor. In certain embodiments, the olefin is ethylene and the polyolefin is polyethylene. The polymerization reactor may be a gas phase reactor and/or liquid-phase reactor.

At block 1110, the addition rate or flow rate of the reducing agent to the inline reduction system and its mixer may be specified and adjusted to give a desired flow index of the polyolefin produced in the polymerization reactor. The adjustment of the reducing agent addition rate may be in response to a measured flow index of the polyolefin. Indeed, the method 1100 may include adjusting a flow index of the polyolefin by modulating the addition rate of the reducing agent to the chromium-based catalyst. Further, the addition rate of the reducing agent to the chromium-based catalyst may be adjusted in response to operating conditions of the polymerization reactor. In some cases to control the flow index, the addition rate of the reducing agent may be based on achieving or changing a target added aluminum concentration on the reduced catalyst. In some cases to control the flow index, the addition rate of the reducing agent may be based on achieving or changing a target added aluminum to chromium molar ratio on the reduced catalyst. The addition rate of the reducing agent may further be adjusted to maintain a target feed ratio relative to the catalyst feed rate or changes in the catalyst feed rate as may be beneficial, for example, to manipulate the polymer production rate of the downstream polymerization reactor.

In sum, an embodiment provides a method of operating a polyolefin reactor system, the method including feeding a chromium-based catalyst (e.g., chromium oxide catalyst) through an inline reduction system to a polymerization reactor such as a gas phase reactor. The chromium-based catalyst may be fed substantially continuously through the inline reduction system to the polymerization reactor. The method includes adding a reducing agent to the chromium-based catalyst in the inline reduction system to reduce an oxidation state of at least a portion of the chromium in the chromium-based catalyst, and polymerizing an olefin (e.g., ethylene) into a polyolefin (e.g., polyethylene) in the polymerization reactor in presence of the chromium-based catalyst. The reducing agent may include an organoaluminum compound, an organoaluminum compound diluted in a solvent, and so forth. In particular examples, the reducing agent may include DEAlE, TEAL, both DEAlE and TEAL, and so on. The inline reduction system may include a mixer such as a static mixer or stirred vessel that contacts the chromium-based catalyst and the reducing agent.

Furthermore, the method may include adding solvent to the inline reduction system to adjust contact residence time of the chromium-based catalyst and the reducing agent in the mixer. The addition rate of solvent to the inline reduction system may be adjusted in response to operating conditions of the polymerization reactor, in response to a measured flow index of the polyolefin, to maintain a flow index of the polyolefin, or to give a different flow index of the polyolefin. The addition rate of solvent to the mixer may be adjusted in response to a change in a feed rate of the chromium-based catalyst, to maintain a substantially constant a residence time of the chromium-based catalyst through the mixer, or to alter the contact residence time.

The method may include specifying the addition rate of the reducing agent to the inline reduction system to give the desired flow index of the polyolefin. Similarly, the method may include specifying the ratio of the addition rate of the reducing agent to the feed rate of the chromium-based catalyst through the inline reduction system to give the desired flow index of the polyolefin. The method may include adjusting the addition rate of the reducing agent to the inline reduction system in response to the measured flow index of the polyolefin. Likewise, the method may include adjusting the ratio of addition rate of the reducing agent to feed rate of the chromium-based catalyst through the inline reduction system in response to the measured flow index of the polyolefin. The method may include adjusting the aluminum concentration on the chromium-based catalyst to give a desired flow index of the polyolefin, and/or specifying the aluminum to chromium molar ratio on the chromium-based catalyst to give the desired flow index of the polyolefin. Moreover, the method may include adjusting the aluminum to chromium molar ratio or an aluminum concentration on the chromium-based catalyst in response to changes in a feed rate of the chromium-based catalyst to maintain the desired flow index of the polyolefin. The method may include adjusting a ratio of feed rate of the reducing agent to feed rate of the chromium-based catalyst through the inline reduction system to maintain a flow index value of the polyolefin.

The method may or may not include contacting the chromium-based catalyst with additional reducing agent in another system prior to feeding the chromium-based catalyst through the inline reduction system. Thus, in certain embodiments, the chromium-based catalyst is not contacted with reducing agent prior to feeding the catalyst through the inline reduction system. On the other hand, in other embodiments, the chromium-based catalyst is contacted with reducing agent prior to feeding the chromium-based catalyst through the inline reduction system.

Another embodiment provides a method of operating a polyolefin reactor system, including feeding a chromium-based catalyst through an inline mixer to a polymerization reactor, adding a reducing agent to contact the chromium-based catalyst through the inline mixer to the polymerization reactor, and polymerizing an olefin into a polyolefin in the polymerization reactor in presence of the chromium-based catalyst. The chromium-based catalyst may be fed as a slurry through the inline mixer to the polymerization reactor. The reducing agent may be added to the chromium-based catalyst at the mixer or upstream of the mixer, or a combination thereof. The method may include modulating the addition rate of the reducing agent to the chromium-based catalyst. Indeed, the reducing agent may be added to the chromium-based catalyst at a specified flow rate to give a desired flow index of the polyolefin. For instance, adding the reducing agent may involve adjusting the addition rate of the reducing agent to maintain a desired ratio of the addition rate of the reducing agent to a feed rate of the chromium-based catalyst through the mixer. The method may include adjusting the ratio of feed rate of the reducing agent to feed rate of the chromium-based catalyst through the mixer to give a desired flow index of the polyolefin. The method may include adjusting the addition rate of the reducing agent to the chromium-based catalyst in response to operating conditions of the polymerization reactor. Also, the method may include adjusting the agitation speed of an agitator of the inline mixer in response to operating conditions of the polymerization reactor. Further, the method may include adjusting a molar ratio of the reducing agent to the chromium-based catalyst in response to operating conditions of the polymerization reactor. The method may include adjusting the feed rate of the reducing agent to the chromium-based catalyst to maintain a specified molar ratio of the reducing agent to the chromium-based catalyst through the mixer to give the desired flow index of the polyolefin.

Solvent may be added to the chromium-based catalyst through the inline mixer to maintain or adjust a contact residence time of the chromium-based catalyst and the reducing agent. Exemplary contact residence times of the chromium-based catalyst and reducing agent in the inline mixer may be in the range of 2 minutes to 120 minutes, in the range of 18 minutes to 30 minutes, and so forth. The method may include adjusting the addition rate of solvent to the mixer in response to operating conditions of the polymerization reactor or in response to the measured flow index of the polyolefin. The method may include adjusting addition rate of solvent to the mixer in response to a change in feed rate of the chromium-based catalyst and to maintain a residence time of the chromium-based catalyst through the mixer.

Lastly, an embodiment of a polymerization reactor system includes a mixer (e.g., static mixer or stirred vessel) to contact a substantially continuous feed of chromium-based catalyst to a polymerization reactor with a reducing agent to form a catalyst feed composition having the chromium-based catalyst in route to the polymerization reactor. A residence time of the chromium-based catalyst through the mixer may be in the range of 2 minutes to 120 minutes in certain examples, or in the range of 18 minutes to 30 minutes in other examples. The reactor system includes a polymerization reactor (e.g., a gas phase reactor) that receives the catalyst feed composition and in which an olefin is polymerized into a polyolefin in presence of the chromium-based catalyst. The reactor system includes a control system to adjust the addition rate of the reducing agent to the mixer to give a desired flow index of the polyolefin. The control system may utilize a control valve to modulate the addition rate, e.g., a flow rate or feed rate in mass per time or volume per time, of the reducing agent to the inline reduction system having the mixer.

In addition, embodiments of the present disclosure provide a process for producing chromium-based catalyst compositions with a selected flow index response. Yet other embodiments provide a process for producing polyolefins comprising forming a chromium-based catalyst composition with a selected flow index response, as described herein, and contacting the chromium-based catalyst composition with olefins under polymerization conditions.

Advantageously, embodiments disclosed herein provide for a method to tailor the flow index response of chromium-based catalysts. The ability to select the flow index response of a chromium-based catalyst further advantageously allows for a greater number of polymerization products to be produced with chromium-based catalysts than was previously possible. Additionally, chromium-based catalysts having a low or moderate flow index response advantageously allow lower flow index products to be manufactured with chromium-based catalysts at significantly higher reactor temperatures, where cooling is more efficient and higher production rates may be achieved. As another advantage, chromium-based catalysts having a selected flow index response result in lower hydrogen feed rates to the reactor. As yet another advantage, the greater flexibility for chromium-based catalysts to produce polymers of varying flow indices allows for improved grade transitions.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

EXAMPLE SECTION

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following Examples are put forth so as to provide those skilled in the art with a complete disclosure and description of how to make and use the compounds of the invention, and are not intended to limit the scope of that which the inventors regard as their invention.

High-density polyethylene resin samples were prepared in polymerizations using catalysts made employing different locations and arrangements on the mix vessel for reducing agent feed introduction, different drying line-out temperatures and times, different batch sizes, and in some cases by inline reduction, as noted in Tables 1 through 6 below. The examples in Tables 1 and 5 are chromium oxide catalysts reduced on either a pilot scale or a commercial plant scale. For some of these catalysts, the Table 1 includes laboratory-scale slurry polymerization reactor results. The examples in Table 2 are chromium oxide catalysts made on a pilot plant scale and used to polymerize olefin in a pilot-plant gas-phase (fluidized-bed) polymerization reactor. The examples in Tables 3 and 6 are chromium oxide catalysts made on a plant scale and polymerized in a gas-phase, fluidized-bed polymerization pilot reactor. These examples collectively illustrate the controlling or tailoring of the flow index response of a catalyst by using different DEAlE feed arrangements and selected drying line-out temperatures for selected drying times, and different batch sizes. The examples in Table 4 are chromium oxide catalysts activated on a plant scale and used to polymerize olefin in a pilot-plant gas-phase (fluidized-bed) polymerization reactor by means of inline reduction with reducing agent.

General Catalyst Preparation (Chromium Oxide Catalysts)

Catalysts employed in the Examples were activated on a commercial scale as follows. A suitable quantity of a porous silica support containing about 5 weight percent chromium acetate (Grade C35300MSF chromium on silica, produced by PQ Corporation), which amounts to about 1 weight percent Cr content, having a particle size of about 82 microns and a surface area of about 500 square meters per gram was charged to a fluidized bed heating vessel. There, the catalyst precursor (chromium on silica) was heated slowly at a rate of about 50° C. per hour under dry nitrogen up to 200° C. and held at that temperature for about 4 hours. Next, the chromium on silica was heated slowly at a rate of about 50° C. per hour under dry nitrogen up to 450° C. and held at that temperature for about 2 hours. The nitrogen stream was then replaced with a stream of dry air and the chromium on silica was heated slowly at a rate of about 50° C. per hour to 600° C. where it was activated for about 6 hours. The activated catalyst was then cooled with dry air (at ambient temperature) to about 300° C. and further cooled from 300° C. to room temperature with dry nitrogen (at ambient temperature). The resulting cooled catalyst powder was stored under nitrogen atmosphere until treated with a reducing agent in a mix vessel or by means of inline reduction as described below.

In a typical chromium oxide catalyst reduction, the catalyst was placed in a vertical catalyst blender with a double helical ribbon agitator under an inert atmosphere. Dried hexane or isopentane solvent was added to adequately suspend the supported catalyst. All catalysts used C35300MSF starting material in the Examples listed in Tables 1, 2, 3, 5, and 6. Catalyst batch size was varied in the Examples made and used in Tables 5 and 6. For all of these catalysts, about 7.1 liters of solvent were charged per kilogram (0.89 gallons per pound) of support. DEAlE, available from Akzo Nobel, and obtained as a 25 wt % solution in isopentane or hexane, was then added above the surface of the catalyst slurry at a selected rate over about a 40 minute time period to obtain a selected weight percent aluminum loading on the catalyst. The DEAlE feed location was varied radially from the center vertical axis of the vessel. DEAlE insert tubes were either absent or were used with varying tube length below the underside of the top head of the vessel. The mixture was agitated at a selected agitation rate at a temperature of approximately 45° C. during the addition time. The mixture was further agitated at a controlled rate for about 1 hour on a pilot scale or 2 hours on a commercial scale. Then the solvent was substantially removed by drying at a selected jacket temperature for about 16 to 21 hours. The jacket temperature was selected to give a material temperature that lined out near the target of 61, 64, 71, or 81° C. during the later hours of drying. Pilot-scale C35300MSF-based catalysts were generally dried for 16 hours total with progressively stronger vacuum being applied as drying time increased. Example 9 was dried for 19 hours total. Plant-scale C35300MSF-based batches were dried for 18 or 21 hours total at slightly above atmospheric pressure. The only plant-reduced catalysts in these examples that were dried for 18 hours total were in Comparative Examples 10, 25, and 26. The drying time total is the ramp time and line-out time. The "drying line-out time" is the time while the bed temperature was within 2° C. of the final line-out temperature, and ranged from about 6 to about 11 hours in most of these Examples. The resulting dry, free flowing catalyst powder was then stored under nitrogen until used.

General Laboratory Testing Procedures for Catalysts

Certain catalyst samples that were prepared as described above and shown in Table 1 were tested for their flow index response in a laboratory 1-liter slurry reactor. In a typical slurry polymerization, catalyst was charged to a reactor equipped with a mechanical stirrer and a jacket for internal temperature control. In Examples 8 and 9, an amount of 0.144 to 0.146 g of catalyst was introduced. In the remaining Examples given in Table 1, an amount of 0.177 to 0.210 g of catalyst was introduced. This was followed by 600 mL of dry purified isobutene, and 500 cc of hydrogen was batch charged, the reactor was brought up to reaction temperature (95° C. in these examples), during which step ethylene feed was started, and 10 mL of 1-hexene was batch charged through a small gas cylinder. The ethylene was fed continuously upon demand to maintain an ethylene partial pressure of 13.8 bar (200 psi). Ethylene uptake was measured with an electronic flow meter. Polymerizations were run until about 180 grams of polyethylene were made. The reactor was opened after depressurization and cooled in order to recover the polymer. After drying, polymer flow index was measured.

General Pilot Plant Testing Procedure for Reduced and Dried Catalysts

Certain catalyst samples that were prepared as described above and shown in Tables 2, 3, and 6 were tested for their flow index response making ethylene/1-hexene copolymer product in a 14-inch diameter pilot-scale fluidized-bed reactor. Cycle gas was circulated through the reactor and heat of reaction was removed in a heat exchanger. Catalyst powder was continuously introduced into the fluidized bed. Monomers, hydrogen and oxygen were fed into the cycle gas piping. Product was transferred intermittently into a product chamber, depressurized, degassed briefly, and then discharged into a drum. Conditions in the fluidized-bed reactor were maintained at a constant value or in a narrow range for the related experiments within each set of tests that were conducted. Reactor bed temperature was about 98.2° C. Ethylene partial pressure was about 13.8 bar (200 psi). The H2/C2 molar gas ratio in the cycle gas was maintained at about 0.04. The 1-hexene to ethylene molar ratio in the cycle gas was maintained at about 0.0100. The oxygen added to ethylene in the feed gas was maintained at about 25 ppb by volume. Total reactor pressure was about 24.8 bar absolute (360 psia). Superficial gas velocity within the fluidized bed was 1.78-1.93 ft/s. Average residence time of resin in the reactor ranged from 2.08 to 2.28 hours. Tables 2, 3, and 6 summarize the catalyst information and reaction conditions along with the resulting polymer properties.

Examples 1, 2, 4, 5, 6, and 7

In Examples 1, 2, 4, 5, 6, and 7, DEAlE-reduced chromium oxide-based catalysts were prepared on a pilot scale using plant-activated C35300MSF support as described above and then tested for flow index response in a laboratory slurry polymerization reactor. Catalyst preparation conditions used are indicated in Table 1 (agitation rate during DEAlE addition and reaction, wt % Al loading, DEAlE addition time, DEAlE feed arrangement, and drying line out temperature and time). Batch sizes were about 88% full where full in the Examples refers to a batch size that just reaches the top of the agitator impeller blades. Laboratory slurry polymerization results are shown in Table 1 and in FIGS. 4 and 6.

The results show that at an agitation rate within a narrow range, and within a narrow range of wt % Al loading, and within a narrow range of DEAlE addition time, the measured flow index response increased when the DEAlE was fed with an insert tube to substantially prevent it from running down the underside of the vessel head over to the vessel wall. The results also show the measured flow index response increased further when the tube tip was located further from the wall, which meant more towards the center of the vessel.

Comparative Examples 1 and 2 show the relatively low measured flow indices (20 and 35 dg/min) obtained for polymer from two lab slurry polymerizations with pilot-plant reduced catalyst, made without an insert tube and with the DEAlE added about 90% of the distance radially from the vertical center line of the vessel, so at a position very near the wall. During these catalyst preparations the DEAlE was observed flowing entirely or nearly entirely along the underside of the head and down the side wall where it contacted a green viscous agglomeration that was observed to have formed within 20 minutes of starting DEAlE addition and moved more slowly than the bulk of the reaction slurry. Examples 5 and 7 in comparison with Examples 1 and 2 show that when an insert tube of at least 0.5 inch protrusion below the top head was used, at a location about 83% of the radial distance from the vertical centerline of the vessel, the measured flow index increased significantly to 76 dg/min, and it increased further to 104 when an insert with 1-inch protrusion was used at a location about 67% of the radial distance from the vertical centerline of the vessel. FIG. 4 displays this effect in a bar chart. The drying line-out temperature was 70 to 72° C. in these four examples. Examples 4 to 6 show that when drying line out temperature was reduced from the region of 72 to 82° C. down to about 61° C., the measured flow index significantly increased, from about 76 to about 101 dg/min. FIG. 6 displays this effect graphically. As shown by the examples above, it is possible to tailor the flow index response of pilot-scale DEAlE-reduced activated C35300MSF-based chromium oxide catalysts by varying the DEAlE feed location radially, by using a DEAlE feed tube insert protruding below the underside of the top head of the vessel, and/or by varying the catalyst drying line out temperature and time.

Examples 8 and 9

In Examples 8 and 9, DEAlE-reduced chromium oxide-based catalysts were reduced on a pilot plant scale using plant-activated C35300MSF support as described above. Catalyst preparation conditions used are indicated in Table 1 (agitation rate during DEAlE addition and reaction, wt % Al loading, DEAlE addition time, DEAlE feed arrangement, and drying line out temperature and time). Batch sizes were about 88% full where full refers to a batch size that just reaches the top of the agitator impeller blades. Examples 4 through 6 showed the improved flow index response possible by drying at lower line out temperature. In order to reach the same level of residual solvent in the final catalyst, extending the drying time is one option. In Examples 8 and 9, to determine any deleterious effects of increased drying time on catalyst performance, catalyst was dried differently than in other examples. Catalyst in Example 8 was dried for 16 total hours, but catalyst in Example 9 was dried for 19 total hours. In both of these examples gentler vacuum was applied to catalysts during drying to maintain material temperature near the final drying line out temperature for all but about the first hour of drying when evaporation is rapid and the batch cools. The resulting measured flow indices of 118 and 114 dg/min, respectively, show total drying times of 16 to 19 hours and drying line out times of about 15 to 18 hours have no significant effect on catalyst flow index response.

Examples 10 Through 14

In Examples 10 through 14, DEAlE-reduced chromium oxide-based catalysts were prepared on a plant scale using activated C35300MSF support as described above. Catalyst preparation conditions used are indicated in Table 1 (agitation rate during DEAlE addition and reaction, wt % Al loading, DEAlE addition time, DEAlE feed arrangement, and drying line out temperature and time). Batch size for Comparative Example 10 was about 100% full where full refers to a batch size that just reaches the top of the agitator impeller blades. Batch sizes for Examples 11 through 14 were about 95% full.

within a narrow range of DEAlE addition time, the measured flow index response increased when the DEAlE was fed with an insert tube to substantially prevent it from running down the underside of the vessel head over to the vessel wall, and the measured flow index response increased further when the tube tip was located further from the wall, which meant more towards the center of the vessel.

Comparative Example 15 shows the relatively low measured flow index (4.43 dg/min) obtained for polymer from a gas-phase fluidized bed pilot plant polymerization with pilot-plant reduced catalyst, made without an insert tube and with the DEAlE added about 90% of the distance radially from the vertical center line of the vessel, so at a position very near the wall. Examples 17 and 19 in comparison with Comparative Example 15 show that when an insert tube of at least 0.5 inch protrusion below the top head was used, at a location about 83% of the radial distance from the vertical centerline of the vessel, the measured flow index increased significantly to 5.31 dg/min, and it increased further to 8.20 when an insert with 1-inch protrusion was used at a location

TABLE 1

Catalyst Preparation Conditions for Examples 1-14 and Lab Slurry Polymerization Results for Examples 1-9

| Example | Scale of catalyst preparation | Agitation rate (rpm) | DEAlE Addition Time (min) | wt % Al Loading | DEAlE Feed Arrangement Insert Tube Length Below Underside of Top Head (inches) | Radial Location from Center | Drying Line Out Temperature (° C.) | Drying Line Out Time (hrs) | Measured Flow Index Response (g/10 min) | Catalyst Activity (g PE/g cat/1 hr) |
|---|---|---|---|---|---|---|---|---|---|---|
| Comparative Ex. 1 | Pilot | 37 | 39 | 1.57 | No insert tube | ~90% | 70.4 | 6.3 | 20 | 745 |
| Comparative Ex. 2 | Pilot | 37 | 39 | 1.57 | No insert tube | ~90% | 70.4 | 6.3 | 35 | 976 |
| Comparative Ex. 3 | Pilot | 37 | 39 | 1.58 | No insert tube | ~90% | 71.3 | 9.7 | — | — |
| Ex. 4 | Pilot | 30 | 40 | 1.54 | 0.5 | ~83% | 81.7 | 10.9 | 77 | 1449 |
| Ex. 5 | Pilot | 30 | 40 | 1.58 | 0.5 | ~83% | 72.0 | 9.2 | 76 | 1555 |
| Ex. 6 | Pilot | 30 | 40 | 1.53 | 0.5 | ~83% | 61.0 | 8.3 | 101 | 1679 |
| Ex. 7 | Pilot | 30 | 41 | 1.53 | 1 | ~67% | 71.0 | 7.1 | 104 | 1581 |
| Ex. 8 | Pilot | 30 | 39 | 1.53 | 1 | ~67% | 63.2 | 15.3 | 118 | 1710 |
| Ex. 9 | Pilot | 30 | 38 | 1.57 | 1 | ~67% | 63.4 | 17.8 | 114 | 1627 |
| Comparative Ex. 10 | Plant | 30 | 37 | 1.35 | No insert tube | ~54% | 73.0 | 6.3 | — | — |
| Ex. 11 | Plant | 30 | 40 | 1.35 | No insert tube | ~54% | 64.6 | 8.4 | — | — |
| Ex. 12 | Plant | 30 | 40 | 1.29 | No insert tube | ~54% | 65.3 | 9.3 | — | — |
| Ex. 13 | Plant | 30 | 39 | 1.33 | 2 | ~74% | 64.3 | 8.5 | — | — |
| Ex. 14 | Plant | 30 | 42 | 1.34 | 2 | ~54% | 62.9 | 8.4 | — | — |

Examples 15 Through 19

In Examples 15 through 19, DEAlE-reduced chromium oxide-based catalysts were prepared on a pilot scale using activated C35300MSF support as described above and then tested for flow index response in a gas-phase fluidized bed polymerization reactor. Specifically, the catalysts prepared in Comparative Example 3 and in Examples 4 through 7 were utilized in these polymerization examples. Catalyst preparation conditions used are indicated in Tables 1 and 2 (agitation rate during DEAlE addition and reaction, wt % Al loading, DEAlE addition time, DEAlE feed arrangement, and drying line out temperature and time). Polymerization results are shown in Table 2 below and in FIG. 5 above.

The results show that at an agitation rate within a narrow range, and within a narrow range of wt % Al loading, and about 67% of the radial distance from the vertical centerline of the vessel. FIG. 5 above displays this effect in a bar chart. The drying line out temperature was 71 to 72° C. in these three examples. Examples 16 to 18 show that when drying line out temperature was reduced from the region of 72 to 82° C. down to about 61° C., the measured flow index significantly increased, from the region of about 5.1 to 5.3 to about 7.6 dg/min. FIG. 7 above displays this effect graphically. As shown by the examples above, it is possible to tailor the flow index response of pilot-scale DEAlE-reduced activated C35300MSF-based chromium oxide catalysts by varying the DEAlE feed location radially, by using a DEAlE feed tube insert protruding below the underside of the top head of the vessel, and/or by varying the catalyst drying line out temperature (and time).

TABLE 2

Catalyst Information, Pilot Plant Reaction Conditions, and Average Resin Properties for Examples 15-19

| EXAMPLE | Comparative 15 | 16 | 17 | 18 | 19 |
|---|---|---|---|---|---|
| Catalyst Info: | | | | | |
| From Example Number | Comparative 3 | 4 | 5 | 6 | 7 |
| Scale Reduced | Pilot | Pilot | Pilot | Pilot | Pilot |
| Support Type | C35300MSF | C35300MSF | C35300MSF | C35300MSF | C35300MSF |
| Cr, wt % | 0.99 | 1.00 | 1.00 | 0.99 | 1.00 |
| wt % Al Loading on Catalyst | 1.58 | 1.54 | 1.58 | 1.53 | 1.53 |
| DEAlE Add. Time (min) | 39 | 40 | 40 | 40 | 41 |
| Agitation Speed (rpm) | 37 | 30 | 30 | 30 | 30 |
| DEAlE Tube Intrusion (inch) | None | 0.5 | 0.5 | 0.5 | 1 |
| DEAlE Feed Radial from Center | ~90% | ~83% | ~83% | ~83% | ~67% |
| Drying Line Out Temperature (° C.) | 71.3 | 81.7 | 72.0 | 61.0 | 71.0 |
| Drying Line Out Time (hr) | 9.7 | 10.9 | 9.2 | 8.3 | 7.1 |
| Reaction Conditions: | | | | | |
| Bed Temperature (° C.) | 98.2 | 98.2 | 98.2 | 98.2 | 98.2 |
| Reactor Pressure (psig) | 346 | 346 | 346 | 346 | 346 |
| C2H4 Partial Pressure (psia) | 200 | 200 | 200 | 200 | 200 |
| H2/C2H4 Ratio (molar) | 0.039 | 0.040 | 0.040 | 0.040 | 0.040 |
| C6H12/C2H4 Ratio (molar) | 0.0100 | 0.0100 | 0.0100 | 0.0100 | 0.0100 |
| O2/C2H4 Ratio (ppbv) | 25.1 | 24.9 | 25.0 | 25.2 | 25.6 |
| Production Rate (lb/hr) | 60.8 | 54.6 | 52.8 | 56.6 | 53.2 |
| Bed Weight (lb) | 128 | 116 | 119 | 118 | 118 |
| Fluidized Bulk Density (lb/ft3) | 16.1 | 14.6 | 14.6 | 15.0 | 14.7 |
| Residence Time (hr) | 2.1 | 2.1 | 2.2 | 2.1 | 2.2 |
| STY (lb/h/ft3) | 7.8 | 6.9 | 6.6 | 7.2 | 6.6 |
| Average Resin Properties: | | | | | |
| MI(I2) (dg/min) | — | — | 0.041 | 0.064 | 0.061 |
| FI(I21) (dg/min) | 4.43 | 5.09 | 5.31 | 7.60 | 8.20 |
| MFR (I21/I2) | — | — | 122 | 103 | 135 |
| Density (g/cm3) | 0.9374 | 0.9415 | 0.9421 | 0.9449 | 0.9446 |
| Settled Bulk Density (lb/ft3) | 24.7 | 22.8 | 23.2 | 23.1 | 23.1 |
| Cr, ppmw | 1.39 | 1.26 | 1.18 | 1.22 | 1.18 |
| Catalyst Productivity (lb/lb) | 7111 | 7908 | 8462 | 8131 | 8432 |
| Average Particle Size (in) | 0.0437 | 0.0411 | 0.0428 | 0.0324 | 0.0370 |

Examples 20 Through 24

In Examples 20 through 24, DEAlE-reduced chromium oxide-based catalysts were prepared on plant scale using activated C35300MSF support as described above and were then tested for flow index response in a pilot-scale gas-phase fluidized-bed reactor. Specifically, the catalysts prepared in Comparative Example 10 and Examples 11 through 14 were utilized. Catalyst preparation conditions used are indicated in Tables 1 and 3 (agitation rate during DEAlE addition and reaction, wt % Al loading, DEAlE addition time, DEAlE feed arrangement, and drying line out temperature and time). Polymerization results are shown in Table 3. The polymerization conditions were held constant. The reactor operated well with no instances of resin agglomeration or disruption to the polymerization process.

The results in Table 3 show that at an agitation rate within a narrow range, and within a narrow range of wt % Al loading, and within a narrow range of DEAlE addition time, the measured flow index response increased when the DEAlE was fed with an insert tube to substantially prevent it from running down the underside of the vessel head over to the vessel wall, and the measured flow index response increased further when the tube tip was located further from the wall, which meant more towards the center of the vessel. The results in Table 3 further show that at a given agitation rate, for catalysts with similar wt % Al loading, and within a narrow range of DEAlE addition time, the measured flow index response increases with decreasing drying line out temperature. Comparative Example 20 shows that with no DEAlE feed insert, with DEAlE added ~54% of the radial distance from the vessel centerline to the wall, and at 73° C. drying line out temperature and about 6 hours drying line out time, a relatively low flow index of 4.48 dg/min was obtained.

Examples 21 and 22 compared with Example 20 show with no DEAlE feed insert and with DEAlE feed at the same radial location and at about 8 to 9 hrs drying line-out time, that as the drying line out temperature was decreased from 73° C. to about 65° C. for plant reduced activated C35300MSF catalyst, the measured flow index increased about 13% from 4.48 to the range of 5.0 to 5.1 dg/min. It is believed this increase in flow index was due to the decrease in drying line-out temperature and not due to shorter total drying time of 18 hours in Comparative Example 20, nor due to shorter drying line out time. See Examples 8 and 9. In Example 23 with a DEAlE insert tube protruding 2 inches below the underside of the top head and located about 74% of the radial distance from the vertical centerline of the vessel to the wall, and at about 64° C. drying line out temperature, the measured flow index of 5.19 dg/min only slightly increased over Examples 21 and 22, but increased significantly over Comparative Example 20. The location in Example 23 closer to the vessel wall limited the improvement provided by the DEAlE feed insert. In Example 24 with a DEAlE insert tube protruding 2 inches below the underside of the top head and located about 54% of the radial distance from the vertical centerline of the vessel to the wall, and at about 63° C. drying line out temperature, the measured flow index of 5.95 dg/min was increased about 33% over Comparative Example 20 with no insert and higher drying line out temperature of 73° C. The measured flow index in Example 24 was increased 17% above Examples 21 and 22 with no DEAlE feed insert, but with similar low drying line out temperature of about 65° C. The measured flow index in Example 24 was increased about 15% above Example 23 in which the same length DEAlE feed insert was used and about the same drying line-out temperature, but the DEAlE feed location was significantly closer to the vessel wall.

positions described herein, wherein the catalysts have a tailored or selected flow index response, provides a capacity for polymerization process flexibility, which has significant commercial application in the polymerization of polyolefins.

Inline Reduction Examples

Gas phase fluid bed polymerizations were conducted in a similar manner as that employed in previous gas phase Examples. With respect to the catalyst systems, comparative Examples 25 and 26 employ DEAlE reduced catalyst prepared on a plant scale using activated C35300MSF support

TABLE 3

Catalyst Information, Pilot Plant Reaction Conditions, and Average Resin Properties for Examples 20-24

| EXAMPLE | Comparative 20 | 21 | 22 | 23 | 24 |
|---|---|---|---|---|---|
| Catalyst Info: | | | | | |
| From Example Number | Comparative 10 | 11 | 12 | 13 | 14 |
| Scale Reduced | Plant | Plant | Plant | Plant | Plant |
| Support Type | C35300MSF | C35300MSF | C35300MSF | C35300MSF | C35300MSF |
| Cr, wt % | 0.92 | 0.93 | 0.92 | 0.93 | 0.92 |
| wt % Al Loading on Catalyst | 1.35 | 1.35 | 1.29 | 1.33 | 1.34 |
| DEAlE Add. Time (min) | 37 | 40 | 40 | 39 | 42 |
| Agitation Speed (rpm) | 30 | 30 | 30 | 30 | 30 |
| DEAlE Tube Intrusion (inch) | None | None | None | 2 | 2 |
| DEAlE Feed Radial from Center | ~54% | ~54% | ~54% | ~74% | ~54% |
| Drying Line Out Temperature (° C.) | 73.0 | 64.6 | 65.3 | 64.3 | 62.9 |
| Drying Line Out Time (hr) | 6.3 | 8.4 | 9.3 | 8.5 | 8.4 |
| Reaction Conditions: | | | | | |
| Bed Temperature (° C.) | 98.2 | 98.2 | 98.2 | 98.2 | 98.2 |
| Reactor Pressure (psig) | 346 | 346 | 346 | 346 | 346 |
| C2H4 Partial Pressure (psia) | 200 | 200 | 200 | 200 | 200 |
| H2/C2H4 Ratio (molar) | 0.040 | 0.040 | 0.039 | 0.040 | 0.039 |
| C6H12/C2H4 Ratio (molar) | 0.0100 | 0.0100 | 0.0100 | 0.0100 | 0.0101 |
| O2/C2H4 Ratio (ppbv) | 25.1 | 25.1 | 25.1 | 24.6 | 25.0 |
| Production Rate (lb/hr) | 59.7 | 58.2 | 59.3 | 62.7 | 60.6 |
| Bed Weight (lb) | 132 | 133 | 134 | 135 | 135 |
| Fluidized Bulk Density (lb/ft3) | 16.3 | 16.5 | 16.7 | 17.2 | 17.0 |
| Residence Time (hr) | 2.2 | 2.3 | 2.2 | 2.2 | 2.2 |
| STY (lb/hr/ft3) | 7.4 | 7.2 | 7.4 | 8.0 | 7.6 |
| Average Resin Properties: | | | | | |
| MI(I2) (dg/min) | — | — | — | — | — |
| FI(I21) (dg/min) | 4.48 | 5.10 | 5.00 | 5.19 | 5.95 |
| MFR (I21/I2) | — | — | — | — | — |
| Density (g/cm3) | 0.9413 | 0.9420 | 0.9416 | 0.9435 | 0.9435 |
| Settled Bulk Density (lb/ft3) | 24.9 | 24.2 | 24.0 | 25.2 | 25.6 |
| Cr, ppmw | 0.92 | 1.05 | 1.33 | 1.22 | 1.25 |
| Catalyst Productivity (lb/lb) | 9957 | 8876 | 6917 | 7623 | 7360 |
| Average Particle Size (in) | 0.0397 | 0.0410 | 0.0416 | 0.0368 | 0.0369 |

These examples illustrate, among other things, for reduced chromium oxide catalysts the surprising effect on flow index response of using differing DEAlE feed arrangements and different DEAlE feed radial locations from the vertical centerline of the vessel and different drying line-out temperatures and times in both a fluidized-bed gas phase polymerization process and in a slurry polymerization process, for polyethylene copolymers, which included ethylene units as well as other monomeric units. These effects may be utilized to tailor the flow index response of a catalyst so as to make target polymers with high, medium, or low flow indices under a variety of polymerization conditions.

As described above and illustrated in the Examples, the flow index response of a chromium-based catalyst can be tailored by contacting the chromium-based catalyst with a reducing agent fed at a selected radial location from the vertical centerline of the vessel and with a feed insert protruding below the underside of the vessel head, and optionally drying at a drying line-out temperature of less than 68° C. The use of the chromium-based catalyst comas described above. Catalyst preparation conditions used are mostly indicated in Table 4 and were very similar to those used in comparative Example 10. DEAlE was added about 54% of the distance radially from the vertical center line of the vessel and no insert tube was used. Drying line out temperature and time were 73.4° C. and 5.35 hrs. Batch size was about 99% full where full refers to a batch size that just reaches the top of the agitator impeller blades.

Examples 27-30 use unreduced activated C35300MS chromium oxide catalyst prepared as described earlier under General Catalyst Preparation. In all cases, the chromium oxide catalysts were activated at 600° C. in air. In Examples 27-30, the unreduced catalyst and DEAlE reducing agent are fed through a 100 ml Parr Series 4560 Mini Reactor bottom-port type vessel (Parr Instrument Company, Moline, Ill., USA), hereafter referred to as the Parr Mixer at temperatures between 14 and 23° C. before addition to the polymerization reactor. The chromium oxide catalyst is fed as 11.2 wt % mineral oil slurry and the reducing agent is fed as a 0.20 wt % solution in isopentane. The air-driven stirrer near the bottom of the Parr Mixer includes a four-blade turbine with no pitch on the blades (0.25 inch height, 0.75 inch diameter). The chromium oxide catalyst slurry enters by a dip tube at a point just above the stirrer. The reducing agent enters at the top of the Parr Mixer, and the mixed contents exit at the bottom. An optional line for adding additional isopentane to the Parr Mixer also enters at the top. The Parr Mixer operates at a pressure higher than that of the polymerization reactor. The reduced catalyst is conveyed to the polymerization reactor with an auxiliary stream of carrier isopentane, with the possible addition of a nitrogen carrier gas by a tee or Y-block at a location in the line near where it enters the reactor. The catalyst enters the reactor fluid bed about 1.5 to 2.0 ft above the distributor plate via a section of stainless steel tubing that may extend inside typically about ¼ to ½ of the distance across the diameter of the pilot reactor straight-section.

In comparative Example 25 the catalyst is fed dry to the reactor producing a polymer with a certain flow index and density. In comparative Example 26, the reduced catalyst is fed to the reactor as an 11.2 wt % slurry. It can be seen there is some loss in catalyst productivity and increase in polymer flow index value possibly due to impurities in the oil slurry.

In Example 27, the reducing agent is fed to the mixer along with the chromium oxide catalyst at approximately the same ratio to chromium as that found in the comparative examples. It can be seen that the polymer flow index and catalyst productivity increased significantly. Comparing Examples 26 with 27, the flow index response increased from about 10 dg/min (batch reduced and dried isolated catalyst) to about 48 dg/min (inline reduction of the catalyst). Examples 28-30 show that polymer flow index can be controlled by varying the ratio of the reducing agent to chromium oxide catalyst. Significantly less reducing agent is needed to achieve the same flow index response as that obtained with mix tank reduced catalyst. In all inline reduction cases the polymer morphology is maintained with no loss in polymer bulk density. Examples 28 and 29 show that at a constant DEAlE feed ratio, reaction temperature and hydrogen to ethylene molar ratio can be employed to adjust polymer flow index. The mixer average residence time listed in Table 4 may be labeled as the average contact residence time of the DEAlE with the catalyst in the mixer. The Al Added wt % and DEAlE (added)/Cr mole ratio represent the DEAlE added in the inline reduction and are determined based on the inline DEAlE feed rate and the catalyst feed rate.

TABLE 4

| | Inline Reduction | | | | | |
|---|---|---|---|---|---|---|
| EXAMPLE | Comparative 25 | Comparative 26 | 27 | 28 | 29 | 30 |
| Catalyst Information: | | | | | | |
| Scale Reduced | Plant | Plant | Pilot | Pilot | Pilot | Pilot |
| Support Type | C35300MSF | C35300MSF | C35300MS | C35300MS | C35300MS | C35300MS |
| Cr (wt %) | 0.915 | 0.915 | 0.936 | 0.936 | 0.936 | 0.936 |
| Al Loading on Catalyst (wt %) | 1.325 | 1.325 | None | None | None | None |
| DEAlE/Cr Mole Ratio | 2.79 | 2.79 | 0 | 0 | 0 | 0 |
| DEAlE Add. Time (min) | 38 | 38 | — | — | — | — |
| Agitation Speed (rpm) | 30 | 30 | — | — | — | — |
| Inline Reduction: | | | | | | |
| Catalyst Feed | Dry | Slurry | Slurry | Slurry | Slurry | Slurry |
| Slurry Concentration (wt %) | — | 11.2 | 11.2 | 11.2 | 11.2 | 11.2 |
| Catalyst Feed by Slurry (g/hr) | — | 5.34 | 4.70 | 4.81 | 4.81 | 4.92 |
| Inline Reducing Agent | None | None | 0.20 wt % DEAlE in Isopentane | 0.20 wt % DEAlE in Isopentane | 0.20 wt % DEAlE in Isopentane | 0.20 wt % DEAlE in Isopentane |
| Inline Mixing | — | — | Parr Mixer | Parr Mixer | Parr Mixer | Parr Mixer |
| Reducing Agent Feed (g/hr) | — | — | 167 | 86 | 86 | 82 |
| Al Added to Catalyst (wt %) | — | — | 1.43 * | 0.72 * | 0.72 * | 0.68 * |
| Al (Added)/Cr Mole Ratio | — | — | 2.99 * | 1.50 * | 1.50 * | 1.40 * |
| Mixer Temperature (° C.) | — | — | 14-15 | 15 | 16-19 | 23-17 |
| Mixer Stirrer Speed (rpm) | — | — | 745 | 745 | 745 | 745 |
| Mixer Avg. Residence Time (min) | — | — | 19.1 | 18.8 | 18.5 | 18.6 |
| Catalyst Nitrogen Carrier (lb/hr) | 4.0 | 3.0 | 3.0 | 3.0 | 3.0 | 3.0 |
| Catalyst Isopentane Carrier (lb/hr) | — | 3.0 | 2.6 | 2.6 | 2.6 | 2.6 |
| Injection Tube OD, inch | 0.125 | 0.125 | 0.1875 | 0.1875 | 0.1875 | 0.1875 |
| Reaction Conditions: | | | | | | |
| Bed Temperature (° C.) | 106.0 | 106.0 | 106.0 | 106.0 | 102.0 | 102.9 |
| Reactor Pressure (psig) | 346 | 347 | 347 | 346 | 346 | 346 |
| C2H4 Partial Pressure (psia) | 200 | 200 | 200 | 200 | 200 | 200 |
| H2/C2H4 Ratio (molar) | 0.099 | 0.099 | 0.100 | 0.099 | 0.050 | 0.043 |
| C6H12/C2H4 Ratio (molar) | 0.00423 | 0.00456 | 0.00480 | 0.00480 | 0.00532 | 0.00548 |
| O2/C2H4 Ratio (ppbv) | 36.0 | 38.7 | 36.1 | 35.2 | 25.9 | 24.4 |
| Production Rate (lb/hr) | 52.7 | 51.6 | 47.0 | 61.4 | 61.7 | 58.5 |
| Bed Weight (lb) | 124 | 124 | 124 | 123 | 121 | 123 |
| Fluidized Bulk Density (lb/ft3) | 15.1 | 15.7 | 15.7 | 15.6 | 15.1 | 15.8 |
| Bed Height (ft) | 8.6 | 8.3 | 8.3 | 8.3 | 8.4 | 8.2 |
| Residence Time (hr) | 2.35 | 2.40 | 2.63 | 2.01 | 1.97 | 2.11 |
| STY (lb/hr/ft3) | 6.4 | 6.5 | 6.0 | 7.8 | 7.7 | 7.5 |
| Average Resin Properties: | | | | | | |
| MI(I2) (dg/min) | — | — | 0.58 | 0.12 | 0.089 | — |
| MI(I5) (dg/min) | 0.36 | 0.47 | 2.87 | 0.66 | 0.51 | 0.17 |

TABLE 4-continued

Inline Reduction

| EXAMPLE | Comparative 25 | Comparative 26 | 27 | 28 | 29 | 30 |
|---|---|---|---|---|---|---|
| FI(I21) (dg/min) | 7.17 | 9.77 | 47.7 | 13.4 | 10.8 | 4.33 |
| MFR (I21/I2) | — | — | 83 | 111 | 122 | — |
| Density (g/cm3) | 0.9476 | 0.9496 | 0.9586 | 0.9612 | 0.9513 | 0.9459 |
| Settled Bulk Density (lb/ft3) | 23.3 | 23.0 | 24.2 | 23.1 | 22.8 | 24.0 |
| Average Particle Size (in) | 0.0382 | 0.0449 | 0.0320 | 0.0430 | 0.0383 | 0.0481 |
| Fines < 120 Mesh Sieve (wt %) | 1.29 | 0.81 | 2.83 | 2.03 | 2.05 | 1.61 |
| Catalyst Productivity (lb/lb) | 8883 | 5209 | 5742 | 6440 | 6576 | 6078 |

* value calculated on inline DEAlE feed

Within each set, polymerization reactor temperature, hexene to ethylene gas phase molar ratios, and DEAlE level were varied for these catalysts with different flow index responses in order to make the desired polymer density and flow index. Other polymerization conditions were held constant within each set. Lower reactor temperature consistently leads to lower flow index and lower melt index for a given DEAlE-reduced chromium catalyst.

Varying Batch Size Examples 31 Through 35

In Examples 31 through 35, DEAlE-reduced chromium oxide-based catalysts were prepared on a plant scale using activated C35300MSF support as described above. Catalyst preparation conditions used are indicated in Table 5 (batch size, agitation rate during DEAlE addition and reaction, wt % Al loading, DEAlE addition time, DEAlE feed arrangement, and drying line out temperature and time). In Example 31 the batch size was about 95% of full, such that the slurry surface was near to the top of the double helical ribbon impeller during the DEAlE addition. In Examples 32, 33, 34 and 35, batch size was reduced to about 75% of full. This put the slurry surface well below the top of the impeller. This is thought to have contributed to better mixing of the surface where DEAlE is added throughout the DEAlE addition step and so to better distribution of DEAlE throughout the batch. In Examples 34 and 35 longer DEAlE addition time of 62 minutes was utilized in combination with the smaller batch size and the feed nozzle insert. In Example 35 higher drying line out temperature was utilized.

then tested for flow index response in a pilot-scale gas-phase fluidized-bed reactor. Specifically, the catalysts prepared in Examples 31 through 35 were utilized. Catalyst preparation conditions used are indicated in Table 5 (batch size, agitation rate during DEAlE addition and reaction, wt % Al loading, DEAlE addition time, DEAlE feed arrangement, and drying line out temperature and time). Polymerization results are shown in Table 6. The polymerization conditions were held constant. The reactor operated well with no instances of resin agglomeration or disruption to the polymerization process.

In Table 6 Example 37 in comparison with Example 36 shows when an insert tube with 2-inch protrusion below the top head was used at a location 54% of the radial distance from the vertical centerline of the vessel, the smaller batch size yielded a catalyst with 66% higher measured flow index (8.75 dg/min vs. 5.27 dg/min respectively). In Example 38, no DEAlE feed tube insert was utilized in a small batch, yet Table 6 shows this catalyst gave significantly higher flow index (7.46 dg/min) in Example 38 than Example 36 (5.27 dg/min) with catalyst made with the normal larger batch size and a DEAlE feed nozzle insert. Only a small portion of this 42% increase in flow index would be expected to be due to the just slightly higher (4.2% relatively) wt % Al in Example 38 vs. Example 36. In Example 39 vs. Example 37 it can be seen how increasing the DEAlE addition time from 42 minutes to 62 minutes further increased flow index from 8.75 dg/min to 9.54 dg/min. In Example 40 vs. Example 39 it can be seen how increasing the drying line out temperature from 62.1° C. to 70.1° C. decreased flow index from 9.54 dg/min to 7.26 dg/min.

TABLE 5

Catalyst Preparation Conditions for Examples 31-35

| Example | Scale of catalyst preparation | C35300MSF Charge (lbs) | Agitation rate (rpm) | DEAlE Addition Time (min) | wt % Al Loading | DEAlE Feed Arrangement | | Drying Line-Out Temperature (° C.) | Drying Line-Out Time (hrs) |
|---|---|---|---|---|---|---|---|---|---|
| | | | | | | Insert Tube Length Below Underside of Top Head (inches) | Radial Location from Center | | |
| Ex. 31 | Plant | 1904 | 30 | 41 | 1.53 | 2 | ~54% | 63.8 | 8.1 |
| Ex. 32 | Plant | 1548 | 30 | 42 | 1.55 | 2 | ~54% | 63.6 | 5.75 |
| Ex. 33 | Plant | 1540 | 30 | 41 | 1.59 | No insert tube | ~54% | 62.9 | 4.25 |
| Ex. 34 | Plant | 1549 | 30 | 62 | 1.54 | 2 | ~54% | 62.1 | 5.0 |
| Ex. 35 | Plant | 1548 | 30 | 63 | 1.54 | 2 | ~54% | 70.1 | 5.97 |

Examples 36 Through 40

In Examples 36 through 40, DEAlE-reduced chromium oxide-based catalysts were prepared on a plant scale using activated C35300MSF support as described above and were The results in Table 6 show that at an agitation rate within a narrow range, and within a narrow range of wt % Al loading, and within a narrow range of DEAlE addition time, the measured flow index response increased when the batch size was reduced such that the slurry surface was well below the top of the impeller throughout the DEAlE addition. Furthermore, the combination of smaller batch size with an insert tube in the DEAlE addition nozzle gave a relatively high increase in flow index response. Lengthening the DEAlE addition time from 42 to 62 minutes gave the highest increase in flow index response in these tests. Raising the drying line out temperature reduced flow index response.

TABLE 6

Catalyst Information, Pilot Plant Reaction Conditions, and Average Resin Properties for Examples 36-40

| EXAMPLE | 36 | 37 | 38 | 39 | 40 |
|---|---|---|---|---|---|
| Catalyst Info: | | | | | |
| From Example Number | 31 | 32 | 33 | 34 | 35 |
| Scale Reduced | Plant | Plant | Plant | Plant | Plant |
| Support Type | C35300MSF | C35300MSF | C35300MSF | C35300MSF | C35300MSF |
| Support Charged (lbs) | 1904 | 1548 | 1540 | 1549 | 1548 |
| Cr, wt % | 0.91 | 0.84 | 0.83 | 0.88 | 0.86 |
| wt % Al Loading on Catalyst | 1.53 | 1.55 | 1.59 | 1.54 | 1.54 |
| DEAlE Add. Time (min) | 41 | 42 | 41 | 62 | 63 |
| Agitation Speed (rpm) | 30 | 30 | 30 | 30 | 30 |
| DEAlE Tube Intrusion (inch) | 2 | 2 | None | 2 | 2 |
| DEAlE Feed Radial from Center | ~54% | ~54% | ~54% | ~54% | ~54% |
| Drying Line Out Temperature (° C.) | 63.8 | 63.6 | 62.9 | 62.1 | 70.1 |
| Drying Line Out Time (hr) | 8.1 | 5.75 | 4.25 | 5.0 | 5.97 |
| Reaction Conditions: | | | | | |
| Bed Temperature (° C.) | 98.2 | 98.2 | 98.2 | 98.2 | 98.2 |
| Reactor Pressure (psig) | 341 | 343 | 343 | 343 | 348 |
| C2H4 Partial Pressure (psia) | 200 | 200 | 200 | 200 | 200 |
| H2/C2H4 Ratio (molar) | 0.039 | 0.040 | 0.040 | 0.040 | 0.040 |
| C6H12/C2H4 Ratio (molar) | 0.0100 | 0.0100 | 0.0100 | 0.0100 | 0.0100 |
| O2/C2H4 Ratio (ppbv) | 25.3 | 25.6 | 25.4 | 25.6 | 25.4 |
| Production Rate (lb/hr) | 59.7 | 56.0 | 57.0 | 55.4 | 52.3 |
| Bed Weight (lb) | 134 | 126 | 126 | 125 | 124 |
| Fluidized Bulk Density (lb/ft3) | 17.6 | 16.3 | 16.4 | 16.1 | 16.2 |
| Residence Time (hr) | 2.2 | 2.2 | 2.2 | 2.3 | 2.4 |
| STY (lb/h/ft3) | 7.9 | 7.3 | 7.5 | 7.1 | 6.8 |
| Average Resin Properties: | | | | | |
| MI(I2) (dg/min) | — | — | — | — | — |
| FI(I21) (dg/min) | 5.27 | 8.75 | 7.46 | 9.54 | 7.26 |
| MFR (I21/I2) | — | — | — | — | — |
| Density (g/cm3) | 0.9429 | 0.9459 | 0.9449 | 0.9472 | 0.9461 |
| Settled Bulk Density (lb/ft3) | 25.1 | 24.1 | 24.2 | 24.1 | 25.5 |
| Cr, ppmw | 1.30 | 1.27 | 1.26 | 1.24 | 1.33 |
| Catalyst Productivity (lb/lb) | 7014 | 6562 | 6582 | 7170 | 6481 |
| Average Particle Size (in) | 0.0382 | 0.0385 | 0.0372 | 0.0376 | 0.0365 |

What is claimed is:

1. A reducing system for chromium-based catalyst, comprising:

a catalyst feed system to provide a chromium-based catalyst to a mix vessel;

a reducing agent supply system to provide a reducing agent to the mix vessel; and the mix vessel to hold a mixture comprising the chromium-based catalyst, the reducing agent, and a solvent to produce a reduced chromium-based catalyst for use in the polymerization of an olefin into a polyolefin, wherein the mix vessel comprises an agitator to agitate the mixture, and further comprises an entrance arrangement for the reducing agent, the entrance arrangement having a conduit extension to receive and direct the reducing agent into the mix vessel; and a control system to facilitate adjusting flow rate of the reducing agent to the entrance arrangement to give a desired flow index response of the reduced chromium-based catalyst, and wherein the control system facilitates adjusting a drying line-out temperature of the reduced chromium based catalyst in the mix vessel to give a desired flow index response of the reduced chromium-based catalyst.

2. The system of claim 1, wherein the conduit extension extends into an interior of the mix vessel and directs the reducing agent to a vapor space of the mix vessel away from an inside surface of the mix vessel toward a top surface of the mixture level.

3. The system of claim 1, wherein the conduit extension directs the reducing agent toward a location of a surface of the mixture level that is 20% to 80% of a perpendicular distance from a vertical centerline of the mix vessel to an inside surface of a vertical wall of the mix vessel.

4. The system of claim 1, wherein a vertical centerline of the agitator is substantially the same as a vertical centerline of the mix vessel.

5. The system of claim 1, wherein the conduit extension comprises a nozzle insert through a nozzle of the mix vessel.

6. The system of claim 1, comprising:

a flow control valve to modulate the flow rate of the reducing agent to the entrance arrangement of the mix vessel;

a variable drive to modulate an agitation rate of the mixture by the agitator, wherein the agitation rate comprises revolutions per unit time of a shaft of the agitator; and a heat transfer system to provide a heat transfer medium to a jacket of the mix vessel.

7. The system of claim 1, comprising a control system to facilitate adjusting agitation rate in revolutions per time of the agitator to give a desired flow index response of the reduced chromium-based catalyst.

8. The system of claim 1, wherein the chromium-based catalyst comprises an inorganic support comprising a surface area of 50 to 1000 square meters per gram and an average particle size of 20 to 300 micrometers.

* * * * *